United States Patent
Battrell et al.

(10) Patent No.: US 11,827,661 B2
(45) Date of Patent: Nov. 28, 2023

(54) WATER SOLUBLE FLUORESCENT OR COLORED DYES COMPRISING CONJUGATING GROUPS

(71) Applicant: SONY GROUP CORPORATION, Tokyo (JP)

(72) Inventors: C. Frederick Battrell, Wenatchee, WA (US); Kenneth Farber, Renton, WA (US); John C. Kumer, Seattle, WA (US); Tracy Matray, Snohomish, WA (US); Michael VanBrunt, Bothell, WA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 15/553,548

(22) PCT Filed: Feb. 26, 2016

(86) PCT No.: PCT/US2016/019907
§ 371 (c)(1),
(2) Date: Aug. 24, 2017

(87) PCT Pub. No.: WO2016/138461
PCT Pub. Date: Sep. 1, 2016

(65) Prior Publication Data
US 2018/0065998 A1 Mar. 8, 2018

Related U.S. Application Data

(60) Provisional application No. 62/121,415, filed on Feb. 26, 2015.

(51) Int. Cl.
| | |
|---|---|
| *C07F 9/572* | (2006.01) |
| *C09B 57/00* | (2006.01) |
| *C09B 57/02* | (2006.01) |
| *C07F 9/09* | (2006.01) |
| *C09B 69/10* | (2006.01) |

(52) U.S. Cl.
CPC ............ *C07F 9/572* (2013.01); *C07F 9/093* (2013.01); *C07F 9/094* (2013.01); *C09B 69/101* (2013.01); *C09B 69/102* (2013.01); *C09B 69/103* (2013.01); *C09B 69/109* (2013.01)

(58) Field of Classification Search
CPC ... C09B 69/102; C09B 69/103; C09B 69/109; C09B 69/101; C09B 69/10; C07F 9/572; C07F 9/094; C07F 9/093; C07F 9/09
See application file for complete search history.

(56) References Cited

U.S. PATENT DOCUMENTS

| | | |
|---|---|---|
| 4,450,305 A | 5/1984 | Kamhi |
| 4,476,229 A | 10/1984 | Fino et al. |
| 4,778,753 A | 10/1988 | Yamanishi et al. |
| 5,053,054 A | 10/1991 | Kirchanski et al. |
| 5,268,486 A | 12/1993 | Waggoner et al. |
| 5,318,894 A | 6/1994 | Pugia |
| 5,994,143 A | 11/1999 | Bieniarz et al. |
| 6,140,480 A | 10/2000 | Kool |
| 6,171,859 B1 | 1/2001 | Herrnstadt et al. |
| 6,218,108 B1 | 4/2001 | Kool |
| 6,380,431 B1 | 4/2002 | Whipple et al. |
| 6,479,650 B1 | 11/2002 | Kool |
| 6,627,400 B1 * | 9/2003 | Singh ............... C07H 19/06 435/6.1 |
| 6,670,193 B2 | 12/2003 | Kool |
| 6,716,452 B1 | 4/2004 | Piccariello et al. |
| 6,852,709 B2 | 2/2005 | Leong et al. |
| 7,060,708 B2 | 6/2006 | Piccariello et al. |
| 7,172,907 B2 | 2/2007 | Chen et al. |
| 7,423,133 B2 | 9/2008 | Kool et al. |
| 7,667,024 B2 | 2/2010 | Mao et al. |

(Continued)

FOREIGN PATENT DOCUMENTS

| | | |
|---|---|---|
| CA | 2263671 A1 | 2/1998 |
| CN | 101137735 A | 3/2008 |

(Continued)

OTHER PUBLICATIONS

Analyte, 2018, https://www.google.com/search?q=what+is+an+analyte&rlz=1C1GCEB_enUS775US775&oq=what+is+an+analyte&aqs=chrome..69i57j0l5.3231j0j7&sourceid=chrome&ie=UTF-8.*
Holy et al., 1975, caplus an 1975:171341.*
RN230952-79-1, 1999, registry database compound.*
Singh et al., 2003, caplus an 2003:769075.*
RN1801696-51-4, 2015, registry database compound.*
Arian et al., "1,9-Dialkoxyanthracene as a $^1O_2$-Sensitive Linker," *J. Am. Chem. Soc.* 133:3972-3980, 2011.
Becker et al., "New Thermotropic Dyes Based on Amino-Substituted Perylendicarboximides," *Chem. Eur. J.* 6(21):3984-3990, 2000.

(Continued)

*Primary Examiner* — Sun Jae Yoo
(74) *Attorney, Agent, or Firm* — Seed IP Law Group LLP

(57) ABSTRACT

Compounds useful as fluorescent or colored dyes are disclosed. The compounds have the following structure (I): or a stereoisomer, tautomer or salt thereof, wherein $R^1$, $R^2$, $R^3$, $R^4$, $R^5$, $L^1$, $L^3$, $L^4$, $L^6$, $L^7$, $L^8$, $M^1$, $M^2$, q, w and n are as defined herein. Methods associated with preparation and use of such compounds are also provided.

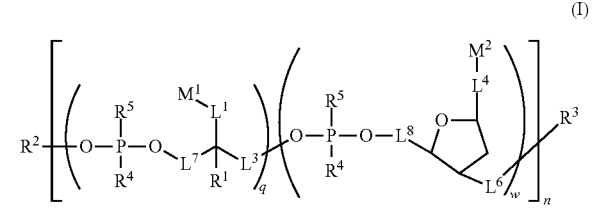

13 Claims, No Drawings

(56) References Cited

U.S. PATENT DOCUMENTS

| | | |
|---|---|---|
| 7,897,684 B2 | 3/2011 | Bazan et al. |
| 8,217,389 B2 | 7/2012 | Nakano et al. |
| 8,293,700 B2 | 10/2012 | Arranz |
| 8,349,308 B2 | 1/2013 | Yurkovetskiy et al. |
| 8,431,545 B2 | 4/2013 | Kataoka et al. |
| 8,632,947 B2 | 1/2014 | Bentley et al. |
| 8,802,738 B2 | 8/2014 | Emrick |
| 8,895,023 B2 | 11/2014 | Rademacher et al. |
| 8,906,603 B2 | 12/2014 | Castro et al. |
| 9,085,799 B2 | 7/2015 | Bazan et al. |
| 9,150,782 B2 | 10/2015 | Lee et al. |
| 9,400,273 B1 | 7/2016 | Liu et al. |
| 9,545,447 B2 | 1/2017 | Wooley et al. |
| 9,649,389 B2 | 5/2017 | Groves et al. |
| 9,687,291 B2 | 6/2017 | Shimizu et al. |
| 9,689,877 B2 * | 6/2017 | Matray .................. C07F 9/093 |
| 9,765,220 B2 * | 9/2017 | Matray .................. C09B 5/62 |
| 9,822,134 B2 | 11/2017 | Segev |
| 9,851,359 B2 | 12/2017 | Matray et al. |
| 9,884,070 B2 | 2/2018 | Denardo et al. |
| 9,913,992 B2 | 3/2018 | Demarest et al. |
| 9,939,454 B2 | 4/2018 | Dzubay et al. |
| 10,036,754 B2 | 7/2018 | Matray et al. |
| 10,191,060 B2 | 1/2019 | Chiu et al. |
| 10,435,563 B2 | 10/2019 | Matray et al. |
| 10,709,791 B2 | 7/2020 | Stayton et al. |
| 10,865,310 B2 | 12/2020 | Matray et al. |
| 10,866,244 B2 | 12/2020 | Matray et al. |
| 10,954,391 B2 | 3/2021 | Matray et al. |
| 10,989,715 B2 | 4/2021 | Matray et al. |
| 11,084,932 B2 | 8/2021 | Battrell et al. |
| 11,142,647 B2 | 10/2021 | Matray et al. |
| 11,312,736 B1 | 4/2022 | Matray et al. |
| 11,352,502 B2 | 6/2022 | Matray et al. |
| 11,370,922 B2 | 6/2022 | Matray et al. |
| 11,377,563 B2 | 7/2022 | Matray et al. |
| 11,390,754 B2 | 7/2022 | Singh et al. |
| 11,434,374 B2 | 9/2022 | Matray et al. |
| 11,434,377 B2 | 9/2022 | Matray et al. |
| 11,453,783 B2 | 9/2022 | Matray et al. |
| 2001/0018503 A1 | 8/2001 | Whipple et al. |
| 2002/0099013 A1 | 7/2002 | Piccariello et al. |
| 2003/0054361 A1 | 3/2003 | Heller |
| 2003/0207208 A1 | 11/2003 | Uenishi |
| 2003/0207264 A1 | 11/2003 | Packard et al. |
| 2004/0014981 A1 | 1/2004 | Lugade et al. |
| 2004/0138467 A1 | 7/2004 | French et al. |
| 2004/0186278 A1 | 9/2004 | Chen et al. |
| 2004/0224372 A1 | 11/2004 | Li et al. |
| 2004/0241768 A1 | 12/2004 | Whitten et al. |
| 2005/0054024 A1 | 3/2005 | Lawrence |
| 2005/0123935 A1 | 6/2005 | Haugland et al. |
| 2006/0008822 A1 | 1/2006 | Manoharan et al. |
| 2006/0035302 A1 | 2/2006 | Lee |
| 2006/0063186 A1 | 3/2006 | Benson et al. |
| 2007/0042398 A1 | 2/2007 | Peng et al. |
| 2007/0077549 A1 | 4/2007 | Buller et al. |
| 2007/0148094 A1 | 6/2007 | Uzgiris et al. |
| 2007/0269902 A1 | 11/2007 | Beechem et al. |
| 2008/0227939 A1 | 9/2008 | Mizoshita et al. |
| 2009/0253792 A1 | 10/2009 | Mickle et al. |
| 2009/0299070 A1 | 12/2009 | Berens et al. |
| 2010/0039684 A1 | 2/2010 | Kolb et al. |
| 2010/0092386 A1 | 4/2010 | Segev |
| 2010/0129800 A1 | 5/2010 | Aymami Bofarull et al. |
| 2010/0192312 A1 | 8/2010 | Cremer et al. |
| 2011/0224516 A1 | 9/2011 | Romey et al. |
| 2012/0021454 A1 | 1/2012 | Bikker et al. |
| 2012/0116079 A1 | 5/2012 | Lukhtanov et al. |
| 2012/0126175 A1 | 5/2012 | Ueno et al. |
| 2013/0059343 A1 | 3/2013 | Cheung |
| 2013/0102021 A1 | 4/2013 | Beacham et al. |
| 2013/0119363 A1 | 5/2013 | Sasaki et al. |
| 2013/0137755 A1 | 5/2013 | Segev |
| 2013/0202536 A1 | 8/2013 | Mustaev et al. |
| 2013/0244891 A1 | 9/2013 | Waggoner et al. |
| 2014/0023590 A1 | 1/2014 | Gao et al. |
| 2015/0110715 A1 | 4/2015 | Eder et al. |
| 2015/0159198 A1 | 6/2015 | McGall et al. |
| 2015/0232615 A1 | 8/2015 | Kwiatkowski |
| 2015/0258217 A1 | 9/2015 | Caravan et al. |
| 2016/0039850 A1 | 2/2016 | Segev |
| 2016/0176903 A1 | 6/2016 | Segev |
| 2016/0208100 A1 | 7/2016 | Matray et al. |
| 2016/0264737 A1 | 9/2016 | Bartholomew et al. |
| 2016/0327859 A1 | 11/2016 | Idei et al. |
| 2016/0341736 A1 | 11/2016 | Matray et al. |
| 2016/0347907 A1 | 12/2016 | Dose |
| 2017/0286113 A1 | 10/2017 | Shanbhogue et al. |
| 2017/0292957 A1 | 10/2017 | Matray et al. |
| 2017/0326233 A1 | 11/2017 | Demeule et al. |
| 2018/0065998 A1 | 3/2018 | Battrell et al. |
| 2018/0079909 A1 | 3/2018 | Matray et al. |
| 2018/0100861 A1 | 4/2018 | Matray et al. |
| 2018/0163052 A1 | 6/2018 | Matray et al. |
| 2018/0164322 A1 | 6/2018 | Matray et al. |
| 2018/0237641 A1 | 8/2018 | Matray et al. |
| 2019/0016898 A1 | 1/2019 | Matray et al. |
| 2019/0136065 A1 | 5/2019 | Singh et al. |
| 2019/0144678 A1 | 5/2019 | Matray et al. |
| 2019/0153232 A1 | 5/2019 | Matray et al. |
| 2019/0177549 A1 | 6/2019 | Matray et al. |
| 2019/0300716 A1 | 10/2019 | Matray et al. |
| 2020/0109287 A1 | 4/2020 | Matray et al. |
| 2020/0222554 A1 | 7/2020 | Matray et al. |
| 2020/0284798 A1 | 9/2020 | Matray et al. |
| 2020/0353089 A1 | 11/2020 | Matray |
| 2020/0353094 A1 | 11/2020 | Matray |
| 2020/0360526 A1 | 11/2020 | Matray |
| 2020/0392345 A1 | 12/2020 | Matray et al. |
| 2021/0032277 A1 | 2/2021 | Matray et al. |
| 2021/0032474 A1 | 2/2021 | Matray et al. |
| 2021/0095130 A1 | 4/2021 | Matray et al. |
| 2021/0096135 A1 | 4/2021 | Matray et al. |
| 2021/0109104 A1 | 4/2021 | Jackson et al. |
| 2021/0128591 A1 | 5/2021 | Matray |
| 2021/0128739 A1 | 5/2021 | Matray |
| 2021/0253864 A1 | 8/2021 | Matray et al. |
| 2021/0261782 A1 | 8/2021 | Matray et al. |
| 2021/0285953 A1 | 9/2021 | Matray et al. |
| 2021/0340380 A1 | 11/2021 | Matray et al. |
| 2021/0395530 A1 | 12/2021 | Matray et al. |
| 2022/0160887 A1 | 5/2022 | Matray et al. |
| 2022/0168433 A1 | 6/2022 | Matray et al. |
| 2022/0168435 A1 | 6/2022 | Matray et al. |
| 2022/0220314 A1 | 7/2022 | Singh et al. |
| 2022/0227794 A1 | 7/2022 | Matray et al. |

FOREIGN PATENT DOCUMENTS

| | | |
|---|---|---|
| CN | 102174078 A | 9/2011 |
| CN | 102971283 A | 3/2013 |
| CN | 103319378 A | 9/2013 |
| CN | 104072727 A | 10/2014 |
| CN | 105377994 A | 3/2016 |
| CN | 106589005 A | 4/2017 |
| DE | 197 17 904 A1 | 10/1998 |
| EP | 0 708 837 A1 | 5/1996 |
| EP | 1 650 269 A2 | 4/2006 |
| EP | 1 655 317 A1 | 5/2006 |
| EP | 2 366 785 A1 | 9/2011 |
| GB | 2 372 256 A | 8/2002 |
| GB | 2 456 298 A | 7/2009 |
| GB | 2 554 666 A | 4/2018 |
| JP | S61-207395 A | 9/1986 |
| JP | 4-282391 A | 10/1992 |
| JP | 2000-17183 A | 1/2000 |
| JP | 2008-510041 A | 4/2008 |
| JP | 2008-535945 A | 9/2008 |
| JP | 2009-519595 A | 5/2009 |
| JP | 2010-508295 A | 3/2010 |
| KR | 10-1041446 B1 | 6/2011 |
| KR | 10-2015-0007795 A | 1/2015 |
| SU | 1121931 A | 4/1988 |

(56) References Cited

FOREIGN PATENT DOCUMENTS

| | | |
|---|---|---|
| WO | 93/06482 A1 | 4/1993 |
| WO | 94/13688 A1 | 6/1994 |
| WO | 95/02700 A1 | 1/1995 |
| WO | 01/69254 A2 | 9/2001 |
| WO | 01/73123 A2 | 10/2001 |
| WO | 01/83502 A1 | 11/2001 |
| WO | 02/22883 A1 | 3/2002 |
| WO | 02/36832 A2 | 5/2002 |
| WO | 02/083954 A1 | 10/2002 |
| WO | 2004/007751 A2 | 1/2004 |
| WO | 2006/020947 A2 | 2/2006 |
| WO | 2006/099050 A2 | 9/2006 |
| WO | 2009/015467 A1 | 2/2009 |
| WO | 2010/026957 A1 | 3/2010 |
| WO | 2013/012687 A2 | 1/2013 |
| WO | 2014/043289 A2 | 3/2014 |
| WO | 2014/102803 A1 | 7/2014 |
| WO | 2014/147642 A1 | 9/2014 |
| WO | 2014/159392 A1 | 10/2014 |
| WO | 2015/027176 A1 | 2/2015 |
| WO | 2015/109136 A2 | 7/2015 |
| WO | 2015/115415 A1 | 8/2015 |
| WO | 2016/138461 A1 | 9/2016 |
| WO | 2016/183185 A1 | 11/2016 |
| WO | 2017/003639 A2 | 1/2017 |
| WO | 2017/089890 A1 | 6/2017 |
| WO | 2017/173348 A1 | 10/2017 |
| WO | 2017/173355 A1 | 10/2017 |
| WO | 2017/177065 A2 | 10/2017 |
| WO | 2018/060722 A1 | 4/2018 |
| WO | 2019/071208 A1 | 4/2019 |
| WO | 2020/210689 A1 | 10/2020 |
| WO | 2020/210692 A1 | 10/2020 |
| WO | 2020/210694 A1 | 10/2020 |
| WO | 2021/062176 A2 | 4/2021 |
| WO | 2021/067483 A1 | 4/2021 |

OTHER PUBLICATIONS

Braeckmans et al., "Three-Dimensional Fluorescence Recovery after Photobleaching with the Confocal Scanning Laser Microscope," *Biophysical Journal* 85:2240-2252, 2003.

Braga et al., "Intracellular Macromolecular Mobility Measured by Fluorescence Recovery after Photobleaching with Confocal Laster Scanning Microscopes," *Molecular Biology of the Cell* 15:4749-4760, 2004.

Brinkley, "A Brief Survey of Methods for Preparing Protein Conjugates with Dyes, Haptens, and Cross-Linking Reagents," *Bioconjugate Chem* 3:2-13, 1992.

Dai et al., "DNA-polyfluorophore excimers as sensitive reporters for esterases and lipases," *Chem. Commun.* 46:1221-1223, 2010.

Divittorio et al., "Synthetic peptides with selective affinity for apoptotic cells," *Organic & Biomolecular Chemistry* 4(10):1966-2006.

Gao et al., "Libraries of Composite Polyfluors Built from Fluorescent Deoxyribosides," *Journal of the American Chemical Society* 124(39):11590-11591, 2002.

Gao et al., "Modified DNA Analogues That Sense Light Exposure with Color Changes," *J. Am. Chem. Soc.* 126:12748-12749, 2004.

Gordon et al., "Analysis of Simulated and Experimental Fluorescence Recovery After Photobleaching. Data for Two Diffusing Components," *Biophysical Journal* 68:766-778, 1995.

Hanhela et al., "Synthesis and Evaluation of Fluorescent Materials for Colour Control of Peroxyolate Chemiluminescene. III Yellow and Red Fluorescent Emitters," *Aust. J. Chem.* 34:1701-1717, 1981.

Haraguchi, "Live Cell Imaging: Approaches for Studying Protein Dynamics in Living Cells," *Cell Structure and Function* 27:333-334, 2002.

Koo et al., "Fluorescent DNA chemosensors: identification of bacterial species by their volatile metabolites," *Chem. Commun.* 47:11435-11437, 2011.

Lee et al., "Monitoring the Hydrophobic Interactions of Internally Pyrene-Labeled Poly(ethylene oxide)s in Water by Fluorescence Spectroscopy," *Macromolecules* 31:9193-9200, 1998.

Nussbaumer et al., "Amplification of Chirality by Supramolecular Polymerization of Pyrene Oligomers," *Angew. Chem. Int. Ed.* 50:5490-5494, 2011.

PubChem, "US20100012929A1-20100121-C00010_4," SID No. 140452858, retrieved Mar. 29, 2016 from URL https://pubchem.ncbi.nlm.nih.gov/substance/140452858, 6 pages.

Wang et al., "Cruciforms: Assembling Single Crystal Micro- and Nanostructures from One to Three Dimensions and Their Applications in Organic Field-Effect Transistors," *Chem. Mater.* 21:2840-2845, 2009.

Wang et al., "DNA Polyfluorophores for Real-Time Multicolor Tracking of Dynamic Biological Systems," *Angew. Chem. Int. Ed.* 51:7176-7180, 2012.

Wilson et al., "Efficient Quenching of Oligomeric Fluorophores on a DNA Backbone," *J. Am. Chem. Soc.* 129:15426-15427, 2007.

Babitskaya et al., "Bromoacyl Analogues of Phosphatidylcholine with Intramolecular Fluorescence Quenching and Their Use as Substrates for Continuous Monitoring of Phospholipase A2 Activity," *Applied Biochemistry and Microbiology* 40(4):351-356, 2004.

Chong et al., "Oxygen Quenching of Pyrene-Lipid Fluorescence in Phosphatidylcholine Vesicles—A Probe for Membrane Organization," *Biophys. J.* 47:613-621, 1985.

Hintwood, *A Textbook of Science for the Health Professions*, 2nd Ed., Chapman & Hall, London, England, 1992, pp. 376-377.

Liu et al., "Detection of prostate-specific membrane antigen on HUVECs in response to breast tumor-conditioned medium," *International Journal of Oncology* 38:1349-1355, 2011.

Liu et al., "DNA-Based Micelles: Synthesis, Micellar Properties and Size-Dependent Cell Permeability," *Chem. Eur. J.* 16:3791-3797, 2010. (14 Pages).

Molotkovsky et al., "Perylenoyl- and Anthrylvinyl-Labeled Lipids as Membrane Probes," *Biochimica et Biophysica Acta* 778:281-288, 1984.

Pownall et al., "Kinetics of Spontaneous and Plasma-Stimulated Sphingomyelin Transfer," *Biochimica et Biophysica Acta* 712:169-176, 1982.

Rosdahl et al., *Textbook of Basic Nursing*, 9th Ed., Lippincott Williams & Wilkins, Philadelphia, Pennsylvania, USA, 2007, p. 319.

Wilson et al., "Oligodeoxyfluorosides: strong sequence of dependence of fluorescnce emission," *Tetrahedron* 63(17):3427-3433, 2007. (18 Pages).

Bergstrom et al., "A NaPi2b Antibody-Drug Conjugate Induces Durable Complete Tumor Regressions in Patient-Derived Xenograft Models of NSCLC," *IASLC 17th World Conference on Lung Cancer*, Vienna, Austria, Dec. 4-7, 2016. (8 pages).

Bergstrom et al., "A novel, highly potent HER2-targeted antibody-drug conjugate (ADC) for the treatment of low HER2-expressing tumors and combination with trastuzumab-based regimens in HER2-driven tumors," Mersana Therapeutics, Abstract LEA-231, 2015, 1 page.

Bergstrom et al., "Potent Promise," *Innovations in Pharmaceutical Technology* 49:16-20, 2014.

Bergstrom et al., "XMT-1522 induces tumor regressions in pre-clinical models representing HER2-positive and HER2 low-expressing breast cancer,"Mersana Therapeutics, Abstract P4-14-28, 2015, 1 page.

Daniels et al., "Fluorescence of the Putine and Pyrimidine Bases of the Nucleic Acids in Neutral Aqueous Solution at 3000° K," Science 171(3972):675-677, 1971.

Mersana Therapeutics, URL: http://www.mersana.com, download date Jan. 3, 2019, 9 pages.

Yurkovetskiy et al., "Advantages of Polyacetal Polymer-based Antibody Drug Conjugates: Application to Low Expression Targets," Mersana Therapeutics, technical paper #2645, 2014, 1 page.

U.S. Appl. No. 17/121,596, filed Dec. 14, 2020.

Beaucage et al., "The Functionalization of Oligonucleotides via Phosphoramidite Derivatives," *Tetrahedron* 49(10):1925-1963, 1993.

(56) References Cited

OTHER PUBLICATIONS

Chattopadhyay et al., "Brilliant Violet Fluorophores: A New Class of Ultrabright Fluorescent Compounds for Immunofluorescence Experiments," *Cytometry Part A* 81A:456-466, 2012.
Cuppoletti et al., "Oligomeric fluorescent labels for DNA," *Bioconjug. Chem.* 16(3):528-534, 2005.
Dubrovsky, "Semiconductor nanoparticles as reporters in multiplexed immunoassay and cell analysis," *International Journal of Nanoscience* 8(1 & 2):163-167, 2009.
Li et al., "Polymeric Drugs: Advances in the development of pharmacologically active polymers," *Journal of Controlled Release* 219:360-382, 2015.
Luo et al., "Sensitive and rapid quantification of C-reactive protein using quantum dot-labeled microplate immunoassay," *Journal of Translational Medicine* 10(24):1-9, 2012.
Paris et al., "Probing DNA sequences in solution with a monomer-excimer fluorescence color change," *Nucleic Acids Research* 26(16):3789-3793, 1998.
Ren et al., "An Antisense Oligodeoxynucleotide-Doxorubicin Conjugate: Preparation and Its Reversal Multidrug Resistance of Human Carcinoma Cell Line In Vitro," *Nucleosides, Nucleotides & Nucleic Acids* 23(10):1595-1607, 2004.
Stuart et al., "Site-Specific DNA-Doxorubicin Conjugates Display Enhanced Cytotoxicity to Breast Cancer Cells," *Bioconjugate Chemistry* 25:406-413, 2014.
Teo et al., "Polyfluorophores on a DNA Backbone: A Multicolor Set of Labels Excited at One Wavelength," *J. Am. Chem. Soc.* 131(11):3923-3933, 2009. (NIH Public Access Author Manuscript, available in PMC Mar. 25, 2010, 23 pages).
Tram et al., "Oligonucleotide Labeling Using BODIPY Phosphoramidite," *Nucleosides, Nucleotides & Nucleic Acids* 30(1):1-11, 2011.
Avirah et al., "Infrared Absorbing Croconaine Dyes: Synthesis and Metal Ion Binding Properties," *J. Org. Chem.* 73:274-279, 2008.
Li et al., "Responsive nanogel-based dual fluorescent sensors for temperature and $Hg^{2+}$ ions with enhanced detection sensitivity," *J. Mater. Chem.* 20:10716-10723, 2010.
Stewart et al., "The Fluorescence of a Chelating Two-Photon-Absorbing Dye is Enhanced with the Addition of Transition Metal Ions but Quenched in the Presence of Acid," *Proc. of SPIE* 9939(993904):1-10, 2016. (10 pages).
Zhang et al., "FRET Imaging of Enzyme-Responsive HPMA Copolymer Conjugate," *Macromolecular Bioscience* 17:1600215, 2017. (8 pages).
U.S. Appl. No. 16/982,341, filed Sep. 18, 2020.
U.S. Appl. No. 16/982,355, filed Sep. 18, 2020.
Doi et al., "Hetero-Selective DNA-Like Duplex Stabilized by Donor-Acceptor Interactions," *Chem. Eur. J.* 21:15974-15980, 2015.
Johansson, "Choosing Reporter-Quencher Pairs for Efficient Quenching Through Formation of Intramolecular Dimers," *Methods in Molecular Biology* 335:17-29, 2006.
Saito et al., "Dual-labeled oligonucleotide probe for sensing adenosine via FRET: A novel alternative to SNPs genotyping," *Chem. Commun.*:2133-2135, 2007.
Franceschin et al., "Synthesis of a Dibromoperylene Phosphoramidite Building Block and Its Incorporation at the 5' End of a G-Quadruplex Forming Oligonucleotide: Spectroscopic Properties and Structural Studies of the Resulting Dibromoperylene Conjugate," *Bioconjugate Chem* 22:1309-1319, 2011.
Masuko et al., "Fluorescence resonance energy transfer from pyrene to perylene labels for nucleic acid hybridization assays under homogenous solution conditions," *Nucleic Acids Research* 28(8):e34, 2000 (8 pages).
Takakusa et al., "Design and Synthesis of an Enzyme-Cleavable Sensor Molecule for Phosphodiesterase Activity Based on Fluorescence Resonance Energy Transfer," *J. Am. Chem. Soc.* 124(8):1653-1657, 2002.
Vinogradov et al., "Total synthesis and biochemical characterization of mirror image barnase," *Chem Sci.* 6: 2997-3002, 2015.
U.S. Appl. No. 17/323,791, filed May 18, 2021.
U.S. Appl. No. 17/458,149, filed Aug. 26, 2021.
U.S. Appl. No. 17/458,938, filed Aug. 26, 2021.
Aviñó et al., "Solid-phase synthesis of oligomers carrying several chromophore units linked by phosphodiester backbones," *Biooranic & Medicinal Chemist Letters* 18:2306-2310, 2008.
Boldyrev et al., "Synthesis and Characteristics of New Fluorescent Probes Based on Cardiolipin," *Russian Journal of Bioorganic Chemistry* 35(2):219-224, 2009.
Buckhout-White et al., "Assembling programmable FRET-based photonic networks using designer DNA scaffolds," *Nature Communications* 5:5615, Dec. 11, 2014. (16 pages)
CAS Registry No. 862288-26-4, American Chemical Society, 2021. (1 page).
Damian et al., "Synthesis and DNA Interaction of Platinum Complex/Peptide Chimera as Potential Drug Candidates," *Eur. J. Org. Chem.* 6161-6170, 2010.
De Vos et al., "New Non Nucleosidic Phosphoramidites for the Solid Phase Multi-Labelling of Oligonucleotides: Comb- and Multifork-Like Structures," *Nucleosides & Nucleotides* 13(10):2245-2265, 1994.
Drescher et al., "General Synthesis and Aggregation Behaviour of New Single-Chain Bolaphospholipids: Variations in Chain and Headgroup Structures," *Chemistry—A European Journal* 14(22):6796-6804, 2008.
Guryev et al., "Control of the Fluorescence of Dye-Antibody Conjugates by (2-Hydroxypropyl)-β-cyclodextrin in Fluorescence Microscopy and Flow Cytometry," *Analytical Chemistry* 83:7109-7114, Aug. 16, 2011.
Kashida et al., "A Cationic Dye Triplet as a Unique "Glue" That Can Connect Fully Matched Termini of DNA Duplexes," *Chem. Eur. J.* 17:2614-2622, 2011.
Lewis et al., "Orientation Control of Fluorescence Resonance Energy Transfer Using DNA as a Helical Scaffold," *J. Am. Chem. Soc.* 127(28):10002-10003, 2005.
Phares et al., "Improving the Stability and Sensing of Electrochemical Biosensors by Employing Trithiol-Anchoring Groups in a Six-Carbon Self-Assembled Monolayer," *Anal. Chem.* 81(3):1095-1100, Feb. 1, 2009.
Rochat et al., "Water-Soluble Cationic Conjugated Polymers: Response to Electron-Rich Bioanalytes," *J. Am. Chem. Soc.* 135:17703-17706, 2013.
Sun et al., "Dual-Color Fluorescence Imaging of Magnetic Nanoparticles in Live Cancer Cells Using Conjugated Polymer Probes," *Scientific Reports* 6:22368, 2016. (12 pages)
Sun et al., "High yield production of high molecular weight poly-(ethylene glycol)/ α-cyclodextrin polyrotaxanes by aqueous one-pot approach," *Polymer* 53:2884-2889, 2012.
Sun et al., "Ultrabright and Multicolorful Fluorescence of Amphiphilic Polyethyleneimine Polymer Dots for Efficiently Combined Imaging and Therapy," *Scientific Reports* 3:3036, 2013. (6 pages)
Teyssot et al., "Aromatic Nitrogen Donors for Efficient Copper(1)-NHC CuAAC under Reductant-Free Conditions," *Eur. J. Org. Chem.* 3507-3515, 2010.
Vybornyi et al., "Formation of Two-Dimensional Supramolecular Polymers by Amphiphilic Pyrene Oligomers," *Angew. Chem. Int. Ed.* 52:114488-11493, 2013.
Wang et al., "Fluorescence-Based Evaluation of the Partitioning of Lipids and Lipidated Peptides into Liquid-Ordered Lipid Microdomains: A Model for Molecular Partitioning into Lipid Rafts," *Biophysical Journal* 79:919-933, Aug. 2000.
Winiger et al., "Long-Distance Electronic Energy Transfer in Light-Harvesting Supramolecular Polymers," *Angew. Chem. Int. Ed.* 53:13609-13613, 2014.
Zhao et al., "Mussel-Inspired One-Pot Synthesis of a Fluorescent and Water-Soluble Polydopamine-Polyethyleneimine Copolymer," *Macromol. Rapid Commun.* 36:909-915, 2015.
U.S. Appl. No. 16/771,185, filed Jun. 9, 2020.
U.S. Appl. No. 16/934,912, filed Jul. 21, 2020.
U.S. Appl. No. 16/961,403, filed Jul. 10, 2020.
U.S. Appl. No. 16/961,414, filed Jul. 10, 2020.
U.S. Appl. No. 16/961,429, filed Jul. 10, 2020.

(56) References Cited

OTHER PUBLICATIONS

Dioubankova et al., "Oligonucleotides containing new fluorescent 1-phenylethynylpyrene and 9,10-bis(phenylethynyl)anthracene uridine-2'-carbamates: synthesis and properties," *Tetrahedron* 60:4617-4626, 2004.
Jain et al. "Current ADC Linker Chemistry," *Pharm. Res.* 32:3526-3540, 2015.
Malakhov et al., "1-(Phenylethynyl)pyrene and 9,10-Bis(phenylethynyl)anthracene, Useful Fluorescent Dyes for DNA Labeling: Excimer Formation and Energy Transfer," *Eur. J. Org. Chem*: 1298-1307, 2004.
Singh et al., "Multiplexed measurement of membrane protein populations," *Caplus* 2003:769075, 2003. (2 pages).
U.S. Appl. No. 17/602,689, filed Oct. 8, 2021.
U.S. Appl. No. 17/602,718, filed Oct. 8, 2021.
U.S. Appl. No. 17/602,722, filed Oct. 8, 2021.
U.S. Appl. No. 17/690,862, filed Mar. 9, 2022.
U.S. Appl. No. 17/764,874, filed Mar. 29, 2022.
U.S. Appl. No. 17/735,947, filed May 3, 2022.
U.S. Appl. No. 17/869,366, filed Jul. 20, 2022.
U.S. Appl. No. 17/891,807, filed Aug. 19, 2022.
U.S. Appl. No. 17/959,857, filed Oct. 4, 2022.
Kozma et al., "Fluorescent Ligands for Adenosine Receptors," *Bioorganic & Medicinal Chemistry Letters* 23: 26-36, 2013.
Leung et al., "7-Amino-4-Methyl-6-Sulfocoumarin-3-Acetic Acid: A Novel Blue Fluorescent Dye for Protein Labeling," *Bioorganic & Medicinal Chemistry Letters* 9: 2229-2232, 1999.
Petreus et al., "Polyester imides containing main-chain phosphorus," *Revue Roumaine de Chimie* 34(8):971-978, 1994 (with English Abstract).
"What is an Analyte?," Google Search, dated Mar. 22, 2018, retrieved from https://www.google.com/search?q=what+is+an+analyte&rlz=1C1GCEB_enUS775US775&oq=wha t+is+an+analyte&aqs-chrome..69i57j0l5.32311j0j7&s . . . 2 pages.
CAPLUS Accession No. 1975: 171341, Holy, "Nucleic acid components and their analogs. CLXXII. Aliphatic analogs of nucleosides, nucleotides, and oligonucleotides," Collection of Czechoslovak Chemical Communications 40(1):187-214, 1975. (1 page).
U.S. Appl. No. 16/639,499, filed Feb. 14, 2020.
U.S. Appl. No. 16/763,922, filed May 13, 2020.
U.S. Appl. No. 16/879,572, filed May 20, 2020.
U.S. Appl. No. 16/639,496, filed Feb. 14, 2020.

\* cited by examiner

WATER SOLUBLE FLUORESCENT OR COLORED DYES COMPRISING CONJUGATING GROUPS

BACKGROUND OF THE INVENTION

Field

The present invention is directed to novel fluorescent or colored dyes and methods for their preparation and use in various analytical methods.

Description of the Related Art

Fluorescent and/or colored dyes are known to be particularly suitable for applications in which a highly sensitive detection reagent is desirable. Dyes that are able to preferentially label a specific ingredient or component in a sample enable the researcher to determine the presence, quantity and/or location of that specific ingredient or component. In addition, specific systems can be monitored with respect to their spatial and temporal distribution in diverse environments.

Fluorescence and colorimetric methods are extremely widespread in chemistry and biology. These methods give useful information on the presence, structure, distance, orientation, complexation and/or location for biomolecules. In addition, time-resolved methods are increasingly used in measurements of dynamics and kinetics. As a result, many strategies for fluorescence or color labeling of biomolecules, such as nucleic acids and protein, have been developed.

Perylenes and related dyes have high photochemical persistency (chemical, thermal, and photochemical stability) and high fluorescence quanta yield and are used in a variety of reprographic processes, solar cells, photovoltaic devices, and dye lasers. However, perylene derivatives have been used primarily as pigments and fluorescent dyes. Perylene dyes of various colors and light-absorbing properties have been reported. For example, Becker S. et al, Chem. Eur. J., 6,213,984, (2000), report the synthesis of thermotropic perylenedicarboximide chromophores that show a color change from blue to orange. Perylene and related chromophores have seen limited use as biomolecular probes, apparently due to the strongly hydrophobic character of these types of molecules and difficulties with regiospecific labeling of biomolecules with the same.

There is thus a need in the art for water soluble dyes and biomarkers that permit visual or fluorescent detection of biomolecules without prior illumination or chemical or enzymatic activation. Ideally, such dyes and biomarkers should be intensely colored or fluorescent and should be available in a variety of colors and fluorescent wavelengths. The present invention fulfills this need and provides further related advantages.

BRIEF SUMMARY

In brief, the present invention is generally directed to compounds useful as water soluble, fluorescent or colored dyes and probes that enable visual detection of biomolecules and other analytes, as well as reagents for their preparation. Methods for visually detecting a biomolecule and for determining the size of a biomolecule are also described. The water soluble, fluorescent or colored dyes of the invention are intensely colored and/or fluorescent and can be readily observed by visual inspection or other means. In some embodiments the compounds may be observed without prior illumination or chemical or enzymatic activation. By appropriate selection of the dye, as described herein, visually detectable biomolecules of a variety of colors may be obtained.

In one embodiment, compounds having the following structure (I) are provided:

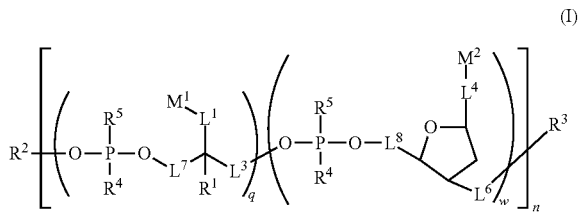

or a stereoisomer, tautomer or salt thereof, wherein $R^1$, $R^2$, $R^3$, $R^4$, $R^5$, $L^1$, $L^3$, $L^4$, $L^6$, $L^7$, $L^8$, $M^1$, $M^2$, q, w and n are as defined herein.

In another embodiment, a method for staining a sample is provided, the method comprises adding to said sample a representative compound as described herein in an amount sufficient to produce an optical response when said sample is illuminated at an appropriate wavelength.

In still other embodiments, the present disclosure provides a method for visually detecting a biomolecule, comprising:
 (a) providing a representative compound described herein; and
 (b) detecting the compound by its visible properties.

Other disclosed methods include a method for visually detecting a biomolecule, the method comprising:
 (a) admixing any of the disclosed compounds with one or more biomolecules; and
 (b) detecting the compound by its visible properties.

Other embodiments are directed to a composition comprising any one of the disclosed compounds and one or more biomolecules. Use of such composition in analytical methods for detection of the one or more biomolecules is also provided.

These and other aspects of the invention will be apparent upon reference to the following detailed description.

DETAILED DESCRIPTION OF THE INVENTION

In the following description, certain specific details are set forth in order to provide a thorough understanding of various embodiments of the invention. However, one skilled in the art will understand that the invention may be practiced without these details.

Unless the context requires otherwise, throughout the present specification and claims, the word "comprise" and variations thereof, such as, "comprises" and "comprising" are to be construed in an open, inclusive sense, that is, as "including, but not limited to".

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

"Amino" refers to the —NH$_2$ group.
"Carboxy" refers to the —CO$_2$H group.
"Cyano" refers to the —CN group.
"Formyl" refers to the —C(=O)H group.
"Hydroxy" or "hydroxyl" refers to the —OH group.
"Imino" refers to the =NH group.
"Nitro" refers to the —NO$_2$ group.
"Oxo" refers to the =O substituent group.
"Sulfhydryl" refers to the —SH group.
"Thioxo" refers to the =S group.

"Alkyl" refers to a straight or branched hydrocarbon chain group consisting solely of carbon and hydrogen atoms, which is saturated or unsaturated (i.e., contains one or more double and/or triple bonds), having from one to twelve carbon atoms ($C_1$-$C_{12}$ alkyl), preferably one to eight carbon atoms ($C_1$-$C_8$ alkyl) or one to six carbon atoms ($C_1$-$C_6$ alkyl), and which is attached to the rest of the molecule by a single bond, e.g., methyl, ethyl, n-propyl, 1-methylethyl (iso-propyl), n-butyl, n-pentyl, 1,1-dimethylethyl (t-butyl), 3-methylhexyl, 2-methylhexyl, ethenyl, prop-1-enyl, but-1-enyl, pent-1-enyl, penta-1,4-dienyl, ethynyl, propynyl, butynyl, pentynyl, hexynyl, and the like. Unless stated otherwise specifically in the specification, an alkyl group may be optionally substituted.

"Alkylene" or "alkylene chain" refers to a straight or branched divalent hydrocarbon chain linking the rest of the molecule to a substituent group, consisting solely of carbon and hydrogen, which is saturated or unsaturated (i.e., contains one or more double and/or triple bonds), and having from one to twelve carbon atoms, e.g., methylene, ethylene, propylene, n-butylene, ethenylene, propenylene, n-butenylene, propynylene, n-butynylene, and the like. The alkylene chain is attached to the rest of the molecule through a single or double bond and to the substituent group through a single or double bond. The points of attachment of the alkylene chain to the rest of the molecule and to the substituent group can be through one carbon or any two carbons within the chain. Unless stated otherwise specifically in the specification, an alkylene chain may be optionally substituted.

"Aminoalkylene" refers to an alkylene, as defined, comprising one or more amino substituents. Unless stated otherwise specifically in the specification, aminoalkylene groups are optionally substituted "Alkoxy" refers to a group of the formula —OR$_a$ where R$_a$ is an alkyl group as defined above containing one to twelve carbon atoms. Unless stated otherwise specifically in the specification, an alkoxy group may be optionally substituted.

"Alkylamino" refers to a group of the formula —NHR$_a$ or —NR$_a$R$_a$ where each R$_a$ is, independently, an alkyl group as defined above containing one to twelve carbon atoms. Unless stated otherwise specifically in the specification, an alkylamino group may be optionally substituted.

"Alkylether" refers to any alkyl group as defined above, wherein at least one carbon-carbon bond is replaced with a carbon-oxygen bond. The carbon-oxygen bond may be on the terminal end (as in an alkoxy group) or the carbon oxygen bond may be internal (i.e., C—O—C). Alkylethers include at least one carbon oxygen bond, but may include more than one. For example, polyethylene glycol (PEG) is included within the meaning of alkylether. Unless stated otherwise specifically in the specification, an alkylether group may be optionally substituted. For example, in some embodiments and alkylether is substituted with an alcohol or phosphate.

"Alkylenether" refers to an alkylene group as defined above, wherein at least one carbon-carbon bond is replaced with a carbon-oxygen bond. The carbon-oxygen bond may be on the terminal end (as in an alkoxy group) or the carbon oxygen bond may be internal (i.e., C—O—C). Alkylenethers include at least one carbon oxygen bond, but may include more than one (i.e., a "polyalkylenether"). PEG linking groups are examples of polyalkylenethers. "Hydroxylpolyalkylenether" refers to a polyalkylenether comprising at least on hydroxyl substituent.

"Aminopolyalkylenether" refers to a polyalkylenether comprising at least one amino (including alkylamino, arylamino and aralkylamino) substituent. Unless stated otherwise specifically in the specification, alkylenether, polyalkylenether, hydroxylpolyalkylenether and aminopolyalkylenether groups, are optionally substituted.

"Alkylphospho" refers to the —RP(=O)(R$_a$)R$_b$ group, wherein R is an alkylene group, R$_a$ is OH, O$^-$ or OR$_c$; and R$_b$ is —Oalkyl or —Oalkylether, wherein R$_c$ is a counter ion (e.g., Na+ and the like). Unless stated otherwise specifically in the specification, an alkylphospho group may be optionally substituted. For example, in certain embodiments, the —Oalkyl or —Oalkylether moiety (R$_b$) in a alkylphospho group is optionally substituted with one or more of hydroxyl, amino, sulfhydryl, phosphate, thiophosphate, phosphoalkyl, thiophosphoalkyl, phosphoalkylether or thiophosphoalkylether. "Oalkylphospho is an alkylphospho group connected to the remainder of the molecule via an oxygen atom. Unless stated otherwise specifically in the specification, an Oalkylphospho group may be optionally substituted.

"Alkyetherphospho" refers to the —RP(=O)(R$_a$)R$_b$ group, wherein R is an alkylenether group, R$_a$ is OH, O$^-$ or OR$_E$; and R$_b$ is —Oalkyl or —Oalkylether, wherein R$_c$ is a counter ion (e.g., Na+ and the like). Unless stated otherwise specifically in the specification, an alkyletherphopsho group may be optionally substituted. For example, in certain embodiments, the —Oalkyl or —Oalkylether moiety (R$_b$) in an alkyletherphospho group is optionally substituted with one or more of hydroxyl, amino, sulfhydryl, phosphate, thiophosphate, phosphoalkyl, thiophosphoalkyl, phosphoalkylether or thiophosphoalkylether. "Oalkyletherphospho is an alkyletherphospho group connected to the remainder of the molecule via an oxygen atom. Unless stated otherwise specifically in the specification, an Oalkyletherphospho group may be optionally substituted.

"Alkylthiophospho" refers to the —P(=R$_a$)(R$_b$)R$_c$ group, wherein R$_a$ is O or S, R$_b$ is OH, O$^-$, S$^-$, OR$_d$ or SR$_d$; and R$_c$ is —Oalkyl or —Oalkylether, wherein R$_d$ is a counter ion (e.g., Na+ and the like) and provided that: R$_a$ is S or R$_b$ is S$^-$ or SR$_d$; or provided that R$_a$ is S and R$_b$ is S$^-$ or SR$_d$. Unless stated otherwise specifically in the specification, a alkylthiophospho group may be optionally substituted. For example, in certain embodiments, the —Oalkyl or —Oalkylether moiety in a alkythiophospho group is optionally substituted with one or more of hydroxyl, amino, sulfhydryl, phosphate, thiophosphate, phosphoalkyl, thiophosphoalkyl, phosphoalkylether or thiophosphoalkylether. "Oalkylthiophospho is a alkylthiophospho group connected to the remainder of the molecule via an oxygen atom. Unless stated otherwise specifically in the specification, an Oalkylthiophospho group may be optionally substituted.

"Alkyletherthiophospho" refers to the —P(=R$_a$)(R$_b$)R$_c$ group, wherein R$_a$ is O or S, R$_b$ is OH, O$^-$, S$^-$, OR$_d$ or SR$_d$; and R$_c$ is —Oalkyl or —Oalkylether, wherein R$_d$ is a counter ion (e.g., Na+ and the like) and provided that: $R_a$ is S or $R_b$ is S⁻ or $SR_d$; or provided that $R_a$ is S and $R_b$ is S⁻ or $SR_d$. Unless stated otherwise specifically in the specification, an alkyletherthiophospho group may be optionally substituted. For example, in certain embodiments, the —Oalkyl or —Oalkylether moiety in a alkyletherthiophospho group is optionally substituted with one or more of hydroxyl, amino, sulfhydryl, phosphate, thiophosphate, phosphoalkyl, thiophosphoalkyl, phosphoalkylether or thiophosphoalkylether. "Oalkyletherthiophospho is an alkyletherthiophospho group connected to the remainder of the molecule via an oxygen atom. Unless stated otherwise specifically in the specification, an Oalkyletherthiophospho group may be optionally substituted.

"Amide" refers to the —$NR_aR_b$ radical, wherein $R_a$ and $R_b$ are independently H, alkyl or aryl. Unless stated otherwise specifically in the specification, an amide group may be optionally substituted.

"Aryl" refers to a carbocyclic ring system group comprising 6 to 18 carbon atoms and at least one carbocyclic aromatic ring. For purposes of this invention, the aryl group may be a monocyclic, bicyclic, tricyclic or tetracyclic ring system, which may include fused or bridged ring systems. Aryl groups include, but are not limited to, aryl groups derived from aceanthrylene, acenaphthylene, acephenanthrylene, anthracene, azulene, benzene, chrysene, fluoranthene, fluorene, as-indacene, s-indacene, indane, indene, naphthalene, phenalene, phenanthrene, pleiadene, pyrene, and triphenylene. Unless stated otherwise specifically in the specification, the term "aryl" or the prefix "ar-" (such as in "aralkyl") is meant to include aryl groups that are optionally substituted.

"Aryloxy" refers to a group of the formula —$OR_a$, where $R_a$ is an aryl moiety as defined above, for example phenoxy and the like. Unless stated otherwise specifically in the specification, an aryloxy group may be optionally substituted.

"Aralkyl" refers to a group of the formula —$R_b$—$R_c$ where $R_b$ is an alkylene chain as defined above and $R_c$ is one or more aryl groups as defined above, for example, benzyl, diphenylmethyl and the like. Unless stated otherwise specifically in the specification, an aralkyl group may be optionally substituted.

"Oaralkyl" is an aralkyl group which is connected to the remainder of the molecule via an oxygen linkage. "ODMT" refers to dimethoxytrityl linked to the rest of the molecule via an O atom. Unless stated otherwise specifically in the specification, an Oaralkyl group may be optionally substituted.

"Cyanoalkyl" refers to an alkyl group comprising at least one cyano substituent. The one or more —CN substituents may be on a primary, secondary or tertiary carbon atom. Unless stated otherwise specifically in the specification, a cyanoalkyl group may be optionally substituted.

A "carbocyclic ring" is a ring wherein each ring atom is carbon. Carbocyclic rings may saturated or unsaturated, including aromatic rings. Unless stated otherwise specifically in the specification, a carbocylic group is optionally substituted.

Cycloalkyl" refers to a stable non-aromatic monocyclic or polycyclic carbocyclic ring, which may include fused or bridged ring systems, having from three to fifteen carbon atoms, preferably having from three to ten carbon atoms, and which is saturated or unsaturated and attached to the rest of the molecule by a single bond. Monocyclic cycloalkyl groups include, for example, cyclopropyl, cyclobutyl, cyclopentyl, cyclohexyl, cycloheptyl, and cyclooctyl. Polycyclic cycloalkyl groups include, for example, adamantyl, norbornyl, decalinyl, 7,7-dimethyl-bicyclo[2.2.1]heptanyl, and the like. Unless otherwise stated specifically in the specification, a cycloalkyl group may be optionally substituted.

"Cycloalkylalkyl" refers to a group of the formula —$R_bR_d$ where $R_b$ is an alkylene chain as defined above and $R_d$ is a cycloalkyl group as defined above. Unless stated otherwise specifically in the specification, a cycloalkylalkyl group may be optionally substituted.

"Multicyclic" refers to any molecule having more than one ring. The rings may be either, fused, spirocyclic or separated by one or more atoms (e.g., linked via an acyclic linker).

"Spirocyclic" refers to a multicyclic molecule wherein two rings share a single carbon atom.

"Fused" refers to any ring structure described herein which is fused to an existing ring structure in the compounds of the invention. When the fused ring is a heterocyclyl ring or a heteroaryl ring, any carbon atom on the existing ring structure which becomes part of the fused heterocyclyl ring or the fused heteroaryl ring may be replaced with a nitrogen atom.

"Halo" or "halogen" refers to bromo, chloro, fluoro or iodo.

"Haloalkyl" refers to an alkyl group, as defined above, that is substituted by one or more halo groups, as defined above, e.g., trifluoromethyl, difluoromethyl, trichloromethyl, 2,2,2-trifluoroethyl, 1,2-difluoroethyl, 3-bromo-2-fluoropropyl, 1,2-dibromoethyl, and the like. Unless stated otherwise specifically in the specification, a haloalkyl group may be optionally substituted.

"Heterocyclyl" or "heterocyclic ring" refers to a stable 3- to 18-membered aromatic (heteroaryl) or non-aromatic ring group, wherein at least one ring atom is a heteroatom selected from the group consisting of nitrogen, oxygen and sulfur, and the remaining ring atoms are selected from the group consisting of carbon nitrogen, oxygen and sulfur. Unless stated otherwise specifically in the specification, the heterocyclyl group may be a monocyclic, bicyclic, tricyclic or tetracyclic ring system, which may include fused or bridged ring systems; and the nitrogen, carbon or sulfur atoms in the heterocyclyl group may be optionally oxidized; the nitrogen atom may be optionally quaternized; and the heterocyclyl group may be partially or fully saturated. Examples of such heterocyclyl groups include, but are not limited to, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, and 1,1-dioxothiomorpholinyl. Unless stated otherwise specifically in the specification, Unless stated otherwise specifically in the specification, a heterocyclyl group may be optionally substituted.

"N-heterocyclyl" refers to a heterocyclyl group as defined above containing at least one nitrogen and where the point of attachment of the heterocyclyl group to the rest of the molecule is through a nitrogen atom in the heterocyclyl group. Unless stated otherwise specifically in the specification, a N-heterocyclyl group may be optionally substituted.

"Heterocyclylalkyl" refers to a group of the formula —$R_bR_e$ where $R_b$ is an alkylene chain as defined above and $R_e$ is a heterocyclyl group as defined above, and if the heterocyclyl is a nitrogen-containing heterocyclyl, the heterocyclyl may be attached to the alkyl group at the nitrogen atom. Unless stated otherwise specifically in the specification, a heterocyclylalkyl group may be optionally substituted.

"Heteroaryl" refers to a 5- to 14-membered ring system group comprising one to thirteen carbon atoms, one to six heteroatoms selected from the group consisting of nitrogen, oxygen and sulfur, and at least one aromatic ring. For purposes of this invention, the heteroaryl group may be a monocyclic, bicyclic, tricyclic or tetracyclic ring system, which may include fused or bridged ring systems; and the nitrogen, carbon or sulfur atoms in the heteroaryl group may be optionally oxidized; the nitrogen atom may be optionally quaternized. Examples include, but are not limited to, azepinyl, acridinyl, benzimidazolyl, benzothiazolyl, benzindolyl, benzodioxolyl, benzofuranyl, benzooxazolyl, benzothiazolyl, benzothiadiazolyl, benzo[b][1,4]dioxepinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzotriazolyl, benzo[4,6]imidazo[1,2-a]pyridinyl, carbazolyl, cinnolinyl, dibenzofuranyl, dibenzothiophenyl, furanyl, furanonyl, isothiazolyl, imidazolyl, indazolyl, indolyl, indazolyl, isoindolyl, indolinyl, isoindolinyl, isoquinolyl, indolizinyl, isoxazolyl, naphthyridinyl, oxadiazolyl, 2-oxoazepinyl, oxazolyl, oxiranyl, 1-oxidopyridinyl, 1-oxidopyrimidinyl, 1-oxidopyrazinyl, 1-oxidopyridazinyl, 1-phenyl-1H-pyrrolyl, phenazinyl, phenothiazinyl, phenoxazinyl, phthalazinyl, pteridinyl, purinyl, pyrrolyl, pyrazolyl, pyridinyl, pyrazinyl, pyrimidinyl, pyridazinyl, quinazolinyl, quinoxalinyl, quinolinyl, quinuclidinyl, isoquinolinyl, tetrahydroquinolinyl, thiazolyl, thiadiazolyl, triazolyl, tetrazolyl, triazinyl, and thiophenyl (i.e., thienyl). Unless stated otherwise specifically in the specification, a heteroaryl group may be optionally substituted.

"N-heteroaryl" refers to a heteroaryl group as defined above containing at least one nitrogen and where the point of attachment of the heteroaryl group to the rest of the molecule is through a nitrogen atom in the heteroaryl group. Unless stated otherwise specifically in the specification, an N-heteroaryl group may be optionally substituted.

"Heteroarylalkyl" refers to a group of the formula —$R_b R_f$— where $R_b$ is an alkylene chain as defined above and $R_f$ is a heteroaryl group as defined above. Unless stated otherwise specifically in the specification, a heteroarylalkyl group may be optionally substituted.

"Hydroxylalkyl" refers to an alkyl group comprising at least one hydroxyl substituent. The one or more —OH substituents may be on a primary, secondary or tertiary carbon atom. Unless stated otherwise specifically in the specification, hydroxyalkyl group may be optionally substituted.

"Hydroxylalkylene" refers to an alkylene group comprising at least one hydroxyl substituent. The one or more —OH substituents may be on a primary, secondary or tertiary carbon atom. Unless stated otherwise specifically in the specification, hydroxyalkylene group is optionally substituted.

"Hydroxylalkylether" refers to an alkylether group comprising at least one hydroxyl substituent. The one or more —OH substituents may be on a primary, secondary or tertiary carbon atom. Unless stated otherwise specifically in the specification, hydroxyalkylether group may be optionally substituted.

"Phosphate" refers to the —OP(=O)($R_a$)$R_b$ group, wherein $R_a$ is OH, O⁻ or O$R_c$; and $R_b$ is OH, O⁻, O$R_c$, a further phosphate group (as in diphosphate and triphosphate) thiophosphate, phosphoalkyl, thiophosphoalkyl, phosphoalkylether or thiophosphoalkylether, wherein $R_c$ is a counter ion (e.g., Na+ and the like). Unless stated otherwise specifically in the specification, a phosphate group may be optionally substituted.

"Phospho" refers to the divalent —OP(=O)($R_a$)O— group, wherein $R_a$ is O⁻ or O$R_c$; wherein $R_c$ is a counter ion (e.g., H+, Na+ and the like).

"Phosphoalkyl" refers to the —P(=O)($R_a$)$R_b$ group, wherein $R_a$ is OH, O⁻ or O$R_c$; and $R_b$ is —Oalkyl, wherein $R_c$ is a counter ion (e.g., Na+ and the like). Unless stated otherwise specifically in the specification, a phosphoalkyl group may be optionally substituted. For example, in certain embodiments, the —Oalkyl moiety in a phosphoalkyl group is optionally substituted with one or more of hydroxyl, amino, sulfhydryl or a phosphate, thiophosphate, phosphoalkyl, thiophosphoalkyl, phosphoalkylether or thiophosphoalkylether. "Ophosphoalkyl is a phosphoalkyl group connected to the remainder of the molecule via an oxygen atom. Unless stated otherwise specifically in the specification, an ophosphoalkyl group may be optionally substituted.

"Phosphoalkylene" refers to the divalent —OP(=O)($R_a$)$R_b$— group, wherein $R_a$ is O⁻ or O$R_c$; and $R_b$ is —Oalkylene, wherein $R_c$ is a counter ion (e.g., H+, Na+ and the like). Unless stated otherwise specifically in the specification, a phosphoalkylene group is optionally substituted. For example, in certain embodiments, the alkylene moiety in a phosphoalkyl group is optionally substituted with one or more of hydroxyl, amino, sulfhydryl or a phosphate, thiophosphate, phosphoalkyl, thiophosphoalkyl, phosphoalkylether or thiophosphoalkylether, which substituent is optionally substituted.

"Phosphoalkylether" refers to the —P(=O)($R_a$)$R_b$ group, wherein $R_a$ is OH, O⁻ or O$R_c$; and $R_b$ is —Oalkylether, wherein $R_c$ is a counter ion (e.g., Na+ and the like). Unless stated otherwise specifically in the specification, a phosphoalkylether group may be optionally substituted. For example, in certain embodiments, the —Oalkylether moiety in a phosphoalkylether group is optionally substituted with one or more of hydroxyl, amino, sulfhydryl, phosphate, thiophosphate, phosphoalkyl, thiophosphoalkyl, phosphoalkylether or thiophosphoalkylether. "Ophosphoalkylether is a phosphoalkylether group connected to the remainder of the molecule via an oxygen atom. Unless stated otherwise specifically in the specification, an ophosphoalkylether group may be optionally substituted.

"Sulfhydrylalkyl" refers to an alkyl group comprising at least one sulfhydryl substituent. The one or more —SH substituents may be on a primary, secondary or tertiary carbon atom. Unless stated otherwise specifically in the specification, a sulfhydrylalkyl group may be optionally substituted.

"Sulfhydrylalkylether" refers to an alkylether group comprising at least one sulfhydryl substituent. The one or more —SH substituents may be on a primary, secondary or tertiary carbon atom. Unless stated otherwise specifically in the specification, a sulfhydrylalkylether group may be optionally substituted.

"Sulfonate" refers to the —OS(O)$_2$$R_a$ group, wherein $R_a$ is alkyl or aryl. Unless stated otherwise specifically in the specification, a sulfonate group may be optionally substituted.

"Thioalkyl" refers to a group of the formula —S$R_a$ where $R_a$ is an alkyl group as defined above containing one to twelve carbon atoms. Unless stated otherwise specifically in the specification, a thioalkyl group may be optionally substituted.

"Thiophosphate" refers to the —OP(=$R_a$)($R_b$)$R_c$ group, wherein $R_a$ is O or S, $R_b$ is OH, O⁻, S⁻, $OR_d$ or $SR_d$; and $R_c$ is OH, O⁻, $OR_d$, phosphate group thiophosphate, phosphoalkyl, thiophosphoalkyl, phosphoalkylether or thiophosphoalkylether, wherein $R_d$ is a counter ion (e.g., Na+ and the like) and provided that: $R_a$ is S or $R_b$ is S⁻ or $SR_d$; or provided that $R_a$ is S and $R_b$ is S⁻ or $SR_d$. Unless stated otherwise specifically in the specification, a thiophosphate group may be optionally substituted.

"Thiophospho" refers to the divalent —$R_dP$(=$R_a$)($R_b$)$R_c$— group, wherein $R_a$, $R_c$ and $R_d$ are each independently O or S; $R_b$ is O⁻, S⁻, $OR_e$ or $SR_e$; wherein $R_e$ is a counter ion (e.g., H⁺, Na+ and the like) and provided that: $R_a$ is S; or $R_b$ is S⁻ or $SR_e$; or $R_c$ is S; or Rd is S, or combinations thereof.

"Thiophosphoalkyl" refers to the —P(=$R_a$)($R_b$)$R_c$ group, wherein $R_a$ is O or S, $R_b$ is OH, O⁻, S⁻, $OR_d$ or $SR_d$; and $R_c$ is —Oalkyl, wherein $R_d$ is a counter ion (e.g., Na+ and the like) and provided that: $R_a$ is S or $R_b$ is S⁻ or $SR_d$; or provided that $R_a$ is S and $R_b$ is S⁻ or $SR_d$. Unless stated otherwise specifically in the specification, a thiophosphoalkyl group may be optionally substituted. For example, in certain embodiments, the —Oalkyl moiety in a thiophosphoalkyl group is optionally substituted with one or more of hydroxyl, amino, sulfhydryl, phosphate, thiophosphate, phosphoalkyl, thiophosphoalkyl, phosphoalkylether or thiophosphoalkylether. "Othiophosphoalkyl is a thiophosphoalkyl group connected to the remainder of the molecule via an oxygen atom. Unless stated otherwise specifically in the specification, an Othiophosphoalkyl group may be optionally substituted.

"Thiophosphoalkylene" refers to the divalent —$R_dP$(=$R_a$)($R_b$)$R_c$— group, wherein $R_a$ and $R_d$ are each independently O or S, $R_b$ is O⁻, S⁻, $OR_e$ or $SR_e$; and $R_c$ is —Oalkylene or —Salkylene, wherein $R_e$ is a counter ion (e.g., H+, Na+ and the like) and provided that: $R_a$ is S; or $R_b$ is S⁻ or $SR_e$; or Rc is —Salkylene; or $R_d$ is S, or combinations thereof. Unless stated otherwise specifically in the specification, a thiophosphoalkylene group is optionally substituted. For example, in certain embodiments, the alkylene moiety in a thiophosphoalkylene group is optionally substituted with one or more of hydroxyl, amino, sulfhydryl, phosphate, thiophosphate, phosphoalkyl, thiophosphoalkyl, phosphoalkylether or thiophosphoalkylether, which substituents are optionally substituted.

"Thiophosphoalkylether" refers to the —P(=$R_a$)($R_b$)$R_c$ group, wherein $R_a$ is O or S, $R_b$ is OH, O⁻, S⁻, $OR_d$ or $SR_d$; and $R_c$ is —Oalkylether, wherein $R_d$ is a counter ion (e.g., Na+ and the like) and provided that: $R_a$ is S or $R_b$ is S⁻ or $SR_d$; or provided that $R_a$ is S and $R_b$ is S⁻ or $SR_d$. Unless stated otherwise specifically in the specification, a thiophosphoalkylether group may be optionally substituted. For example, in certain embodiments, the —Oalkylether moiety in a thiophosphoalkyl group is optionally substituted with one or more of hydroxyl, amino, sulfhydryl, phosphate, thiophosphate, phosphoalkyl, thiophosphoalkyl, phosphoalkylether or thiophosphoalkylether. "Othiophosphoalkylether is a thiophosphoalkylether group connected to the remainder of the molecule via an oxygen atom. Unless stated otherwise specifically in the specification, an Othiophosphoalkylether group may be optionally substituted.

The term "substituted" used herein means any of the above groups (i.e., alkyl, alkylene, aminoalkylene, alkoxy, alkylamino, alkylether, alkylenether, polyalkylenether, hydroxylpolyalkylenether, aminopolyalkylenether, alkylphospho, alkyletherphospho, alkylthiophospho, alkyletherthiophospho, amide, thioalkyl, aryl, aryloxy, aralkyl, Oaralkyl, cyanoalkyl, carbocyclic ring, cycloalkyl, cycloalkylalkyl, haloalkyl, heterocyclyl, N-heterocyclyl, heterocyclylalkyl, heteroaryl, N-heteroaryl, heteroarylalkyl, hydroxylalkyl, a hydroxylalkylene, aminoalkyl, hydroxylalkylether, phosphoalkyl, phosphoalkylene, phosphoalkylether, sulfhydrylalkyl, sulfhydrylalkylether, sulfonate, thiophosphoalkyl, thiophosphoalkylene, and/or thiophosphoalkylether) wherein at least one hydrogen atom is replaced by a bond to a non-hydrogen atoms such as, but not limited to: a halogen atom such as F, Cl, Br, and I; an oxygen atom in groups such as hydroxyl groups, alkoxy groups, and ester groups; a sulfur atom in groups such as thiol groups, thioalkyl groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as trialkylsilyl groups, dialkylarylsilyl groups, alkyldiarylsilyl groups, and triarylsilyl groups; and other heteroatoms in various other groups. "Substituted" also means any of the above groups in which one or more hydrogen atoms are replaced by a higher-order bond (e.g., a double- or triple-bond) to a heteroatom such as oxygen in oxo, carbonyl, carboxyl, and ester groups; and nitrogen in groups such as imines, oximes, hydrazones, and nitriles. For example, "substituted" includes any of the above groups in which one or more hydrogen atoms are replaced with —$NR_gR_h$, —$NR_gC$(=O)$R_h$, —$NR_gC$(=O)$NR_gR_h$, —$NR_gC$(=O)$OR_h$, —$NR_gSO_2R_h$, —OC(=O)$NR_gR_h$, —$OR_g$, —$SR_g$, —$SOR_g$, —$SO_2R_g$, —$OSO_2R_g$, —$SO_2OR_g$, =$NSO_2R_g$, and —$SO_2NR_gR_h$. "Substituted also means any of the above groups in which one or more hydrogen atoms are replaced with —C(=O)$R_g$, —C(=O)$OR_g$, —C(=O)$NR_gR_h$, —$CH_2SO_2R_g$, —$CH_2SO_2NR_gR_h$. In the foregoing, $R_g$ and $R_h$ are the same or different and independently hydrogen, alkyl, alkoxy, alkylamino, thioalkyl, aryl, aralkyl, cycloalkyl, cycloalkylalkyl, haloalkyl, heterocyclyl, N-heterocyclyl, heterocyclylalkyl, heteroaryl, N-heteroaryl and/or heteroarylalkyl. "Substituted" further means any of the above groups in which one or more hydrogen atoms are replaced by a bond to an amino, cyano, hydroxyl, imino, nitro, oxo, thioxo, halo, alkyl, alkoxy, alkylamino, thioalkyl, aryl, aralkyl, cycloalkyl, cycloalkylalkyl, haloalkyl, heterocyclyl, N-heterocyclyl, heterocyclylalkyl, heteroaryl, N-heteroaryl and/or heteroarylalkyl group. In addition, each of the foregoing substituents may also be optionally substituted with one or more of the above substituents.

"Conjugation," with respect to the "M" moiety, refers to the overlap of one p-orbital with another p-orbital across an intervening sigma bond. Conjugation may occur in cyclic or acyclic compounds. A "degree of conjugation" refers to the overlap of at least one p-orbital with another p-orbital across an intervening double bond. For example, 1, 3-butadine has one degree of conjugation, while benzene and other aromatic compounds typically have multiple degrees of conjugation. Fluorescent and colored compounds typically comprise at least one degree of conjugation.

"Fluorescent" refers to a molecule which is capable of absorbing light of a particular frequency and emitting light of a different frequency. Fluorescence is well-known to those of ordinary skill in the art.

"Colored" refers to a molecule which absorbs light within the colored spectrum (i.e., red, yellow, blue and the like).

A "linker" refers to a contiguous chain of at least one atom, such as carbon, oxygen, nitrogen, sulfur, phosphorous and combinations thereof, which connects a portion of a molecule to another portion of the same molecule or to a different molecule, moiety or solid support (e.g., microparticle). Linkers may connect the molecule via a covalent bond or other means, such as ionic or hydrogen bond interactions.

For purposes of the present invention, the term "biomolecule" refers to any of a variety of biological materials, including nucleic acids, carbohydrates, amino acids, polypeptides, glycoproteins, hormones, aptamers and mixtures thereof. More specifically, the term is intended to include, without limitation, RNA, DNA, oligonucleotides, modified or derivatized nucleotides, enzymes, receptors, prions, receptor ligands (including hormones), antibodies, antigens, and toxins, as well as bacteria, viruses, blood cells, and tissue cells. The visually detectable biomolecules of the invention (i.e., compounds of structure (I) having a biomolecule linked thereto) are prepared, as further described herein, by contacting a biomolecule with a compound having a reactive group that enables attachment of the biomolecule to the compound via any available atom or functional group, such as an amino, hydroxy, carboxyl, or sulfhydryl group on the biomolecule.

The terms "visible" and "visually detectable" are used herein to refer to substances that are observable by visual inspection, without prior illumination, or chemical or enzymatic activation. Such visually detectable substances absorb and emit light in a region of the spectrum ranging from about 300 to about 900 nm. Preferably, such substances are intensely colored, preferably having a molar extinction coefficient of at least about 40,000, more preferably at least about 50,000, still more preferably at least about 60,000, yet still more preferably at least about 70,000, and most preferably at least about 80,000 $M^{-1}cm^{-1}$. The biomolecules of the invention may be detected by observation with the naked eye, or with the aid of a optically based detection device, including, without limitation, absorption spectrophotometers, transmission light microscopes, digital cameras and scanners. Visually detectable substances are not limited to those which emit and/or absorb light in the visible spectrum. Substances which emit and/or absorb light in the ultraviolet (UV) region (about 10 nm to about 400 nm), infrared (IR) region (about 700 nm to about 1 mm), and substances emitting and/or absorbing in other regions of the electromagnetic spectrum are also included with the scope of "visually detectable" substances.

For purposes of the invention, the term "photostable visible dye" refers to a chemical moiety that is visually detectable, as defined hereinabove, and is not significantly altered or decomposed upon exposure to light. Preferably, the photostable visible dye does not exhibit significant bleaching or decomposition after being exposed to light for at least one hour. More preferably, the visible dye is stable after exposure to light for at least 12 hours, still more preferably at least 24 hours, still yet more preferably at least one week, and most preferably at least one month. Nonlimiting examples of photostable visible dyes suitable for use in the compounds and methods of the invention include azo dyes, thioindigo dyes, quinacridone pigments, dioxazine, phthalocyanine, perinone, diketopyrrolopyrrole, quinophthalone, and truarycarbonium.

As used herein, the term "perylene derivative" is intended to include any substituted perylene that is visually detectable. However, the term is not intended to include perylene itself. The terms "anthracene derivative", "naphthalene derivative", and "pyrene derivative" are used analogously. In some preferred embodiments, a derivative (e.g., perylene, pyrene, anthracene or naphthalene derivative) is an imide, bisimide or hydrazamimide derivative of perylene, anthracene, naphthalene, or pyrene.

The visually detectable biomolecules of the invention are useful for a wide variety of biochemical and biomedical applications in which there is a need to determine the presence, location, or quantity of a particular biomolecule. In another aspect, therefore, the invention provides a method for visually detecting a biomolecule, comprising: (a) providing a biological system with a visually detectable biomolecule comprising the compound of structure (I) linked to a biomolecule; and (b) detecting the biomolecule by its visible properties. For purposes of the invention, the phrase "detecting the biomolecule by its visible properties" means that the biomolecule, without illumination or chemical or enzymatic activation, is observed with the naked eye, or with the aid of a optically based detection device, including, without limitation, absorption spectrophotometers, transmission light microscopes, digital cameras and scanners. A densitometer may be used to quantify the amount of visually detectable biomolecule present. For example, the relative quantity of the biomolecule in two samples can be determined by measuring relative optical density. If the stoichiometry of dye molecules per biomolecule is known, and the extinction coefficient of the dye molecule is known, then the absolute concentration of the biomolecule can also be determined from a measurement of optical density. As used herein, the term "biological system" is used to refer to any solution or mixture comprising one or more biomolecules in addition to the visually detectable biomolecule. Nonlimiting examples of such biological systems include cells, cell extracts, tissue samples, electrophoretic gels, assay mixtures, and hybridization reaction mixtures.

"Microparticle" is a type of solid support and refers to any of a number of small particles useful for attachment to compounds of the invention, including, but not limited to, glass beads, magnetic beads, polymeric beads, nonpolymeric beads, and the like. In certain embodiments, a microparticle comprises polystyrene beads.

"Base pairing moiety" refers to a heterocyclic moiety capable of hybridizing with a complementary heterocyclic moiety via hydrogen bonds (e.g., Watson-Crick base pairing). Base pairing moieties include natural and unnatural bases. Non-limiting examples of base pairing moieties are RNA and DNA bases such adenosine, guanosine, thymidine, cytosine and uridine and analogues thereof.

The invention disclosed herein is also meant to encompass all compounds of structure (I) being isotopically-labelled by having one or more atoms replaced by an atom having a different atomic mass or mass number. Examples of isotopes that can be incorporated into the disclosed compounds include isotopes of hydrogen, carbon, nitrogen, oxygen, phosphorous, fluorine, chlorine, and iodine, such as $^{2}H$, $^{3}H$, $^{11}C$, $^{13}C$, $^{14}C$, $^{13}N$, $^{15}N$, $^{15}O$, $^{17}O$, $^{18}O$, $^{31}P$, $^{32}P$, $^{35}S$, $^{18}F$, $^{36}Cl$, $^{123}I$, and $^{125}I$, respectively.

Isotopically-labeled compounds of structure (I) can generally be prepared by conventional techniques known to those skilled in the art or by processes analogous to those described below and in the following Examples using an appropriate isotopically-labeled reagent in place of the non-labeled reagent previously employed.

"Stable compound" and "stable structure" are meant to indicate a compound that is sufficiently robust to survive isolation to a useful degree of purity from a reaction mixture, and formulation into an efficacious therapeutic agent.

"Optional" or "optionally" means that the subsequently described event or circumstances may or may not occur, and that the description includes instances where said event or circumstance occurs and instances in which it does not. For example, "optionally substituted alkyl" means that the alkyl group may or may not be substituted and that the description includes both substituted alkyl groups and alkyl groups having no substitution.

"Salt" includes both acid and base addition salts.

"Acid addition salt" refers to those salts which are formed with inorganic acids such as, but not limited to, hydrochloric acid, hydrobromic acid, sulfuric acid, nitric acid, phosphoric acid and the like, and organic acids such as, but not limited to, acetic acid, 2,2-dichloroacetic acid, adipic acid, alginic acid, ascorbic acid, aspartic acid, benzenesulfonic acid, benzoic acid, 4-acetamidobenzoic acid, camphoric acid, camphor-10-sulfonic acid, capric acid, caproic acid, caprylic acid, carbonic acid, cinnamic acid, citric acid, cyclamic acid, dodecylsulfuric acid, ethane-1,2-disulfonic acid, ethanesulfonic acid, 2-hydroxyethanesulfonic acid, formic acid, fumaric acid, galactaric acid, gentisic acid, glucoheptonic acid, gluconic acid, glucuronic acid, glutamic acid, glutaric acid, 2-oxo-glutaric acid, glycerophosphoric acid, glycolic acid, hippuric acid, isobutyric acid, lactic acid, lactobionic acid, lauric acid, maleic acid, malic acid, malonic acid, mandelic acid, methanesulfonic acid, mucic acid, naphthalene-1,5-disulfonic acid, naphthalene-2-sulfonic acid, 1-hydroxy-2-naphthoic acid, nicotinic acid, oleic acid, orotic acid, oxalic acid, palmitic acid, pamoic acid, propionic acid, pyroglutamic acid, pyruvic acid, salicylic acid, 4-aminosalicylic acid, sebacic acid, stearic acid, succinic acid, tartaric acid, thiocyanic acid, p-toluenesulfonic acid, trifluoroacetic acid, undecylenic acid, and the like.

"Base addition salt" refers to those salts which are prepared from addition of an inorganic base or an organic base to the free acid. Salts derived from inorganic bases include, but are not limited to, sodium, potassium, lithium, ammonium, calcium, magnesium, iron, zinc, copper, manganese, aluminum salts and the like. Salts derived from organic bases include, but are not limited to, salts of primary, secondary, and tertiary amines, substituted amines including naturally occurring substituted amines, cyclic amines and basic ion exchange resins, such as ammonia, isopropylamine, trimethylamine, diethylamine, triethylamine, tripropylamine, diethanolamine, ethanolamine, deanol, 2-dimethylaminoethanol, 2-diethylaminoethanol, dicyclohexylamine, lysine, arginine, histidine, caffeine, procaine, hydrabamine, choline, betaine, benethamine, benzathine, ethylenediamine, glucosamine, methylglucamine, theobromine, triethanolamine, tromethamine, purines, piperazine, piperidine, N-ethylpiperidine, polyamine resins and the like. Particularly preferred organic bases are isopropylamine, diethylamine, ethanolamine, trimethylamine, dicyclohexylamine, choline and caffeine.

Often crystallizations produce a solvate of the compound of the invention. The present invention includes all solvates of the described compounds. As used herein, the term "solvate" refers to an aggregate that comprises one or more molecules of a compound of the invention with one or more molecules of solvent. The solvent may be water, in which case the solvate may be a hydrate. Alternatively, the solvent may be an organic solvent. Thus, the compounds of the present invention may exist as a hydrate, including a monohydrate, dihydrate, hemihydrate, sesquihydrate, trihydrate, tetrahydrate and the like, as well as the corresponding solvated forms. The compounds of the invention may be true solvates, while in other cases the compounds of the invention may merely retain adventitious water or another solvent or be a mixture of water plus some adventitious solvent.

The compounds of the invention (e.g., compounds I-VII), or their salts, tautomers or solvates may contain one or more asymmetric centers and may thus give rise to enantiomers, diastereomers, and other stereoisomeric forms that may be defined, in terms of absolute stereochemistry, as (R)- or (S)- or, as (D)- or (L)- for amino acids. The present invention is meant to include all such possible isomers, as well as their racemic and optically pure forms. Optically active (+) and (−), (R)- and (S)-, or (D)- and (L)-isomers may be prepared using chiral synthons or chiral reagents, or resolved using conventional techniques, for example, chromatography and fractional crystallization. Conventional techniques for the preparation/isolation of individual enantiomers include chiral synthesis from a suitable optically pure precursor or resolution of the racemate (or the racemate of a salt or derivative) using, for example, chiral high pressure liquid chromatography (HPLC). When the compounds described herein contain olefinic double bonds or other centers of geometric asymmetry, and unless specified otherwise, it is intended that the compounds include both E and Z geometric isomers. Likewise, all tautomeric forms are also intended to be included.

A "stereoisomer" refers to a compound made up of the same atoms bonded by the same bonds but having different three-dimensional structures, which are not interchangeable. The present invention contemplates various stereoisomers and mixtures thereof and includes "enantiomers", which refers to two stereoisomers whose molecules are nonsuperimposeable mirror images of one another.

A "tautomer" refers to a proton shift from one atom of a molecule to another atom of the same molecule. The present invention includes tautomers of any said compounds. Various tautomeric forms of the compounds are easily derivable by those of ordinary skill in the art.

The chemical naming protocol and structure diagrams used herein are a modified form of the I.U.P.A.C. nomenclature system, using the ACD/Name Version 9.07 software program and/or ChemDraw Version 10.0 software naming program (CambridgeSoft). Common names familiar to one of ordinary skill in the art are also used.

"Bonding" refers to the process by which one molecule or atom associates with another atom or molecule. Bonding includes, ionic bonding, covalent bonding, chelation, association complexes, hydrogen bonding and the like. A moiety capable of bonding with an analyte molecule or solid support is moiety capable of associating with the analyte molecule or solid support by any of the above means. In one embodiments, the moiety binds with the analyte molecule or solid support by covalent bonding (i.e., the moiety is capable of forming a covalent bond with the analyte molecule or solid support).

As noted above, in one embodiment of the present invention, compounds useful as fluorescent and/or colored dyes in various analytical methods are provided.

In one embodiment, the compound has the following structure (I):

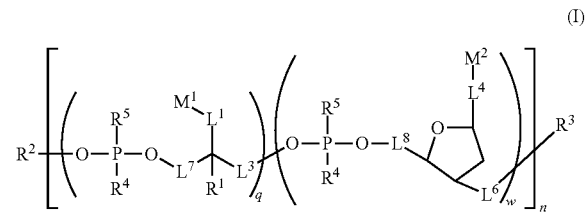

(I)

or a salt or stereoisomer thereof, wherein:

$M^1$ and $M^2$ are, at each occurrence, independently a moiety comprising two or more double bonds and at least one degree of conjugation, and at least one occurrence of $M^1$ is a moiety comprising three or more aryl or heteroaryl rings, or combinations thereof;

$L^1$, $L^3$, $L^4$ $L^6$, $L^7$ and $L^8$ are, at each occurrence, independently optional alkylene or heteroalkylene linkers;

$R^1$ is, at each occurrence, independently H, alkyl or alkoxy;

$R^2$ is an electron pair, H, alkyl, alkylether, hydroxylalkyl, aminoalkyl, hydroxylalkylether, sulfhydrylalkyl, sulfyhdrylalkylether, cyanoalkyl, phospho, thiophospho, alkylphospho, alkylthiophospho, alkyletherphospho, alkyletherthiophospho, phosphoalkyl, phosphoalkylether, thiophosphoalkyl or thiophosphoalkylether; or $R^2$ is $-L^9-(L^{10})_z-L^{11}-Q$ or $-L^9-(L^{10})_z-L^{11}-S-S-L^{11}-(L^{10})_z-L^9-I$, where I represents, independently, a further compound of structure (I);

$R^3$ is H, OH, SH, —$NH_2$, alkyl, alkylether, hydroxylalkyl, aminoalkyl, hydroxylalkylether, sulfhydrylalkyl, sulfyhdrylalkylether, cyanoalkyl, —Oaralkyl, phosphate, thiophosphate, alkylphospho, alkylthiophospho, —Oalkylphospho, —Oalkylthiophospho, alkyletherphospho, alkyletherthiophospho, —Oalkyletherphospho, —Oalkyletherthiophospho phosphoalkyl, phosphoalkylether, thiophosphoalkyl, thiophosphoalkylether, —Ophosphoalkyl, O-phosphoalkylether, —Othiophosphoalkyl or —Othiophosphoalkylether; or $R^2$ is $-L^9-(L^{10})_z-L^{11}-Q$ or $-L^9-(L^{10})_z-L^{11}-S-S-L^{11}-(L^{10})_z-L^9-I$, where I represents, independently, a further compound of structure (I);

$R^4$ is, at each occurrence, independently $O^-$, $S^-$, OZ, SZ or $N(R^6)_2$, where Z is a cation and each $R^6$ is independently H or alkyl;

$R^5$ is, at each occurrence, independently oxo, thioxo or absent;

$L^9$ and $L^{11}$ are, at each occurrence, independently an optional linker;

$L^{10}$ is, at each occurrence, independently a bivalent functional group selected from the group consisting of polyalkylenether, hydroxylalkylene, aminoalkylene, hydroxylpolyalkylenether, aminopolyalkylenether, phospho, thiophospho, phosphoalkylene or thiophosphoalkylene;

Q is a moiety capable of bonding with an analyte molecule or a solid support; or Q is an analyte molecule or solid support;

n is an integer from 1 to 20;

q and w are each independently 0 or 1 for each integral value of n, wherein q is 1 for at least two integral values of n, or wherein q and w are each independently one for at least one integral value of n; and z is an integer from 1 to 10, provided at least one of $R^2$ or $R^3$ is $-L^9-(L^{10})_z-L^{11}-Q$ or $-L^9-(L^{10})_z-L^{11}-S-S-L^{11}-(L^{10})_z-L^9-I$, where I represents, independently, a further compound of structure (I).

In some embodiments, provided at least one of $R^2$ or $R^3$ is $-L^9-(L^{10})_z-L^{11}-Q$. In other embodiments, at least one of $R^2$ or $R^3$ is $-L^9-(L^{10})_z-L^{11}-S-S-L^{11}-(L^{10})z-L^9-I$, where I represents, independently, a further compound of structure (I).

In some embodiments, q is 1 and w is 0 for each integral value of n.

In other embodiments of the foregoing, the compound has the following structure (Ia):

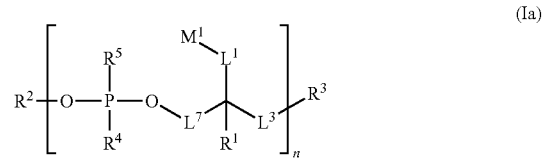

(Ia)

wherein:

$M^1$ is, at each occurrence, independently a moiety comprising two or more double bonds and at least one degree of conjugation, and at least one occurrence of $M^1$ is a moiety comprising four or more aryl or heteroaryl rings, or combinations thereof;

$L^1$, $L^7$ and $L^3$ are, at each occurrence, independently optional alkylene or heteroalkylene linkers;

$R^1$ is, at each occurrence, independently H, alkyl or alkoxy;

$R^2$ is an electron pair, H, alkyl, alkylether, hydroxylalkyl, aminoalkyl, hydroxylalkylether, sulfhydrylalkyl, sulfyhdrylalkylether, cyanoalkyl, phospho, thiophospho, alkylphospho, alkylthiophospho, alkyletherphospho, alkyletherthiophospho, phosphoalkyl, phosphoalkylether, thiophosphoalkyl or thiophosphoalkylether, or $R^2$ is $-L^9-(L^{10})_z-L^{11}-Q$ or $-L^9-(L^{10})_z-L^{11}-S-S-L^{11}-(L^{10})z-L^9-I$, where I represents, independently, a further compound of structure (I);

$R^3$ is H, OH, SH, —$NH_2$, alkyl, alkylether, hydroxylalkyl, aminoalkyl, hydroxylalkylether, sulfhydrylalkyl, sulfyhdrylalkylether, cyanoalkyl, —Oaralkyl, phosphate, thiophosphate, alkylphospho, alkylthiophospho, —Oalkylphospho, —Oalkylthiophospho, alkyletherphospho, alkyletherthiophospho, —Oalkyletherphospho, —Oalkyletherthiophospho phosphoalkyl, phosphoalkylether, thiophosphoalkyl, thiophosphoalkylether, —Ophosphoalkyl, O-phosphoalkylether, —Othiophosphoalkyl or —Othiophosphoalkylether; or $R^2$ is $-L^9-(L^{10})_z-L^{11}-Q$ or $-L^9-(L^{10})_z-L^{11}-S-S-L^{11}-(L^{10})z-L^9-I$, where I represents, independently, a further compound of structure (I);

$R^4$ is, at each occurrence, independently $O^-$, $S^-$, OZ, SZ or $N(R^6)_2$, where Z is a cation and each $R^6$ is independently H or alkyl;

$R^5$ is, at each occurrence, independently oxo, thioxo or absent;

$L^9$ and $L^{11}$ are, at each occurrence, independently an optional linker;

$L^{10}$ is, at each occurrence, independently a bivalent functional group selected from the group consisting of polyalkylenether, hydroxylalkylene, aminoalkylene, hydroxylpolyalkylenether, aminopolyalkylenether, phospho, thiophospho, phosphoalkylene or thiophosphoalkylene;

Q is a moiety capable of bonding with an analyte molecule or a solid support; or Q is an analyte molecule;

n is an integer from 1 to 10; and z is an integer from 1 to 10, provided at least one of $R^2$ or $R^3$ is $-L^9-(L^{10})_z-L^{11}-Q$ or $-L^9-(L^{10})_z-L^{11}-S-S-L^{11}-(L^{10})z-L^9-I$, where I represents, independently, a further compound of structure (I).

In some other embodiments, the compound has the following structure (Ib):

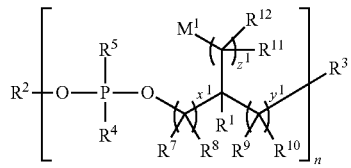
(Ib)

wherein:

$R^7$, $R^8$, $R^9$, $R^{10}$, $R^{11}$ and $R^{12}$ are, at each occurrence, independently H or alkyl; and $x^1$, $y^1$ and $z^1$ are, at each occurrence, independently an integer from 0 to 5.

In different embodiments, the compound has one of the following structures (Ic), (Id), (Ie) or (If):

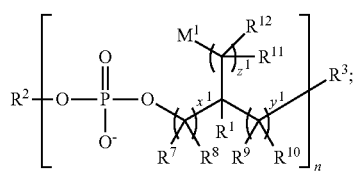
(Ic)

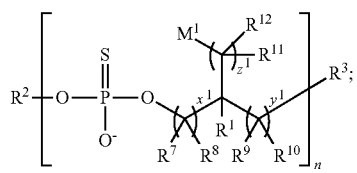
(Id)

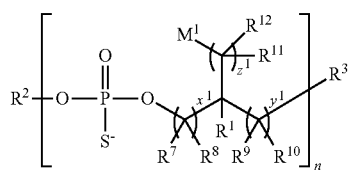
(Ie)

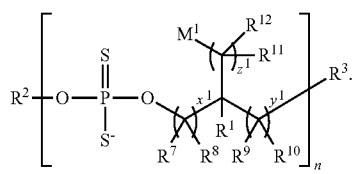
(If)

In yet more embodiments, w is 1 for at least one integral value of n. For example, in some embodiments the compound has the following structure (Ig):

wherein:

$R^7$, $R^8$, $R^9$, $R^{10}$, $R^{11}$ and $R^{12}$ are, at each occurrence, independently H or alkyl; and $x^1$, $x^2$, $y^1$, $y^2$, and $z^2$ are, at each occurrence, independently an integer from 0 to 5.

In other embodiments of the foregoing, $R^5$ is oxo and $R^4$ is $O^-$ or OZ.

In some other embodiments, $R^2$ is H or an electron pair, and $R^3$ is -$L^9$-$(L^{10})_z$-$L^{11}$-Q.

In some different embodiments, $R^2$ is hydroxylalkyl, aminoalkyl, hydroxylalkylether, sulfhydrylalkyl or sulfhydrylalkylether, and $R^3$ is -$L^9$-$(L^{10})_z$-$L^{11}$-Q. For example, in some embodiments $R^2$ has one of the following structures:

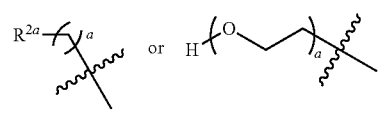

wherein:

$R^{2a}$ is —OH, —NH$_2$, or —SH; and a is an integer from 1 to 10.

In more embodiments of the foregoing, $R^3$ is -$L^9$-$(L^{10})_z$-$L^{11}$-Q, and $R^2$ is alkylphospho, alkylthiophospho, alkyletherphospho, alkyletherthiophospho, phosphoalkyl, phosphoalkylether, thiophosphoalkyl or thiophosphoalkylether, wherein $R^2$ is optionally substituted with a substituent selected from —OH, —NH$_2$ and —SH. For example, in some embodiments $R^2$ has one of the following structures:

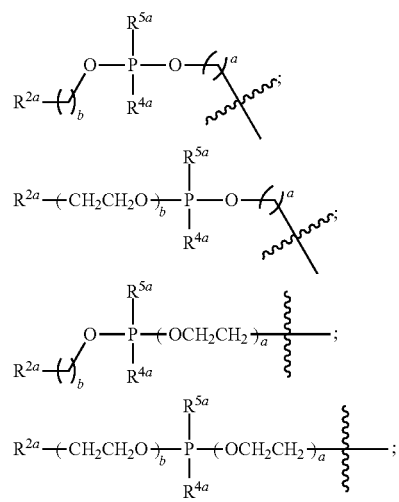

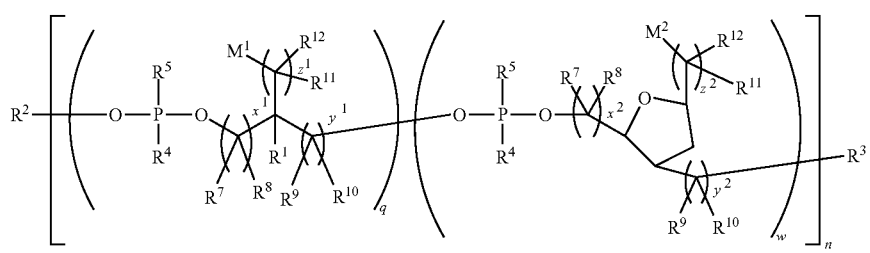
(Ig)

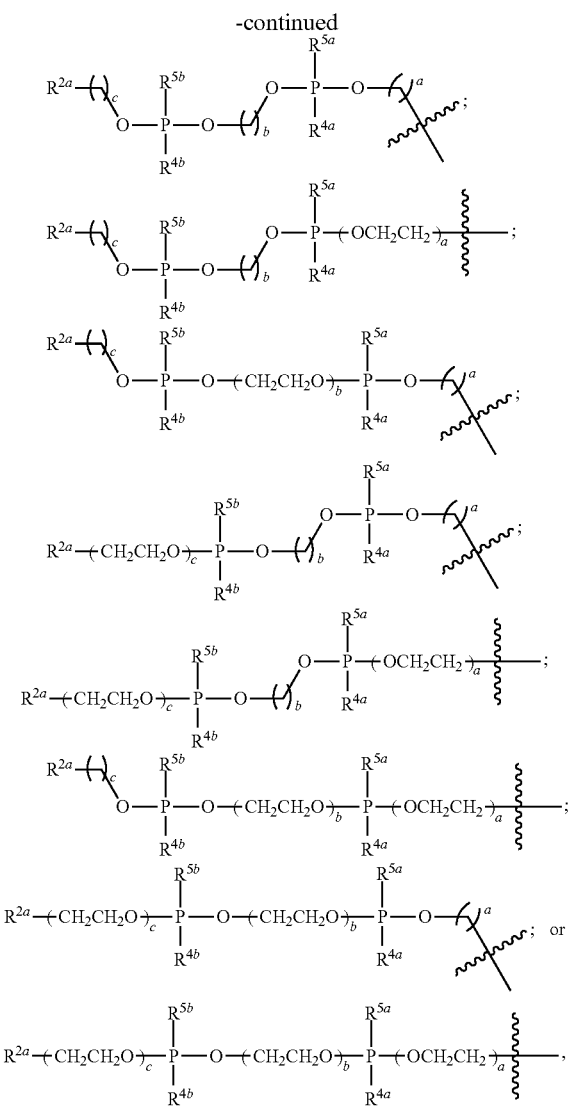

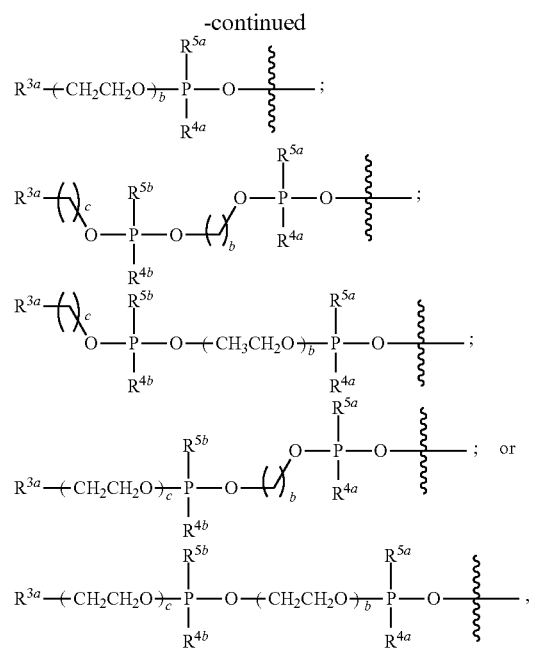

wherein:
R$^{2a}$ is —OH, —SH, —NH$_2$, phosphate or thiophosphate;
R$^{4a}$ and R$^{4b}$ are independently O$^-$, S$^-$, OZ or SZ, where Z is a cation;
R$^{5a}$ and R$^{5b}$ are independently oxo, or thioxo; and
a, b and c are each independently integers from 1 to 10.

In more embodiments of the foregoing, R$^2$ is -L$^9$-(L$^{10}$)$_z$-L$^{11}$-Q, and R$^3$ is OH or phosphate.

In yet more embodiments of the foregoing, R$^2$ is -L$^9$-(L$^{10}$)$_z$-L$^{11}$-Q, and R$^3$ is, phosphate, thiophosphate, phospho, thiophospho, —Oalkylphospho, —Oalkylthiophospho, —Oalkyletherphospho, —Oalkyletherthiophospho, —Ophosphoalkyl, —Ophosphoalkylether, —Othiophosphoalkyl or —Othiophosphoalkylether optionally substituted with a substituent selected from —OH, —NH$_2$ and —SH. For example, in some embodiments R$^3$ has one of the following structures:

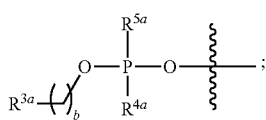

wherein:
R$^{3a}$ is —OH, —SH, —NH$_2$, phosphate or thiophosphate;
R$^{4a}$ and R$^{4b}$ are independently O$^-$, S$^-$, OZ or SZ, where Z is a cation;
R$^{5a}$ and R$^{5b}$ are independently oxo, or thioxo; and
b and c are each independently integers from 1 to 10.

In yet more embodiments of the foregoing, R$^2$ is -L$^9$-(L$^{10}$)$_z$-L$^{11}$-Q, and R$^3$ is OH or phosphate.

In different embodiments, R$^{4a}$ and R$^{4b}$ are each O$^-$ and R$^{5a}$ and R$^{5b}$ are each oxo. In some other embodiments, R$^{4a}$ and R$^{4b}$ are each O$^-$ and R$^{5a}$ and R$^{5b}$ are each thioxo. In some different embodiments, R$^{4a}$ and R$^{4b}$ are each S$^-$ and R$^{5a}$ and R$^{5b}$ are each thioxo. In more different embodiments, R$^{4a}$ and R$^{4b}$ are each S$^-$ and R$^{5a}$ and R$^{5b}$ are each oxo.

In some other embodiments, at least one of a, b or c is 2. For example, in some embodiments each of a, b and c is 2.

In more embodiments of the foregoing, at least one of a, b or c is 6. For example, in some embodiments each of a, b and c is 6.

In other embodiments of the foregoing, n is an integer from 1 to 5. In some embodiments, n is an integer from 2 to 15. In some different embodiments, n is an integer from 2 to 10. In some other embodiments, n is an integer from 2 to 5.

Still other embodiments provide a compound having the following structure (II):

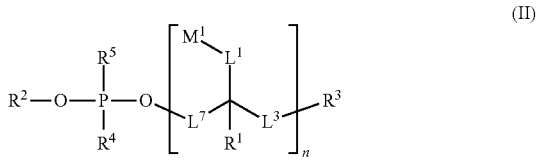

(II)

or a salt or stereoisomer thereof, wherein:
M$^1$ is, at each occurrence, independently a moiety comprising two or more double bonds and at least one degree of conjugation, and at least one occurrence of M$^1$ is a moiety comprising three or more aryl or heteroaryl rings, or combinations thereof;

$L^1$, $L^3$, and $L^7$ are, at each occurrence, independently optional alkylene or heteroalkylene linkers;

$R^1$ is, at each occurrence, independently H, alkyl or alkoxy;

$R^2$ is an electron pair, H, phospho, thiophospho, alkylphospho, alkylthiophospho, alkyletherphospho, alkyletherthiophospho, phosphoalkyl, phosphoalkylether, thiophosphoalkyl or thiophosphoalkylether; or $R^2$ is -$L^9$-($L^{10}$)$_z$-$L^{11}$-Q or -$L^9$-($L^{10}$)$_z$-$L^{11}$-S—S-$L^{11}$-($L^{10}$)z-$L^9$-I, where I represents, independently, a further compound of structure (I);

$R^3$ is H, OH, SH, —NH$_2$, alkyl, alkylether, hydroxylalkyl, aminoalkyl, hydroxylalkylether, sulfhydrylalkyl, sulfyhdrylalkylether, phosphate, thiophosphate, alkylphospho, alkylthiophospho, —Oalkylphospho, —Oalkylthiophospho, alkyletherphospho, alkyletherthiophospho, —Oalkyletherphospho, —Oalkyletherthiophospho phosphoalkyl, phosphoalkylether, thiophosphoalkyl, thiophosphoalkylether, —Ophosphoalkyl, —Ophosphoalkylether, —Othiophosphoalkyl or —Othiophosphoalkylether; or $R^3$ is -$L^9$-($L^{10}$)$_z$-$L^{11}$-Q or -$L^9$-($L^{10}$)$_z$-$L^{11}$-S—S-$L^{11}$-($L^{10}$)z-$L^9$-I, where I represents, independently, a further compound of structure (I)

$R^4$ is, at each occurrence, independently O$^-$, S$^-$, OZ, SZ or N($R^6$)$_2$, where Z is a cation and each $R^6$ is independently H or alkyl;

$R^5$ is, at each occurrence, independently oxo, thioxo or absent;

$L^9$ and $L^{11}$ are, at each occurrence, independently an optional linker;

$L^{10}$ is, at each occurrence, independently a bivalent functional group selected from the group consisting of polyalkylenether, hydroxylalkylene, aminoalkylene, hydroxylpolyalkylenether, aminopolyalkylenether, phospho, thiophospho, phosphoalkylene or thiophosphoalkylene;

Q is a moiety capable of bonding with an analyte molecule or a solid support; or Q is an analyte molecule or solid support;

n is an integer from 1 to 20; and z is an integer from 1 to 10, provided at least one of $R^2$ or $R^3$ is -$L^9$-($L^{10}$)$_z$-$L^{11}$-Q or -$L^9$-($L^{10}$)$_z$-$L^{11}$-S—S-$L^{11}$-($L^{10}$)z-$L^9$-I, where I represents, independently, a further compound of structure (I).

In some embodiments, at least one of $R^2$ or $R^3$ is -$L^9$-($L^{10}$)$_z$-$L^{11}$-Q. In different embodiments, at least one of $R^2$ or $R^3$ is -$L^9$-($L^{10}$)$_z$-$L^{11}$-S—S-$L^{11}$-($L^{10}$)z-$L^9$-I, where I represents, independently, a further compound of structure (I).

In other embodiments of the foregoing, $R^3$ is -$L^9$-($L^{10}$)$_z$-$L^{11}$-Q, and $R^2$ is an electron pair or H.

In yet more embodiments of the foregoing, $R^3$ is -$L^9$-($L^{10}$)$_z$-$L^{11}$-Q, and $R^2$ is alkylphospho, alkylthiophospho, alkyletherphospho, alkyletherthiophospho, phosphoalkyl, phosphoalkylether, thiophosphoalkyl or thiophosphoalkylether, wherein $R^2$ is optionally substituted with a substituent selected from —OH, —NH$_2$ and —SH. For example, in some embodiments $R^2$ has one of the following structures:

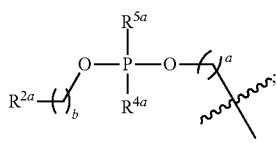

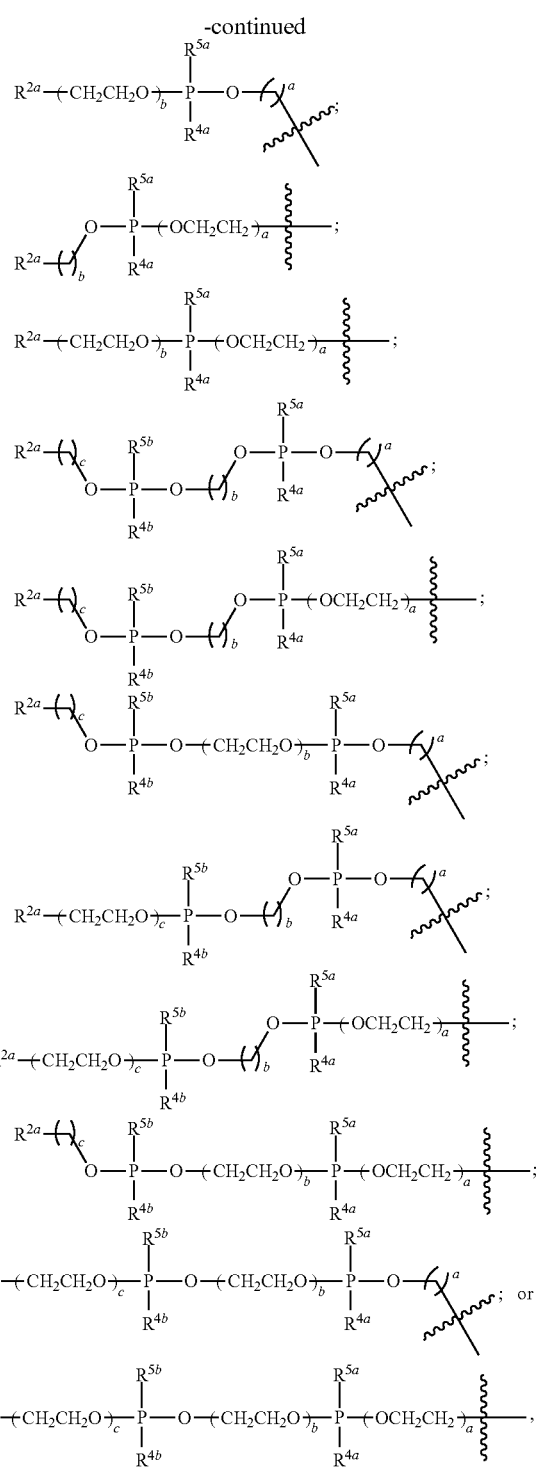

wherein:

$R^{2a}$ is —OH, —SH, —NH$_2$, phosphate or thiophosphate;

$R^{4a}$ and $R^{4b}$ are independently O$^-$, S$^-$, OZ or SZ, where Z is a cation;

$R^{5a}$ and $R^{5b}$ are independently oxo, or thioxo; and a, b and c are each independently integers from 1 to 10.

In some different embodiments, $R^2$ is -$L^9$-($L^{10}$)$_z$-$L^{11}$-Q, and $R^3$ is OH or phosphate. In some other embodiments $R^2$ is -$L^9$-($L^{10}$)$_z$-$L^{11}$-Q, and $R^3$ is, phosphate, thiophosphate, phospho, thiophospho, —Oalkylphospho, —Oalkylthiophospho, —Oalkyletherphospho, —Oalkyletherthiophospho, —Ophosphoalkyl, —Ophosphoalkylether, —Othiophosphoalkyl or —Othiophosphoalkylether optionally substituted with a substituent selected from —OH, —NH$_2$, and —SH.

In other embodiments of the foregoing, $R^3$ has one of the following structures:

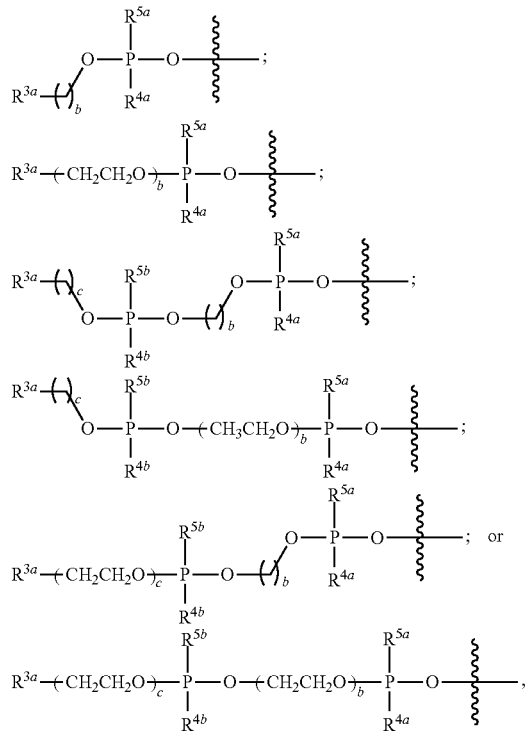

wherein:
$R^{3a}$ is —OH, —SH, —NH$_2$, phosphate or thiophosphate;
$R^{4a}$ and $R^{4b}$ are independently O$^-$, S$^-$, OZ or SZ, where Z is a cation;
$R^{5a}$ and $R^{5b}$ are independently oxo, or thioxo; and
b and c are each independently integers from 1 to 10.

In various embodiments, $R^4$ is O$^-$ and $R^5$ is oxo at each occurrence.

In different embodiments, $L^1$, $L^3$ and $L^7$ are each alkylene linkers.

In some other different embodiments, $L^1$ and $L^3$ are each alkylene linkers and $L^7$ is absent. In some of these embodiments, alkylene is methylene.

Other embodiments provide a compound having the following structure (III):

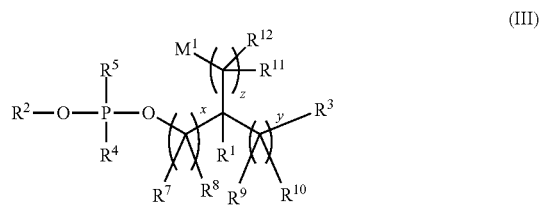

(III)

or a salt or stereoisomer thereof, wherein:
$M^1$ is a moiety comprising three or more aryl or heteroaryl rings, or combinations thereof;

$R^1$ is H, alkyl or alkoxy;

$R^2$ is H, an electron pair or a cation; or $R^2$ is -$L^9$-($L^{10}$)$_z$-$L^{11}$-Q or -$L^9$-($L^{10}$)$_z$-$L^{11}$-S—S-$L^{11}$-($L^{10}$)z-$L^9$-I, where I represents, independently, a further compound of structure (I);

$R^3$ is H, phosphate or OH; or $R^3$ is -$L^9$-($L^{10}$)$_z$-$L^{11}$-Q or -$L^9$-($L^{10}$)$_z$-$L^{11}$-S—S-$L^{11}$-($L^{10}$)z-$L^9$-I, where I represents, independently, a further compound of structure (I);

$R^4$ is O$^-$, S$^-$, OZ, SZ where Z is a cation;

$R^5$ is oxo or thioxo;

$R^7$, $R^8$, $R^9$, $R^{10}$, $R^{11}$ and $R^{12}$ are, at each occurrence, independently H or alkyl;

$L^9$ and $L^{11}$ are, at each occurrence, independently an optional linker;

$L^{10}$ is, at each occurrence, independently a bivalent functional group selected from the group consisting of polyalkylenether, hydroxylalkylene, aminoalkylene, hydroxylpolyalkylenether, aminopolyalkylenether, phospho, thiophospho, phosphoalkylene or thiophosphoalkylene;

Q is a moiety capable of bonding with an analyte molecule or a solid support; or Q is an analyte molecule or solid support; and x, y and z are, at each occurrence, independently an integer from 0 to 5; and z is an integer from 1 to 10, provided at least one of $R^2$ or $R^3$ is -$L^9$-($L^{10}$)$_z$-$L^{11}$-Q or -$L^9$-($L^{10}$)$_z$-$L^{11}$-S—S-$L^{11}$-($L^{10}$)z-$L^9$-I, where I represents, independently, a further compound of structure (I).

In some other embodiments, at least one of $R^2$ or $R^3$ is -$L^9$-($L^{10}$)$_z$-$L^{11}$-Q. In different embodiments, at least one of $R^2$ or $R^3$ is -$L^9$-($L^{10}$)$_z$-$L^{11}$-S—S-$L^{11}$-($L^{10}$)$_z$-$L^9$-I, where I represents, independently, a further compound of structure (I).

In further embodiments, x, y and z are each 1.

In various other embodiments, x is 0 and y and z are each 1.

$M^1$ is generally a visually detectable moiety or substance. For example, $M^1$ may be visually detectable in the UV, visible or IR spectrum. In some of any of the foregoing, $M^1$ is, at each occurrence, independently fluorescent or colored. For example, in some embodiments $M^1$ is fluorescent.

In certain embodiments, $M^1$ is not a purine or pyrimidine base, such as, but not limited to guanine, cytosine, thymidine and adenine. In other embodiments, $M^1$ is not a porphyrin. In other embodiments, $M^1$ is not one of the following:

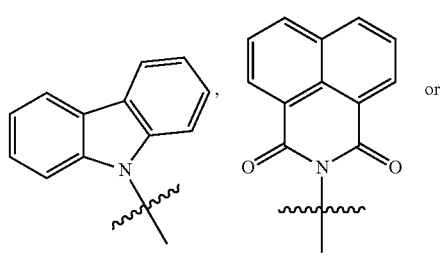

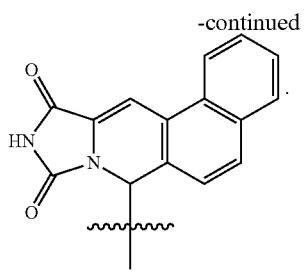

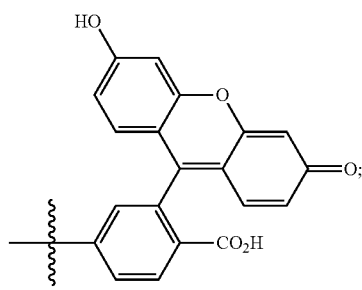

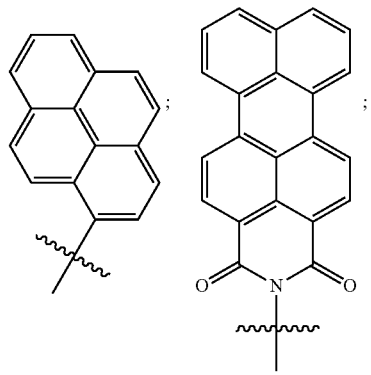

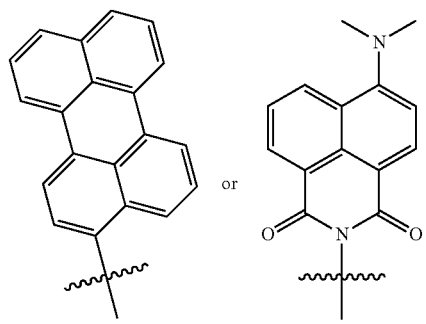

In still other embodiments of any of the foregoing, $M^1$ comprises three or more aryl or heteroaryl rings, or combinations thereof, for example four or more aryl or heteroaryl rings, or combinations thereof, or even five or more aryl or heteroaryl rings, or combinations thereof. In some embodiments, $M^1$ comprises six aryl or heteroaryl rings, or combinations thereof. In further embodiments, the rings are fused. For example in some embodiments, $M^1$ comprises three or more fused rings, four or more fused rings, five or more fused rings, or even six or more fused rings.

In some embodiments, $M^1$ is cyclic. For example, in some embodiments $M^1$ is carbocyclic. In other embodiment, $M^1$ is heterocyclic. In still other embodiments of the foregoing, $M^1$, at each occurrence, independently comprises an aryl moiety. In some of these embodiments, the aryl moiety is multicyclic. In other more specific example, the aryl moiety is a fused-multicyclic aryl moiety, for example which may comprise at least 3, at least 4, or even more than 4 aryl rings.

In other embodiments of any of the foregoing compounds of structure (I), $M^1$, at each occurrence, independently comprises at least one heteroatom. For example, in some embodiments, the heteroatom is nitrogen, oxygen or sulfur.

In still more embodiments of any of the foregoing, $M^1$, at each occurrence, independently comprises at least one substituent. For example, in some embodiments the substituent is a fluoro, chloro, bromo, iodo, amino, alkylamino, arylamino, hydroxy, sulfhydryl, alkoxy, aryloxy, phenyl, aryl, methyl, ethyl, propyl, butyl, isopropyl, t-butyl, carboxy, sulfonate, amide, or formyl group.

In some even more specific embodiments of the foregoing, $M^1$, at each occurrence, independently is a dimethylaminostilbene, quinacridone, fluorophenyl-dimethyl-BODIPY, his-fluorophenyl-BODIPY, acridine, terrylene, sexiphenyl, porphyrin, benzopyrene, (fluorophenyl-dimethyl-difluorobora-diaza-indacene)phenyl, (bis-fluorophenyl-difluorobora-diaza-indacene)phenyl, quaterphenyl, bi-benzothiazole, ter-benzothiazole, bi-naphthyl, bi-anthracyl, squaraine, squarylium, 9, 10-ethynylanthracene or ter-naphthyl moiety. In other embodiments, $M^1$ is, at each occurrence, independently p-terphenyl, perylene, azobenzene, phenazine, phenanthroline, acridine, thioxanthrene, chrysene, rubrene, coronene, cyanine, perylene imide, or perylene amide or a derivative thereof. In still more embodiments, $M^1$ is, at each occurrence, independently a coumarin dye, resorufin dye, dipyrromethaneboron difluoride dye, ruthenium bipyridyl dye, energy transfer dye, thiazole orange dye, polymethine or N-aryl-1,8-naphthalimide dye.

In still more embodiments of any of the foregoing, $M^1$ at each occurrence is the same. In other embodiments, each $M^1$ is different. In still more embodiments, one or more $M^1$ is the same and one or more $M^1$ is different.

In some embodiments, $M^1$ is pyrene, perylene, perylene monoamide or 6-FAM or derivative thereof. In some other embodiments, $M^1$ has one of the following structures:

In some embodiments, $M^2$ is selected from any one of the above described $M^1$ moieties. In some embodiments, $M^1$ and $M^2$ are the same. In other embodiments, $M^1$ and $M^2$ are different.

In other embodiments, at least one occurrence of $M^2$ is a base pairing moiety. For example, in some embodiments each occurrence of $M^2$ is a base pairing moiety. In some of these embodiments, the base pairing moiety is a purine, a pyrimidine, a dihydropyrimidine or a derivative thereof. In further embodiments, the base pairing moiety has one of the following structures:

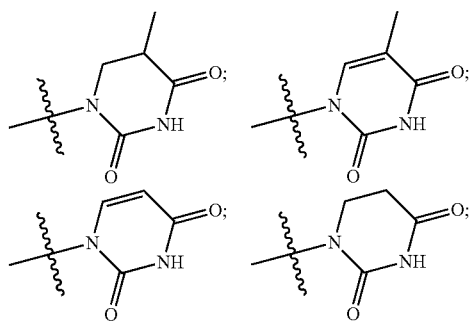

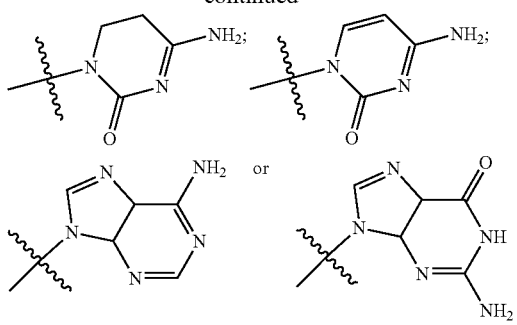

The present invention includes monomeric compounds (e.g., n=1) as well as oligomeric compound (e.g., n is 2-20 or 2-10). In other of the foregoing embodiments, n is an integer from 1 to 5. For example, in some embodiments, n is an integer from 2 to 10, or 2 to 5, such as 3. In other embodiments n is 1. In more embodiments, n is 2. In other embodiments n is 3. In more embodiments, n is 4. In other embodiments n is 5. In more embodiments, n is 6. In other embodiments n is 7. In more embodiments, n is 8. In other embodiments n is 9. In more embodiments, n is 10.

In various embodiments, $L^9$ is present. For example, in some embodiments $L^9$ is $C_1$-$C_6$ alkylene.

In various embodiments, $L^{10}$ is selected from the group consisting of polyalkylenether, phospho and phosphoalkylene. For example, in some embodiments $L^{10}$ is selected from the group consisting of:

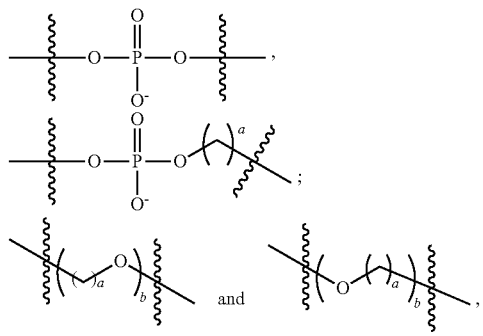

wherein a is an integer from 1 to 6 and b is an integer from 2 to 10.

In various embodiments, $(L^{10})_z$ has one of the following structures:

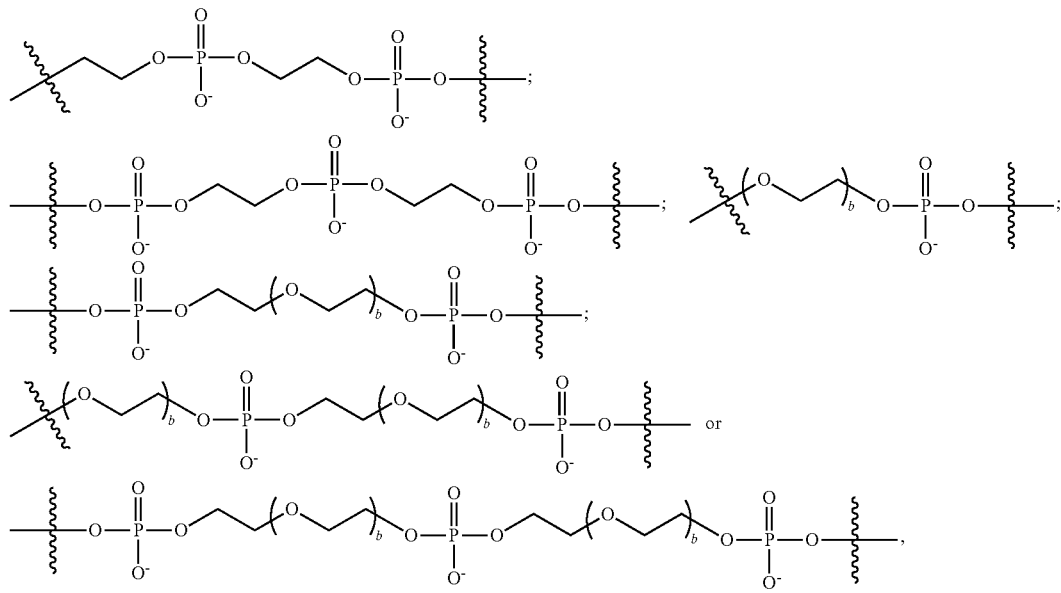

Any number of methylene spacer units (i.e., x, y and z) can be included. In some embodiments x is 0. In other embodiments x is 1. In more embodiments, x is 2. In some embodiments x is 3. In other embodiments x is 4. In more embodiments, x is 5.

In some embodiments y is 0. In other embodiments y is 1. In more embodiments, y is 2. In some embodiments y is 3. In other embodiments y is 4. In more embodiments, y is 5.

In some embodiments z is 1-5. In some embodiments z is 0. In other embodiments z is 1. In more embodiments, z is 2. In some embodiments z is 3. In other embodiments z is 4. In more embodiments, z is 5.

In other embodiments, x is 1, y is 0 and z is 1. In other embodiments, x is 0, y is 1 and z is 1.

where b is an integer from 2-10, for example 5.

In various embodiments, $L^9$ and $L^{11}$ are each independently a $C_1$-$C_6$ alkylene linker. In some embodiments, $L^9$ is a $C_2$ alkylene linker. In other embodiments, $L^{11}$ is a $C_6$ alkylene linker.

In still other embodiments, Q is a moiety capable of bonding with an analyte molecule or a solid support. In certain embodiments, Q provides a means of connecting the compound of structure (I) to an analyte molecule or a solid support (e.g., by a covalent bond). For example, in some embodiments Q is a reactive group capable of forming a covalent bond with an analyte molecule or a solid support. In this regard the type of Q group and connectivity of the Q group to the remainder of the compound of structure (I) is not limited. In certain embodiments, the Q is a moiety which is not susceptible to hydrolysis under aqueous conditions, but is sufficiently reactive to form a bond with a corresponding group on an analyte molecule or solid support (e.g., an amine).

Certain embodiments of the compounds described herein comprise Q groups commonly employed in the field of bioconjugation. For example in some embodiments, Q is a nucleophilic reactive group, an electrophilic reactive group or a cycloaddition reactive group. In some more specific embodiments, Q is sulfhydryl, disulfide, activated ester, isothiocyanate, azide, alkyne, alkene, diene, dienophile, acid halide, sulfonyl halide, phosphine, α-haloamide, biotin, amino or a maleimide. In some embodiments, the activated ester is an N-succinimide ester, imidoester or polyflourophenyl ester. In other embodiments, the alkyne is an alkyl azide or acyl azide.

Exemplary Q moieties are provided in Table I below.

TABLE 1

| Exemplary Q Moieties | |
|---|---|
| Structure | Class |
| 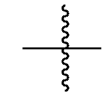 | Sulfhydryl |
| | Isothiocyanate |
| | Imidoester |
| | Acyl Azide |
| | Activated Ester |
| | Activated Ester |
| | Activated Ester |

TABLE 1-continued

| Exemplary Q Moieties | |
|---|---|
| Structure | Class |
| 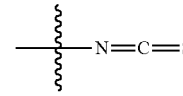 | Activated Ester |
| | Activated Ester |
| | Sulfonyl halide |
| X = halo | |
| | Maleimide |
| | Maleimide |
| | α-haloimide |
| X = halo | |
| | Disulfide |
| | Phosphine |
| | Azide |
| | Alkyne |

TABLE 1-continued

Exemplary Q Moieties

| Structure | Class |
|---|---|
| (biotin structure) | Biotin |
| (diene structure) | Diene |
| (alkyne structure) | Alkene/dienophile |
| (alkene-EWG structure) | Alkene/dienophile |
| EWG = eletron withdrawing group | |
| —NH$_2$ | Amino |

In some embodiments, it is advantageous to employ compounds wherein Q is —SH since —SH can be readily conjugated to many analyte molecules, bifunctional linker groups and/or solid supports (e.g., by formation of a disulfide bond with a free sulfhydryl on the analyte molecule or solid support). However, for purposes of long term stability of the compounds, it may be desirous to store the compound in the form of a disulfide dimer. Accordingly, some embodiments provide such disulfide dimers. For example, in some embodiments at least one of $R^2$ or $R^3$ is -$L^9$-($L^{10}$)$_z$-$L^{11}$-Q or -$L^9$-($L^{10}$)$_z$-$L^{11}$-S—S-$L^{11}$-($L^{10}$)$_z$-$L^9$-I, where I represents, independently, a further compound of structure (I). "Compound of structure (I)" refers to any of the compounds described herein, which are encompassed by structure (I).

The dimer may be formed between any one of $R^2$ or $R^3$ and another one of $R^2$ or $R^3$. For ease of illustration, but limitation, an exemplary dimer, wherein the dimer is formed between two $R^2$ groups is illustrated below (Ia'):

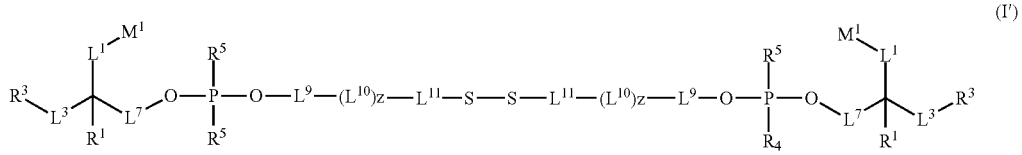

(I')

or a salt thereof, wherein $R^1$, $R^3$, $R^4$, $R^5$, $L^1$, $L^3$, $L^7$, $L^9$, $L^{10}$, $L^{11}$ and z are each independently as defined for any of the foregoing embodiments.

The dimers are also illustrated as follows (Ia'):

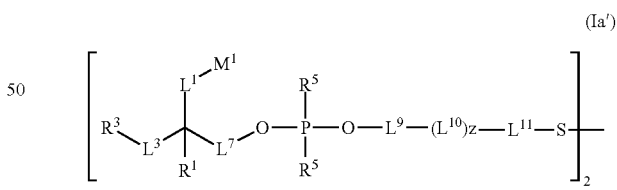

(Ia')

The disulfide linker between the two compounds of structure (I), i.e., -$L^9$($L^{10}$)$_z$-$L^{11}$-S—S-$L^{11}$-($L^{10}$)$_z$-$L^9$-, can have various structures. In some embodiments, -$L^9$($L^{10}$)$_z$-$L^{11}$-S—S-$L^{11}$-($L^{10}$)$_z$-$L^9$- has one of the following structures:

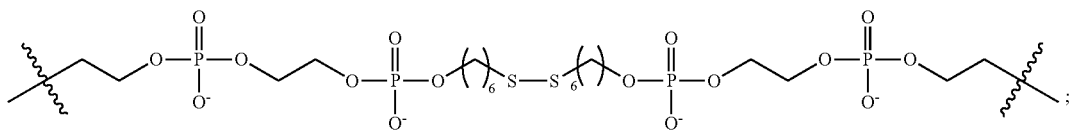

-continued

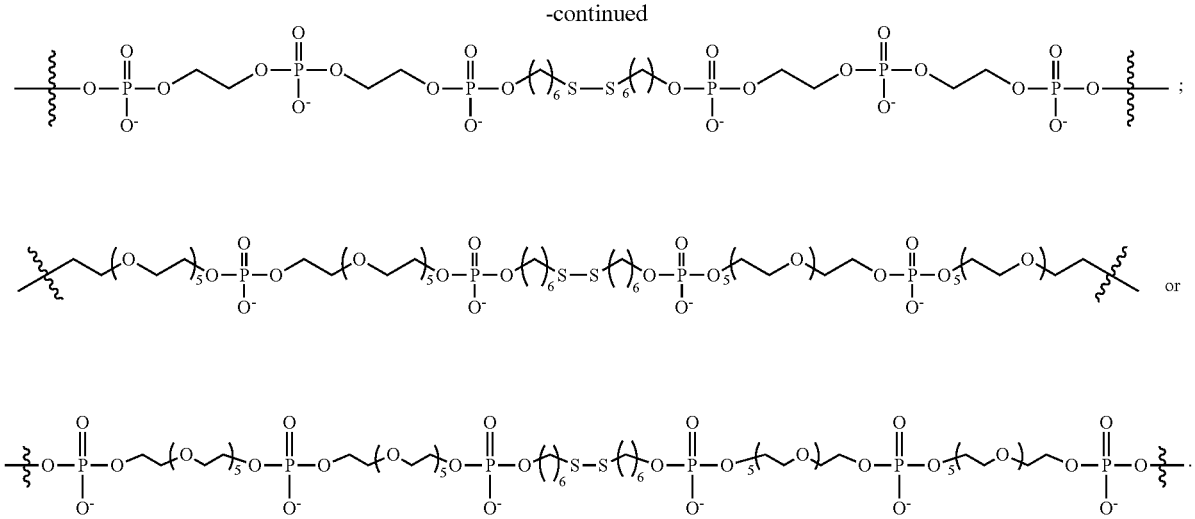

In still other embodiments, Q is an analyte molecule or solid support. For example, in some embodiments the analyte molecule is a biomolecule. In some embodiments, the biomolecule is a nucleic acid, amino acid or a polymer thereof. In other embodiments the biomolecule is a nucleic acid, peptide, carbohydrate, lipid, enzyme, receptor, receptor ligand, antibody, glycoprotein, aptamer, antigen or prion.

In different embodiments, the analyte molecule is a drug, vitamin or small molecule.

In various other embodiments, $R^7$, $R^8$, $R^9$, $R^{10}$, $R^{11}$ and $R^{12}$, when present, are each H.

In some other different embodiments, $x^1$, $y^1$ and $z^1$ are each 1.

In more different embodiments, each $x^1$ is 0 and each $y^1$ and $z^1$ are 1.

In some different embodiments, each $x^2$ is 1 and each $y^2$ and $z^2$ are 0.

Other embodiments are directed to a compound having the following structure (IV):

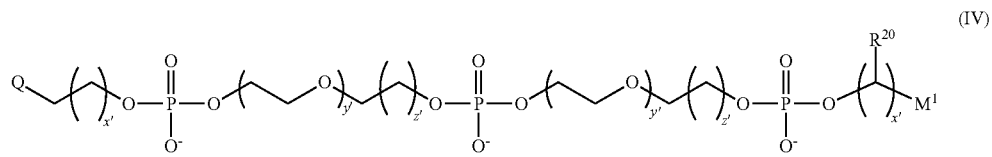

or a salt or stereoisomer thereof, wherein:
- $M^1$ is a moiety comprising two or more double bonds and at least one degree of conjugation, and at least one occurrence of $M^1$ is a moiety comprising three or more aryl or heteroaryl rings, or combinations thereof;
- Q is a moiety capable of bonding with an analyte molecule or a solid support; or Q is an analyte molecule or solid support;
- $R^{20}$ is, at each occurrence, independently H, phosphate, alkyl substituted with phosphate, $C_1$-$C_6$ alkyl or $C_1$-$C_6$ hydroxylalkyl; and
- each x', y' and z' is independently an integer from 0 to 10.

In some of these embodiments, $M^1$ is as defined in any one of the foregoing embodiments. For example, in some embodiments, $M^1$ is perylene.

In other embodiments, Q is as defined in any of the foregoing embodiments. For example, in some embodiments, Q is —SH.

In various embodiments, each y' is 0. In some different embodiments, each z' is 1. In yet more embodiments of the foregoing, each x' is independently an integer from 2-6.

In some other different embodiments, $R^{20}$ is phosphate, —$CH_2OPO_3^{2-}$ or $CH_2OH$.

In some embodiments, the compound has the following structure:

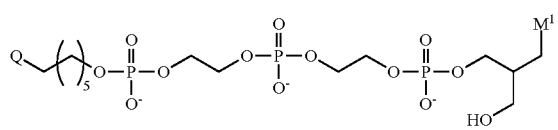

Other embodiments provide a compound having one of the following structures:

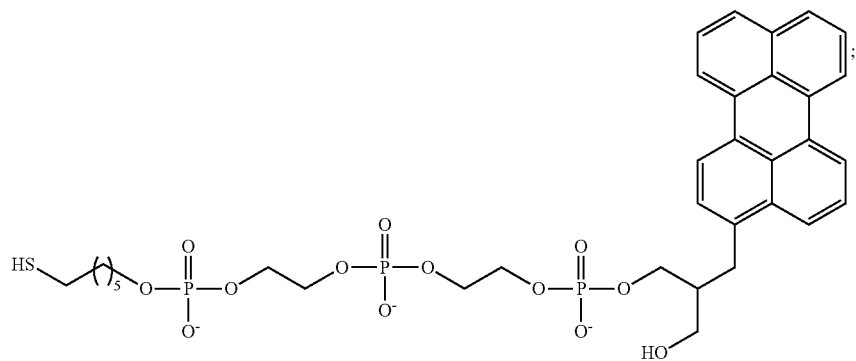
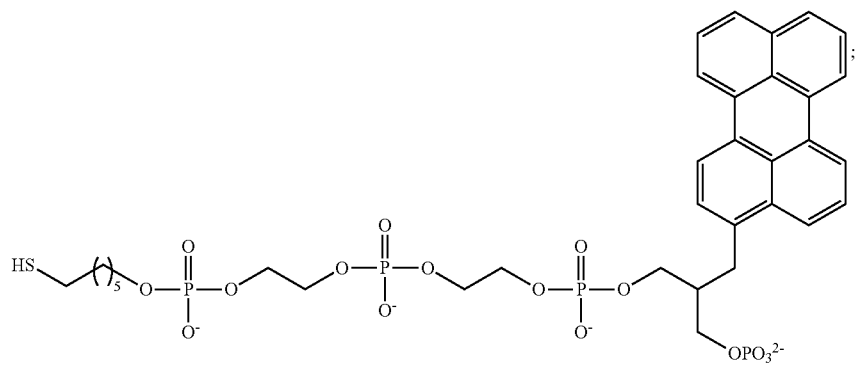
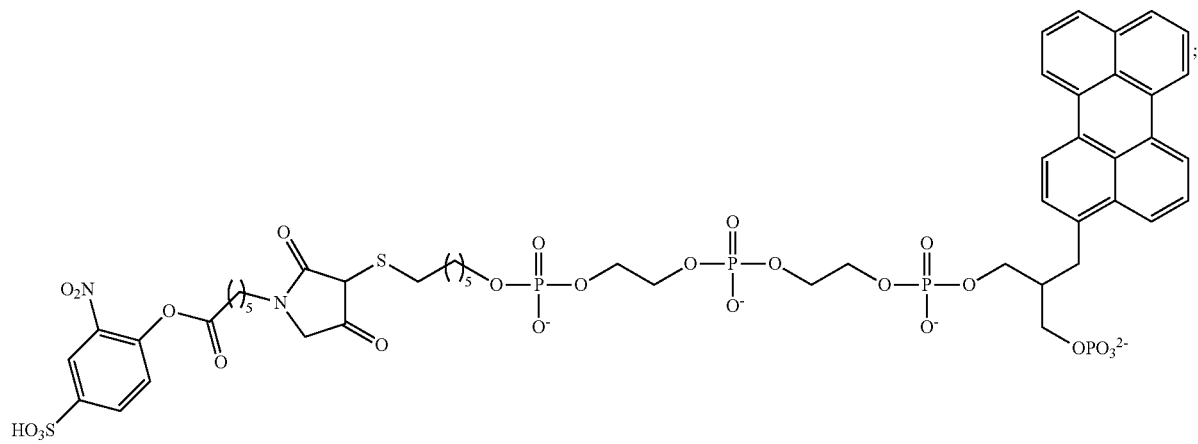
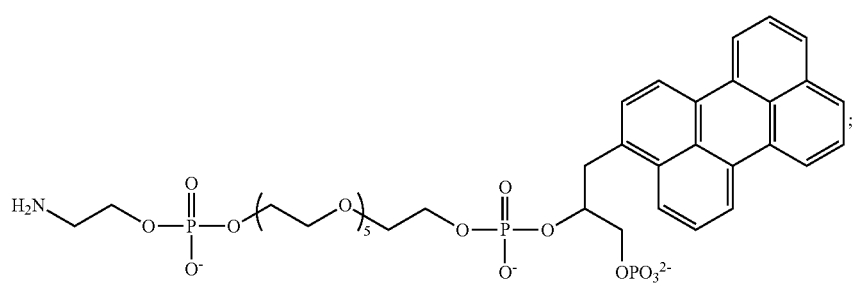

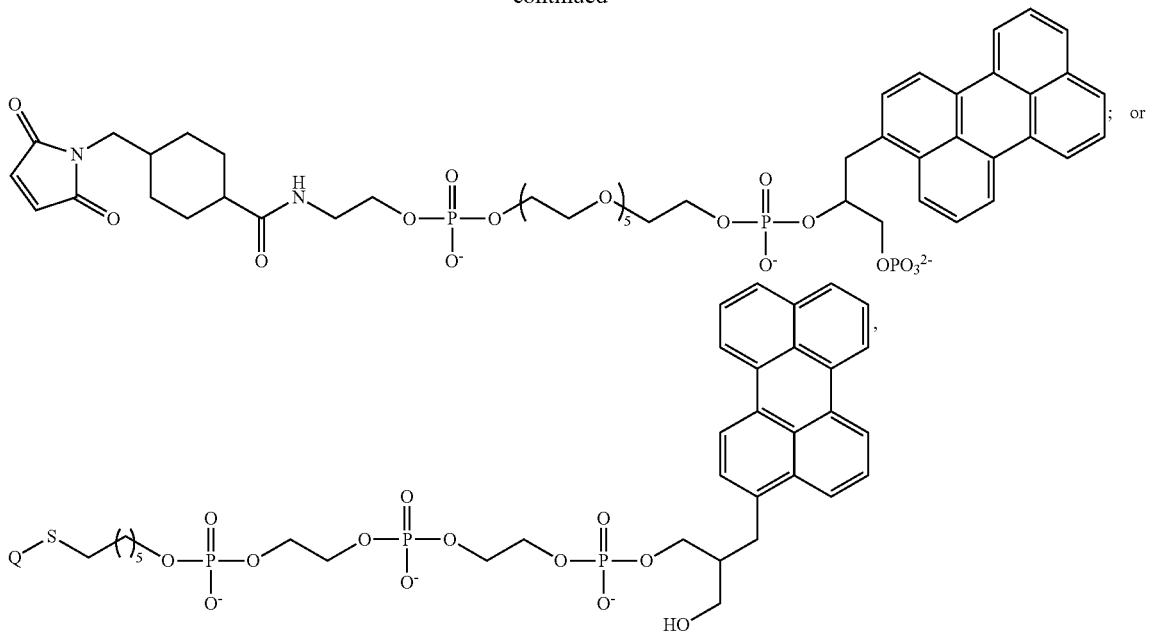

where Q is an analyte molecule.

Other embodiments are directed to a disulfide dimer having the following structure (V):

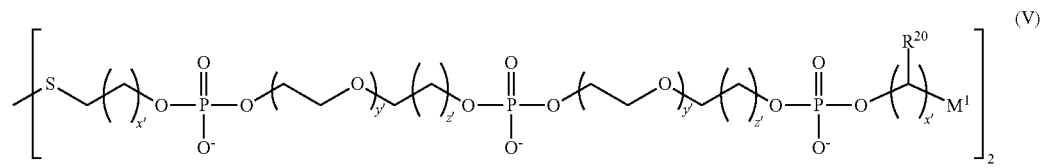

or a salt or stereoisomer thereof, wherein:
$M^1$ is a moiety comprising two or more double bonds and at least one degree of conjugation, and at least one occurrence of $M^1$ is a moiety comprising three or more aryl or heteroaryl rings, or combinations thereof;
$R^{20}$ is, at each occurrence, independently H, phosphate, alkylphosphate, $C_1$-$C_6$ alkyl or $C_1$-$C_6$ hydroxylalkyl; and
each x', y' and z' is independently an integer from 0 to 10.

In some of these embodiments, $M^1$ is as defined in any one of the foregoing embodiments. For example, in some embodiments, $M^1$ is perylene.

In various embodiments, each y' is 0. In some different embodiments, each z' is 1. In yet more embodiments of the foregoing, each x' is independently an integer from 2-6.

In some other different embodiments, $R^{20}$ is phosphate, $CH_2OPO_3^{2-}$ or $CH_2OH$.

In various other embodiments, the disulfide dimer has the following structure:

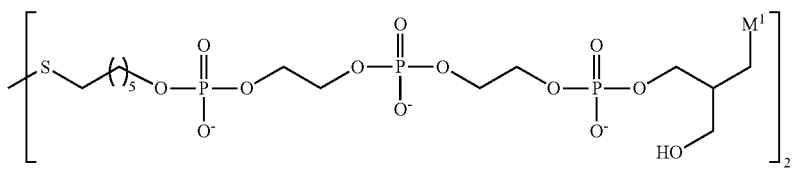

In further embodiments of the foregoing, M¹ has the following structure:

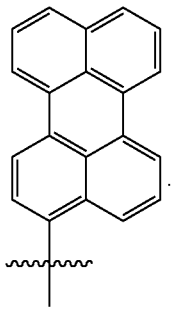 [SMILES: *c1ccc2c3cccc4cccc(c5cccc1c52)c43]

In various other embodiments, a compound having the following structure (VI) is provided:

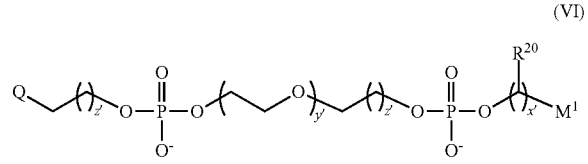
(VI)

or a salt or stereoisomer thereof, wherein:
  M¹ is a moiety comprising two or more double bonds and at least one degree of conjugation, and at least one occurrence of M¹ is a moiety comprising three or more aryl or heteroaryl rings, or combinations thereof;
  Q is a moiety capable of bonding with an analyte molecule or a solid support; or Q is an analyte molecule or solid support;
  $R^{20}$ is, at each occurrence, independently H, phosphate, alkyl substituted with phosphate, $C_1$-$C_6$ alkyl or $C_1$-$C_6$ hydroxylalkyl; and
  each x', y' and z' is, at each occurrence, independently an integer from 0 to 10.

In some of these embodiments, M¹ is as defined in any one of the foregoing embodiments. For example, in some embodiments, M¹ is perylene.

In other embodiments, Q is as defined in any one of the foregoing embodiments. For example, in some embodiments, Q is —SH.

In various embodiments, each y' is 0. In some different embodiments, each z' is 1. In yet more embodiments of the foregoing, each x' is independently an integer from 2-6.

In some other different embodiments, $R^{20}$ is phosphate, $CH_2OPO_3^{2-}$ or $CH_2OH$.

In some embodiments, the compound has the following structure:

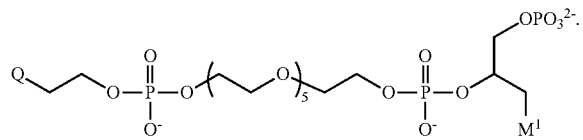

In further embodiments of the foregoing, M¹ has the following structure:

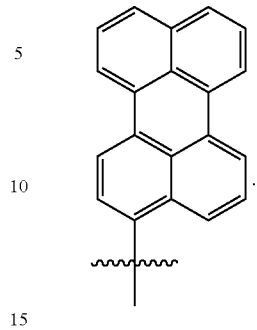

Other embodiments provide a disulfide dimer having the following structure (VII):

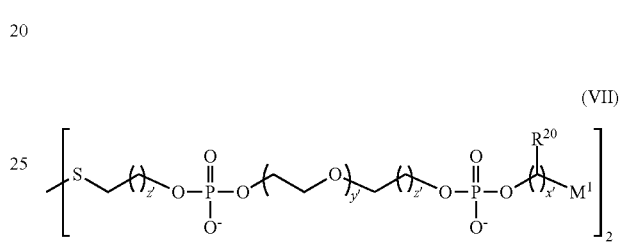
(VII)

or a salt or stereoisomer thereof, wherein:
  M¹ is a moiety comprising two or more double bonds and at least one degree of conjugation, and at least one occurrence of M¹ is a moiety comprising three or more aryl or heteroaryl rings, or combinations thereof;
  $R^{20}$ is, at each occurrence, independently H, phosphate, alkyl substituted with phosphate, $C_1$-$C_6$ alkyl or $C_1$-$C_6$ hydroxylalkyl; and
  each x', y' and z' is, at each occurrence, independently an integer from 0 to 10.

In some of these embodiments, M¹ is as defined in any one of the foregoing embodiments. For example, in some embodiments, M¹ is perylene.

In various embodiments, each y' is 0. In some different embodiments, each z' is 1. In yet more embodiments of the foregoing, each x' is independently an integer from 2-6.

In some other different embodiments, $R^{20}$ is phosphate, $CH_2OPO_3^{2-}$ or $CH_2OH$.

In some embodiment, the disulfide dimer has the following structure:

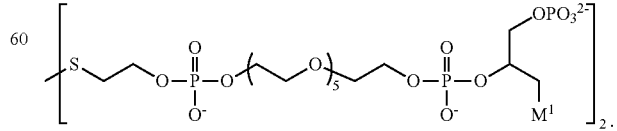

For example, in some embodiments of the foregoing M¹ has the following structure:

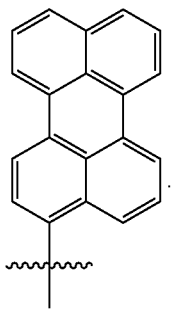 [SMILES: *c1ccc2c3cccc4cccc(c5cccc1c52)c43]

For ease of illustration, various compounds comprising phosphorous moieties (e.g., phosphate and the like) are depicted in the anionic state (e.g., —$OPO_3^{2-}$). One of skill in the art will readily understand that the charge is dependent on pH and the uncharged (e.g., protonated or salt, such as sodium or other cation) forms are also included in the scope of the invention.

Compositions comprising any of the foregoing compounds and one or more biomolecules are provided in various other embodiments. In some embodiments, use of such compositions in analytical methods for detection of the one or more biomolecules are also provided.

In still other embodiments, the compounds are useful in various analytical methods. For example, in certain embodiments the disclosure provides a method of staining a sample, the method comprising adding to said sample a compound of structure (I), wherein $R^2$ is -$L^9$-($L^{10}$)$_z$-$L^{11}$-Q, Q is a moiety capable of bonding with an analyte molecule and $R^3$ is H, OH, phosphate, thiophosphate, phosphoalkyl, phosphoalkylether, thiophosphoalkyl or thiophosphoalkylether in an amount sufficient to produce an optical response when said sample is illuminated at an appropriate wavelength.

In some embodiments of the foregoing methods, $R^2$ is a linker comprising a covalent linkage to a biomolecule. For example, a nucleic acid, amino acid or a polymer thereof (e.g., polynucleotide or polypeptide). In still more embodiments, the biomolecule is an enzyme, receptor, receptor ligand, antibody, glycoprotein, aptamer or prion.

In yet other embodiments of the foregoing method, $R^2$ comprises a linker comprising a covalent linkage to a microparticle. For example, in some embodiments the microparticle is a polymeric bead or nonpolymeric bead.

In even more embodiments, said optical response is a fluorescent response.

In other embodiments, said sample comprises cells, and some embodiments further comprise observing said cells by flow cytometry.

In still more embodiments, the method further comprises distinguishing the fluorescence response from that of a second fluorophore having detectably different optical properties.

In other embodiments, the disclosure provides a method for visually detecting a biomolecule, comprising:
(a) providing a compound of structure (I), wherein $R^2$ is -$L^9$-($L^{10}$)$_z$-$L^{11}$-Q, Q is a moiety capable of bonding with the biomolecule and $R^3$ is H, OH, phosphate, thiophosphate, phosphoalkyl, phosphoalkylether, thiophosphoalkyl or thiophosphoalkylether; and
(b) detecting the compound by its visible properties.

For example, a nucleic acid, amino acid or a polymer thereof (e.g., polynucleotide or polypeptide). In still more embodiments, the biomolecule is an enzyme, receptor, receptor ligand, antibody, glycoprotein, aptamer or prion.

In other embodiments, a method for visually detecting a biomolecule is provided, the method comprising:

(a) admixing any of the foregoing compounds with one or more biomolecules; and
(b) detecting the compound by its visible properties.

It is understood that any embodiment of the compounds of structure (I), as set forth above, and any specific choice set forth herein for a $R^1$, $R^2$, $R^3$, $R^4$, $R^5$, $L^1$, $L^3$, $L^4$, $L^6$, $L^7$, $L^8$, M, q, w and n variable in the compounds of structure (I), as set forth above, may be independently combined with other embodiments and/or variables of the compounds of structure (I) to form embodiments of the inventions not specifically set forth above. In addition, in the event that a list of choices is listed for any particular R or M group in a particular embodiment and/or claim, it is understood that each individual choice may be deleted from the particular embodiment and/or claim and that the remaining list of choices will be considered to be within the scope of the invention.

It is understood that in the present description, combinations of substituents and/or variables of the depicted formulae are permissible only if such contributions result in stable compounds.

It will also be appreciated by those skilled in the art that in the process described herein the functional groups of intermediate compounds may need to be protected by suitable protecting groups. Such functional groups include hydroxy, amino, mercapto and carboxylic acid. Suitable protecting groups for hydroxy include trialkylsilyl or diaryalkylsilyl (for example, t-butyldimethylsilyl, t-butyldiphenylsilyl or trimethylsilyl), tetrahydropyranyl, benzyl, and the like. Suitable protecting groups for amino, amidino and guanidino include t-butoxycarbonyl, benzyloxycarbonyl, and the like. Suitable protecting groups for mercapto include —C(O)—R" (where R" is alkyl, aryl or arylalkyl), p-methoxybenzyl, trityl and the like. Suitable protecting groups for carboxylic acid include alkyl, aryl or arylalkyl esters. Protecting groups may be added or removed in accordance with standard techniques, which are known to one skilled in the art and as described herein. The use of protecting groups is described in detail in Green, T. W. and P. G. M. Wutz, *Protective Groups in Organic Synthesis* (1999), 3rd Ed., Wiley. As one of skill in the art would appreciate, the protecting group may also be a polymer resin such as a Wang resin, Rink resin or a 2-chlorotrityl-chloride resin.

Furthermore, all compounds of the invention which exist in free base or acid form can be converted to their salts by treatment with the appropriate inorganic or organic base or acid by methods known to one skilled in the art. Salts of the compounds of the invention can be converted to their free base or acid form by standard techniques.

The following Reaction Schemes illustrate exemplary methods of making compounds of this invention. It is understood that one skilled in the art may be able to make these compounds by similar methods or by combining other methods known to one skilled in the art. It is also understood that one skilled in the art would be able to make, in a similar manner as described below, other compounds of structure (I) not specifically illustrated below by using the appropriate starting components and modifying the parameters of the synthesis as needed. In general, starting components may be obtained from sources such as Sigma Aldrich, Lancaster Synthesis, Inc., Maybridge, Matrix Scientific, TCI, and Fluorochem USA, etc. or synthesized according to sources known to those skilled in the art (see, for example, Advanced Organic Chemistry: Reactions, Mechanisms, and Structure, 5th edition (Wiley, December 2000)) or prepared as described in this invention.

Reaction Scheme I

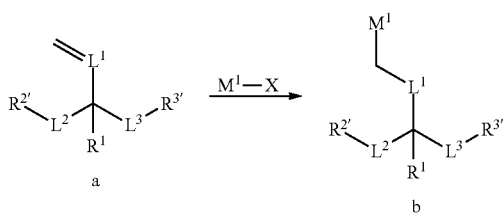

Reaction Scheme I illustrates and exemplary method for preparing compounds of structure I. $R^{2'}$ and $R^{3'}$ represent $R^2$ and $R^3$ moieties as defined herein, or precursors to $R^2$ and $R^3$ moieties or protected derivatives thereof which can be converted to the desired $R^2$ and $R^3$ moieties using techniques known in the art and provided in the examples below. Referring to Reaction Scheme 1, compounds of structure a can be purchased or prepared by methods well-known to those of ordinary skill in the art. Reaction of a with $M^1$-X, where x is a halogen such as bromo, under Suzuki coupling conditions known in the art results in compounds of structure b. Compounds of structure b can be modified to obtain number of other compounds of structure I. For example, compounds of structure b can be oligomerized to obtain other compounds of structure I (i.e., where n is greater than 1, such as 2-10). Exemplary methods for oligomerization include methods analogous to phosphoramadite-based solid-phase oligonucleotide synthesis, which is well known in the art.

Reaction Scheme II

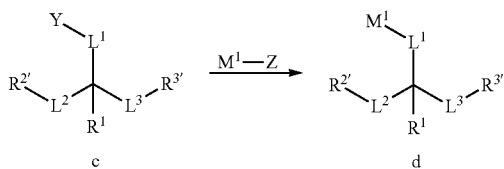

Reaction Scheme II illustrates an alternative method for preparation of compounds of structure I. $R^{2'}$ and $R^{3'}$ represent $R^2$ and $R^3$ moieties as defined herein, or precursors to $R^2$ and $R^3$ moieties or protected derivatives thereof which can be converted to the desired $R^2$ and $R^3$ moieties using techniques known in the art and provided in the examples below. In this approach, a compound of structure c, which can be purchased or prepared by well-known techniques, is reacted with $M^1$-Z to yield compounds of structure d. Here, Y and Z represent function groups having complementary reactivity (i.e., functional groups which react to form a covalent bond). Z may be pendant to $M^1$ or a part of the structural backbone of M, for example a cyclic anhydride. Y may be any number of functional groups, such as amino.

Compounds of structure (I) comprising ribose moieties are prepared according to analogous procedures or purchased from commercial sources (e.g., as phosphoramadites).

In certain embodiments, the compounds of structure I are oligomers comprising from 2-10 repeating units. Such oligomers can be prepared using methods analogous to well-known automated DNA synthesis methods. DNA synthesis methods are well-known in the art. Briefly, two alcohol groups are functionalized with a dimethoxytrityl (DMT) group and a 2-cyanoethyl-N,N-diisopropylamino phosphoramidite group, respectively. The phosphoramidite group is coupled to an alcohol group, typically in the presence of an activator such as tetrazole, followed by oxidation of the phosphorous atom with iodine. The dimethoxytrityl group can be removed with acid (e.g., chloroacetic acid) to expose the free alcohol, which can be reacted with a phosphoramidite group. The 2-cyanoethyl group can be removed after oligomerization by treatment with aqueous ammonia.

Preparation of the phosphoramidites used in the oligomerization methods is also well-known in the art. For example, a primary alcohol (e.g., $R^3$) can be protected as a DMT group by reaction with DMT-Cl. A secondary alcohol (e.g., $R^2$) is then functionalized as a phosphoramidite by reaction with an appropriate reagent such as 2-cyanoethyl N,N-dissopropylchlorophosphoramidite. Methods for preparation of phosphoramidites and their oligomerization are well-known in the art and described in more detail in the examples.

The following examples are provided for purposes of illustration, not limitation.

EXAMPLES

General Methods $^1$H and $^{31}$P NMR spectra were obtained on a JEOL 400 MHz spectrometer. $^{31}$P NMR spectra were referenced against 85% aqueous phosphoric acid and $^1$H spectra were referenced against TMS. Reverse phase HPLC dye analysis was performed using a Waters Acquity UHPLC system with a 2.1 mm×50 mm Acquity BEH-C18 column held at 45° C. Mass spectral analysis was performed on a Waters/Micromass Quattro micro MS/MS system (in MS only mode) using MassLynx 4.1 acquisition software. Mobile phase used for LC/MS on dyes was 100 mM 1,1,1,3,3,3-hexafluoro-2-propanol (HFIP), 8.6 mM triethylamine (TEA), pH 8. Phosphoramidites and precursor molecules were analyzed using an Agilent Infinity 1260 UHPLC system with a diode array detector and High Performance Autosampler using an Aapptec© Spirit™ Peptide C18 column (4.6 mm×100 mm, 5 µm particle size). Excitation and emission profiles experiments were recorded on a Cary Eclipse spectra photometer.

All reactions were carried out in oven dried glassware under a nitrogen atmosphere unless otherwise stated. Commercially available DNA synthesis reagents were purchased from Glen Research (Sterling, VA). Anhydrous pyridine, toluene, dichloromethane, diisopropylethyl amine, triethylamine, acetic acid, pyridine, and THF were purchased from Aldrich. All other chemicals were purchased from Aldrich or TCI and were used as is with no additional purification.

All oligomer dyes were synthesized on an ABI 394 DNA synthesizer using standard protocols for the phosphoramidite-based coupling approach. The chain assembly cycle for the synthesis of oligomers was the following: (i) detritylation, 3% trichloroacetic acid in dichloromethane, 1 min; (ii) coupling, 0.1 M phosphoramidite and 0.45 M tetrazole in acetonitrile, 10 min; (iii) capping, 0.5 M acetic anhydride in THF/lutidine, 1/1, v/v 15 s; (iv) oxidation, 0.1 M iodine in THF/pyridine/water, 10/10/1, v/v/v, 30 s.

Chemical steps within the cycle were followed by acetonitrile washing and flushing with dry argon for 0.2-0.4 min. Cleavage from the support and removal of base and phosphoramidate protecting groups was achieved by treatment with ammonia for 1 hour at room temperature. Oligomer dyes were then analyzed by reverse phase HPLC as described above.

Example 1

Synthesis of Soluble Dye with Activated Ester Moiety

Example 1 exemplifies a water soluble dye substance, modified to contain an activated ester group (2 and 3), which can be conjugated to macromolecules having primary amine functional groups. In this example a dye sequence (1) containing a disulfide linker is reduced with tris(2-carboxyethyl)phosphine (TCEP) to release two smaller dye sequences, each with a Fluor and a free thiol terminus. These products are then reacted with the maleimido portion of N-Maleimido-6-Aminocaproyl 1-Hydroxy-2-Nitro-4-Benzenesulfonic acid Ester (Mal-Sac-HNSA), placing an activated ester group on each dye sequence which is resistant to $H_2O$ mediated hydrolysis, yet still subject to nucleophilic attack by molecules containing primary amines. Compound 1 was prepared according to the general procedures described herein, including methods analogous to solid-phase DNA phosphoramidite chemistry known in the art.

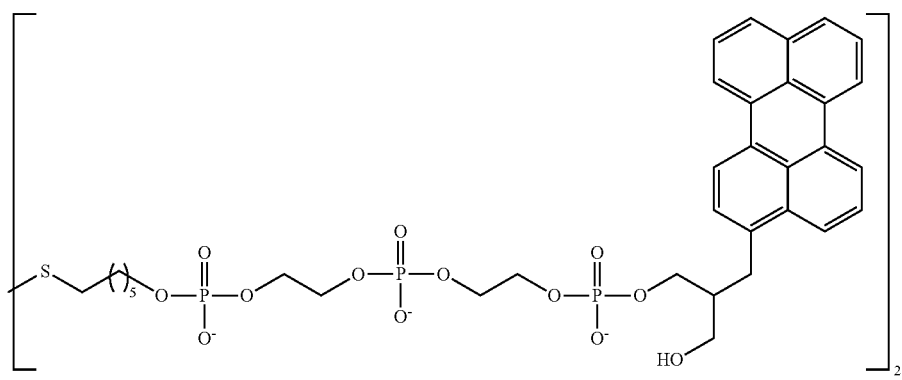

1

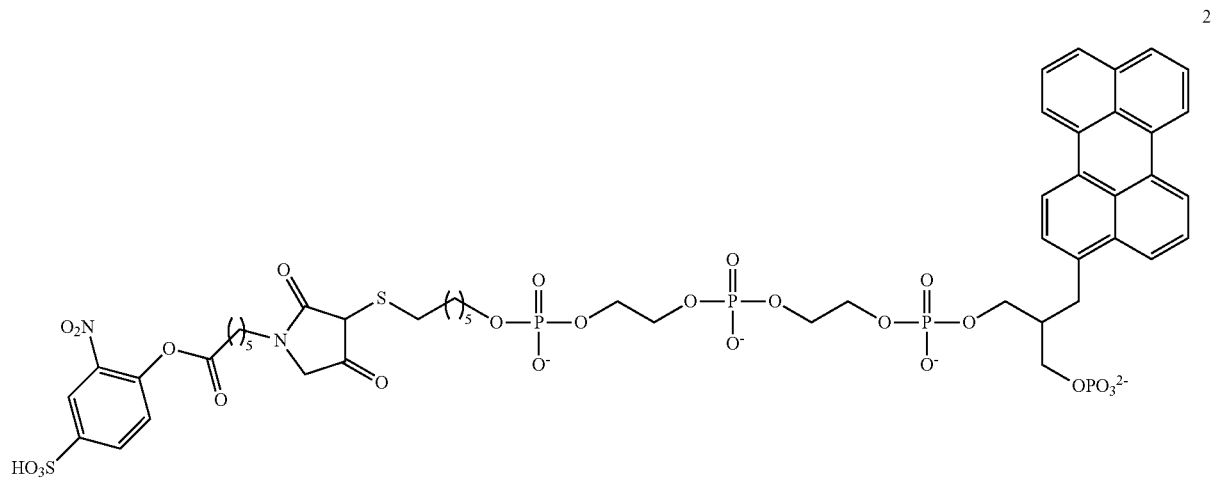

2

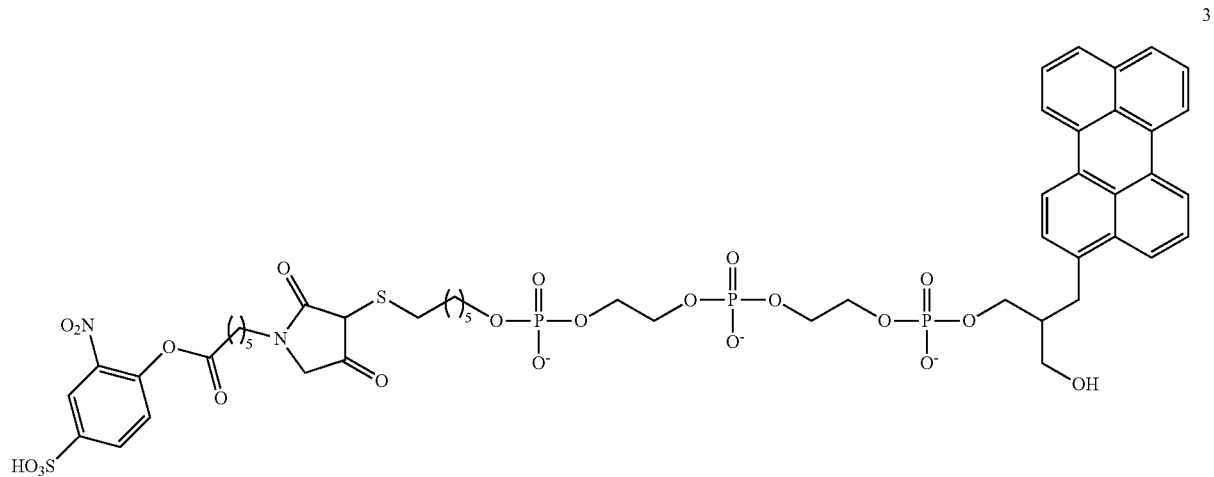

3

A 5 mL micropipettor was used to add 3.88 mL of $H_2O$ to 10 mg of dry COMPOUND 1 in a 50 mL conical tube. The dissolved COMPOUND 1 was mixed for approximately 5 minutes using a Vortex mixer and a slight non-dye related precipitate appeared. The tube and its contents were spun in a centrifuge at its maximum speed (3280 RCF) for 5 minutes, and then the COMPOUND 1 supernatant was removed with care not to disturb the pellet. The clarified COMPOUND 1 was transferred to a new conical tube, and a sample was removed for quantification and HPLC analysis. HPLC-MS demonstrated that compound 1 was 52% pure and had a mass of 1648 Daltons (Da).

5 mL of compound 1 was sampled from clarified solution using a micropipettor and diluted 20-fold in $H_2O$. A blank measurement was performed on the NanoDrop using $H_2O$, and then the absorbance of the diluted compound 1 was measured at 443 nm. Equation 1 was used to calculate the molar concentration of compound 1:

$$\text{Molar concentration of COMPOUND 1} = \{A_{443} / (L * e_{COMPOUND\ 1})\} * \text{Dilution Factor} \quad \text{Equation 1:}$$

$e_{COMPOUND\ 1} = 38{,}000$ M-1 cm-1
$L_{nanodrop} = 0.1$ cm
$A_{443} = 0.614$ AU
Dilution Factor=20
Molar concentration of COMPOUND $1 = 3.23 \times 10^{-03}$ $M_{COMPOUND\ 1}$.

A stock solution of TCEP (tris(2-carboxyethyl)phosphine), HCl salt was made by weighing 47.7 mg of TCEP and adding it to a 15 mL conical tube. 1.5 mL of $H_2O$ was added to the tube and the TCEP was dissolved using a vortex mixer to mix the solution thoroughly for approximately 5 minutes. The resulting solution was 31.8 mg/mL TCEP, or 0.111 $M_{TCEP}$. Moles of COMPOUND 1 were calculated using Equation 2:

$$\text{moles of COMPOUND 1} = \{M_{COMPOUND\ 1} * (V_{COMPOUND\ 1\text{-}mL}/1000)\} \quad \text{Equation 2:}$$

$M_{COMPOUND\ 1} = 3.23 \times 10^{-03}$ M (Eq. 1)
$V_{COMPOUND\ 1} = 3.88$ mL
Moles of COMPOUND 1 to be reduced $= 1.23 \times 10^{-05}$ moles COMPOUND 1.

Equation 3 was used to calculate the moles of TCEP required to achieve a 11.3:1 molar ratio of TCEP to COMPOUND 1.

$$\text{moles of TCEP} = \text{Moles}_{COMPOUND\ 1} * 11.3 \quad \text{Equation 3:}$$

$\text{Moles}_{COMPOUND\ 1} = 1.23 \times 10^{-05}$ (Eq. 2)
Molar Excess: 11.3
Moles of TCEP required $= 1.39 \times 10^{-04}$ moles TCEP.

Equation 4 was used to calculate the volume of TCEP to add to COMPOUND 1:

$$\text{Volume (mL) of TCEP Required} = \{(\text{Moles}_{TCEP}/M_{TCEP}) * 1000\} \quad \text{Equation 4:}$$

$\text{Moles}_{TCEP} = 1.39 \times 10^{-04}$ (Eq. 3)
$M_{TCEP} = 0.111$ M
Volume of TCEP required=1.28 mL of TCEP.

The HCl salt of TCEP is acidic and reduction of the COMPOUND 1 needs to occur at slightly acidic to neutral pH (e.g. pH 6-7). The $NaPO_4$ buffer should be in approximately 5-fold or higher molar excess maintain a pH of 6.5. Since the molarity of 0.6 M $NaPO_4$ stock solution is 5.45-fold higher than the 0.111 M TCEP stock solution, an equal volume of the stock added to TCEP is sufficient to buffer the reaction.

Volumes of reagents required:
$3.23 \times 10^{-03}$ M COMPOUND 1=3.88 mL
0.6 M $NaPO_4$=1.28 mL
0.111 M TCEP=1.28 mL Using a micropipettor, 1.28 mL $NaPO_4$ buffer was added to 3.88 mL COMPOUND 1. 1.28 mL TCEP was added to the COMPOUND 1-$NaPO_4$ solution for a final reaction volume of 6.44 mL. The reaction was incubated at room temperature (~23° C.). After 2 hours a sample was removed for HPLC-MS. HPLC analysis demonstrated that the reduction reaction under these conditions was partially completed (perhaps due to oxidized TCEP).

There are two reduced COMPOUND 1 products: the 5'-ECC-SH species which has an expected mass of 785 Daltons and the HS-CCE-3' species which has an expected mass of 865 Daltons.

Despite only partial reduction in this example, the mixture containing the two intended products was reacted with N-Maleimido-6-Aminocaproyl 1-Hydroxy-2-Nitro-4-Benzenesulfonic acid Ester (MSH).

Using an analytical balance, 37 mg of dry MSH was weighed out and transferred to a 15 mL conical tube. 3.7 mL of $H_2O$ was added to the tube using a 5 mL micropipettor, making a 10 mg/mL (0.023 M) solution of MSH. 3.1 mL of this MSH solution was added to the tube containing 6.44 mL of COMPOUND 1 reduction mixture, and the volume of the resulting solution was brought to 10 mL by adding 0.46 mL $H_2O$. The reaction was incubated at room temperature for 30 minutes.

The final concentration of the reactants was calculated for the final 10 mL volume:
COMPOUND 1: $(3.23 \times 10^{-03}$ M COMPOUND 1$) \times (3.88$ mL COMPOUND 1$)/10$ mL$=1.25 \times 10^{-03}$ M COMPOUND 1
TCEP: (0.111 MTCEP)*(1.28 mL TCEP)/10 mL=0.014 M TCEP
MSH: (0.023 M MSH)*(3.1 mL MSH)/10 mL=$7.13 \times 10^{-03}$ M MSH
NaPO4: (0.6 M NaPO4*1.28 mL $NaPO_4$)/10 mL=0.077 M $NaPO_4$ A sample was removed for HPLC-MS analysis, which showed that the maleimide functional group of the MSH was added to both the 5'-ECC-SH and the HS-CCE-3' species, and that the products are compounds 2 and 3.

Semi-preparative reverse phase chromatography was used to isolate the products from the reaction mixture as follows:
Equipment
  HPLC: Akta Purifier 100
Column
  Phenomenex Gemini C18 (5 mm, 110 Å, 10×250 mm), part#00G-4435-NO
Method 1:
  Flow-rate: 2 mL/minute
  Mobile Phase:
    A=0.1 M TEAA, 5% Acetonitrile in $H_2O$
    B=100% Acetonitrile
  Injection: 5 mL Reactants
  Elution: 0-55% Mobile Phase B, 5 CV, Column Clean: 100% Mobile Phase B, 1 CV
  Monitored traces:
    Conductivity
    UV absorbance at 445 nm and 310 nm
  Fractionation: Threshold triggered by UV445 at 50 mAU, 1.25 mL per fraction collected in 15 mL
    Collected in 15 mL conical tubes
    Fractions analyzed by HPLC to confirm purity The foregoing HPLC method was used to purify compound 3, however further HPLC purification was performed on compound 2 as follows:

Equipment
HPLC: Akta Purifier 100
Column
Phenomenex Gemini C18 (5 mm, 110 Å, 10×250 mm), part#00G-4435-NO
Method 2:
Flow-rate: 2 mL/minute
Mobile Phase:
A=0.1 M TEAA, 5% methanol in $H_2O$
B=100% methanol
Injection: 5 mL HNSA-S-CCE-3'+unreacted COMPOUND 1 (fraction B11)
Elution: 0-55% Mobile Phase B, 5 CV, Column Clean: 100% Mobile Phase B, 1 CV
Monitored traces:
Conductivity
UV absorbance at 445 nm and 310 nm
Fractionation: Threshold triggered by UV445 at 50 mAU, 1.25 mL per fraction collected in 15 mL
Collected in 15 mL conical tubes
Fractions analyzed by HPLC to confirm purity
Fraction C10 was confirmed to be the purified compound 2

10 mL $H_2O$ was added to each of the collected product (i.e., compound 2 and 3) fractions to dilute the organic modifier to less than 15%. The samples were flash frozen in a dry-ice/ethanol bath, placed on a Labconco FreeZone 4.5 lyophilizer and allowed to freeze-dry overnight to remove moisture, solvent and TEAA buffer components.

Compounds 2 and 3 were reacted with TRIS (a molecule containing a primary amine) to simulate conjugation of a dye to a primary amine containing macromolecule such as a protein or antibody. 300 ml $H_2O$ was added to each component to completely dissolve. 50 ml aliquots of each component were treated with either 50 μL of water or 50 μL of 1 M Tris (pH 8.5) and allowed to react at room temperature for 15 minutes. Samples of each were submitted for HPLC analysis (see FIGS. 8a and 8b).

HPLC-MS analysis showed HNSA activated dye sequences were somewhat subject to degradation via either buffer-related methanol addition or hydration at the HNSA ester position of the molecule, but also showed that intact COMPOUND 1-HNSA reacted predictably with TRIS. Only the results for the 5'-ECC-S-HNSA product are shown.

Example 2

Synthesis of Maleimide-Containing Dye

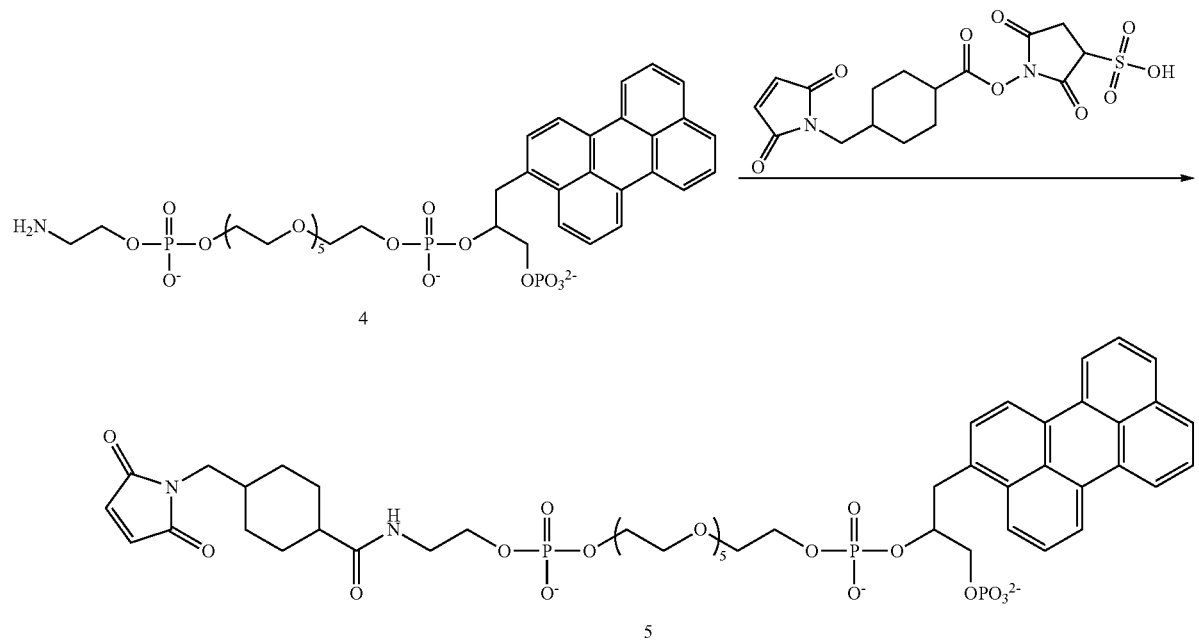

A water soluble dye with a functional maleimide group was synthesized by reacting a water soluble dye containing a terminal primary amine (compound 4) with the N-Hydroxysuccinimidyl group of Sulfosuccinimidyl-4-(N-maleimidomethyl) cyclohexane-1-carboxylate (Sulfo-SMCC).

Determine the Molar Concentration of compound 4 by measuring its absorbance using a Nanodrop and Beer's Law. Using $H_2O$ as a diluent, make two 10-fold dilutions of compound 4 (a 100-fold final dilution). Perform a blank measurement on the NanoDrop using $H_2O$. Measure the absorbance of compound 4 at 443 nm. Use Equation 1 to calculate the molar concentration of compound 4 from the absorbance.

Molar concentration of $SND215=\{A_{443}/(L*ecompound\ 4)\}*Dilution\ Factor$   Equation 1(Beer's Law):

e compound $4_5$=38,000 M−1 cm−1
$L_{nanodrop}$=0.1 cm
$A_{443}$=0.372
Dilution Factor=100
Molar concentration of SND215=9.79×10$^{-03}$ M compound 4.

Make a stock solution of Sulfo-SMCC. Weigh 28 mg of Sulfo-SMCC and add it to a 15 ml conical tube. Add 2.8 ml of H2O to the tube. Dissolve the Sulfo-SMCC using a Vortex mixer for approximately 5 minutes. This is a 10 mg/ml Sulfo-SMCC solution. Calculate that the molarity of Sulfo-SMCC is 0.023 $M_{Sulfo-SMCC}$.

$$\text{moles of } SND215 = \{M \text{ compound } 4_5 *(V\text{compound } 4_{-ml}/1000)\} \quad \text{Equation 2:}$$

M compound 4=9.79×10$^{-03}$ M (Eq. 1)
V compound 4=0.65 ml
Moles of compound 4 to be reacted with Sulfo-SMCC=6.36×10$^{-06}$ moles compound 4.
Use Equation 3 to calculate the moles of Sulfo-SMCC required to achieve a 10:1 Sulfo-SMCC to compound 4 molar ratio.

$$\text{moles of Sulfo-SMCC} = \text{Moles compound 4}*10 \quad \text{Equation 3:}$$

Moles compound 4=6.36×10$^{-06}$ (Eq. 2)
Molar Excess: 10
Moles of Sulfo-SMCC required=6.36×10$^{-05}$ moles Sulfo-SMCC.
Use Equation 4 to calculate the volume of Sulfo-SMCC that will be added to compound 4.

$$\text{Volume (ml) of Sulfo-SMCC Required} = \{(\text{Moles}_{Sulfo-SMCC}/M_{Sulfo-SMCC})*1000\} \quad \text{Equation 4:}$$

Moles$_{Sulfo-SMCC}$=6.36×10$^{-05}$ (Eq. 3)
$M_{Sulfo-SMCC}$=0.023 M
Volume of Sulfo-SMCC required=2.765 ml of Sulfo-SMCC.

Sulfo-SMCC is acidic and addition of the compound 4 should occur at slightly basic to neutral pH (e.g. pH 7.5-8.5). The $NaPO_4$ buffer should be approximately equi-molar to Sulfo-SMCC to maintain the pH of 7.5. Used 0.45 M NaPO4 (pH=8.0) to buffer the reaction.

Using the following volumes (see below) add the reactants to a 5 ml conical tube.
9.79×10$^{-03}$ M compound 4=0.65 ml
0.45 M $NaPO_4$=1.15 ml
0.023 M Sulfo-SMCC=2.75 ml
$H_2O$=0.45 ml The final concentration of the reactants where the final volume is 5 ml is calculated as follows:

compound 4: (9.79×10$^{-03}$ M compound 4)×(0.65 ml compound 4)/5 ml=1.27×10$^{-03}$ M     compound 4

Sulfo-SMCC: (0.023 M Sulfo-SMCC)*(3.1 ml Sulfo-SMCC)/5 ml=0.013 M     Sulfo-SMCC NaPO4: (0.45 M NaPO4*1.15 ml $NaPO_4$)/5 ml=0.104 M     NaPO4

The pH of the reaction was approximately 7.5 using litmus paper. Incubate the reaction overnight at lab room temperature (approximately 23° C.). Calculate the final concentrations of the reactants for the reaction. Measure the pH of the reaction using litmus paper that spans a pH range of 7-14. Remove a sample for HPLC/MS analysis before reaction and once the reaction is complete. M.S. analysis of compound 4 before reaction: Calculated MW is 888.4. MW found is 887.2. M.S. analysis of compound 5 before reaction: Calculated MW is 1107.2. MW found is 1106.4.

Compound 5 was purified to an overall purity of 78% from the crude reaction mixture as follows:
Equipment
  HPLC: Akta Purifier 100
Column
  Waters Spherisorb C6 (5 mm, 80 Å, 10×250 mm), part# PSS831085
Method 1:
  Flow-rate: 2 mL/minute
  Mobile Phase:
    A=0.1 M TEAA, 5% Acetonitrile in $H_2O$
    B=100% Acetonitrile
  Injection: 5 mL Reactants
  Elution: 0-55% Mobile Phase B, 5 CV, Column Clean: 100% Mobile Phase B, 1 CV
  Monitored traces:
    Conductivity
    UV absorbance at 445 nm and 310 nm
  Fractionation: Threshold triggered by UV445 at 50 mAU, 1.25 mL per fraction collected in 15 mL
  Collect fractions B6 and B5 in 15 mL conical tubes
  Pool fractions and analyzed by HPLC to confirm purity Purified compound 5 was lyophilized as follows:
Dilute purified compound 5 to a final volume of 25 ml with H2O. Flash Freeze diluted compound 5 in a Dry-ice/Ethanol bath. After it was frozen, place the compound 5 into chamber a pre-chilled Labconco FreeZone 4.5 lyophilizer. Apply vacuum and let compound 5 freeze dry overnight. Using a needle scrape out a small amount of the material and reconstitute it in H2O. Analyze the reconstituted compound 5 by HPLC. Store the remaining dry SND215-Maleimide was stored in a −20° C. freezer.

The ability of compound 5 to form a covalent bond with an analyte molecule was tested as follows:
Reagents:
  L-cysteine hydrochloride monohydrate (CAS 7048-04-6, FW 175.6, Thermo Scientific)
  0.1 M phosphate buffer (+0.15M NaCl), pH 6.5
  Aqueous stock (0.15 mM) of SND215+MSH
Procedure:
A 5 mM solution of L-cysteine in water was created by dissolving 12.5 mg solid in 14.2 mL water. The reaction between L-cysteine and a maleimido group should be carried out in slightly acidic conditions, so samples were prepared as shown and pH level was checked for pH 6-7:
  Blank: 45 µL water+50 µL buffer+5 µL L-cysteine stock
  Untreated sample: 45 µL SND215, 50 µL buffer, 5 µL water
  Treated sample: 45 µL SND215, 50 µL buffer, 5 µL L-cysteine stock Samples were well mixed and allowed to react at room temperature for 3 hours. Analysis was performed on 10 µL injections of each test sample using LC/MS. Results indicated that compound 5 reacted with cysteine to form a covalent bond as expected.

All of the U.S. patents, U.S. patent application publications, U.S. patent applications, foreign patents, foreign patent applications and non-patent publications referred to in this specification, including U.S. provisional patent application Ser. No. 62/121,415, filed Feb. 26, 2015, are incorporated herein by reference, in their entireties to the extent not inconsistent with the present description.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A compound having the following structure (Ia):

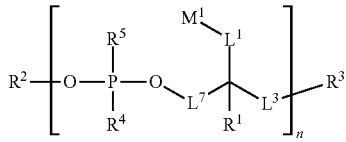

or a salt or stereoisomer thereof, wherein:
$M^1$ is, at each occurrence, independently a fluorescent or colored moiety comprising two or more double bonds and at least one degree of conjugation, and at least one occurrence of $M^1$ is a fluorescent or colored moiety comprising three or more aryl or heteroaryl rings, or combinations thereof;

$L^1$ is, at each occurrence, independently an optional alkylene linker;

$L^3$ and $L^7$ are, at each occurrence, independently alkylene linkers;

$R^1$ is, at each occurrence, independently H, alkyl or alkoxy;

$R^2$ is $-L^9-(L^{10})_z-L^{11}-Q$;

$R^3$ is OH, SH, $-NH_2$, alkyl, alkylether, hydroxylalkyl, aminoalkyl, hydroxylalkylether, sulfhydrylalkyl, sulfyhdrylalkylether, cyanoalkyl, —Oaralkyl, phosphate, thiophosphate, alkylphospho, alkylthiophospho, —Oalkylphospho, —Oalkylthiophospho, alkyletherphospho, alkyletherthiophospho, —Oalkyletherphospho, —Oalkyletherthiophospho phosphoalkyl, phosphoalkylether, thiophosphoalkyl, thiophosphoalkylether, —Ophosphoalkyl, —Ophosphoalkylether, —Othiophosphoalkyl or —Othiophosphoalkylether;

$R^4$ is, at each occurrence, independently O⁻, or OZ, where Z is a cation;

$R^5$ is, at each occurrence, independently oxo;

$L^9$ is an optional $C_1-C_6$ alkylene linker;

$L^{11}$ is an optional linker;

$(L^{10})_z$ has one of the following structures:

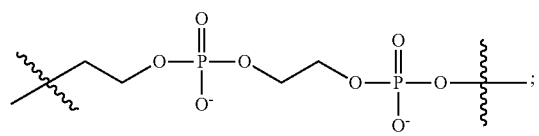

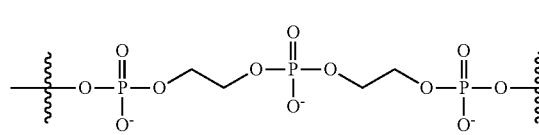

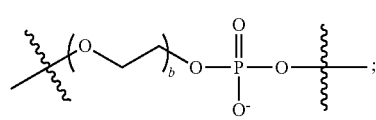

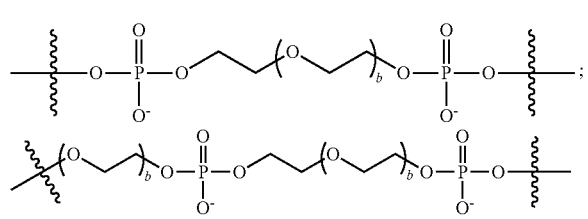

or

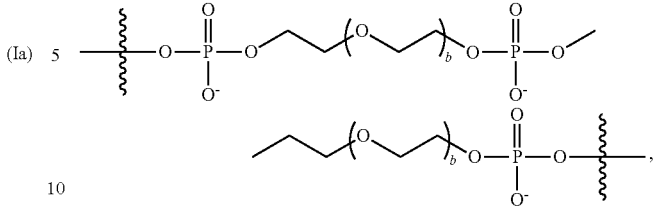

where b is an integer from 2 to 10;

Q is sulfhydryl, disulfide, activated ester, isothiocyanate, azide, alkyne, alkene, diene, dienophile, acid halide, sulfonyl halide, phosphine, α-haloamide, biotin, amino or a maleimide; and n is an integer from 1 to 20.

2. The compound of claim 1, wherein the compound has the following structure (Ia):

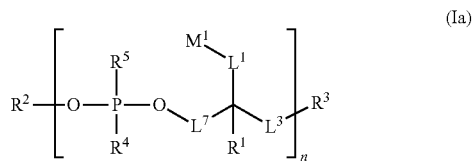

wherein:
$M^1$ is, at each occurrence, independently a fluorescent or colored moiety comprising two or more double bonds and at least one degree of conjugation, and at least one occurrence of $M^1$ is a fluorescent or colored moiety comprising four or more aryl or heteroaryl rings, or combinations thereof;

$L^1$ is, at each occurrence, independently an alkylene linker;

$L^7$ and $L^3$ are, at each occurrence, independently alkylene linkers;

$R^1$ is, at each occurrence, independently H, alkyl or alkoxy;

$R^2$ is $-L^9-(L^{10})_z-L^{11}-Q$;

$R^3$ is OH, SH, $-NH_2$, alkyl, alkylether, hydroxylalkyl, aminoalkyl, hydroxylalkylether, sulfhydrylalkyl, sulfyhdrylalkylether, cyanoalkyl, —Oaralkyl, phosphate, thiophosphate, alkylphospho, alkylthiophospho, —Oalkylphospho, —Oalkylthiophospho, alkyletherphospho, alkyletherthiophospho, —Oalkyletherphospho, —Oalkyletherthiophospho phosphoalkyl, phosphoalkylether, thiophosphoalkyl, thiophosphoalkylether, —Ophosphoalkyl, —Ophosphoalkylether, —Othiophosphoalkyl or —Othiophosphoalkylether;

$R^4$ is, at each occurrence, independently O⁻, or OZ, where Z is a cation;

$R^5$ is, at each occurrence, independently oxo;

$L^9$ is an optional $C_1-C_6$ alkylene linker;

$L^{11}$ is an optional linker;

$(L^{10})_z$ has one of the following structures:

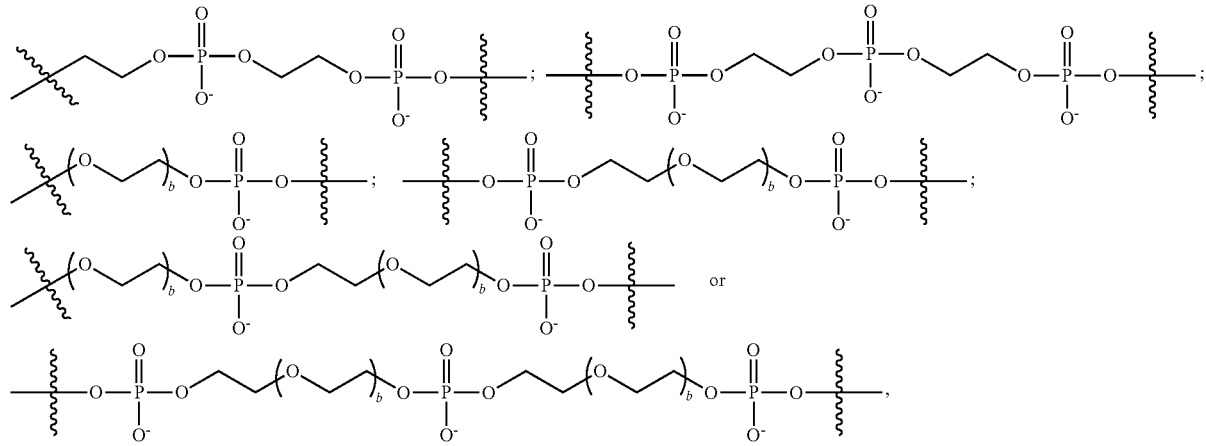

where b is an integer from 2 to 10;
Q is sulfhydryl, disulfide, activated ester, isothiocyanate, azide, alkyne, alkene, diene, dienophile, acid halide, sulfonyl halide, phosphine, α-haloamide, biotin, amino, or a maleimide; and
n is an integer from 1 to 10.

3. The compound of claim 2, wherein the compound has the following structure (Ib):

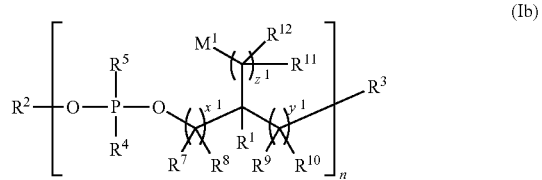

(Ib)

wherein:
$R^7$, $R^8$, $R^9$, $R^{10}$, $R^{11}$ and $R^{12}$ are, at each occurrence, independently H or alkyl; and
$x^1$, $y^1$ and $z^1$ are, at each occurrence, independently an integer from 0 to 5.

4. The compound of claim 1, wherein $R^2$ is -$L^9$-$(L^{10})_z$-$L^{11}$-Q, and $R^3$ is OH or phosphate.

5. The compound of claim 1, wherein $R^2$ is -$L^9$-$(L^{10})_z$-$L^{11}$-Q, and $R^3$ is phosphate, thiophosphate, phospho, thiophospho, —Oalkylphospho, —Oalkylthiophospho, —Oalkyletherphospho, —Oalkyletherthiophospho, —Ophosphoalkyl, —Ophosphoalkylether, —Othiophosphoalkyl or —Othiophosphoalkylether optionally substituted with a substituent selected from —OH, —NH$_2$ and —SH.

6. The compound of claim 5, wherein $R^3$ has one of the following structures:

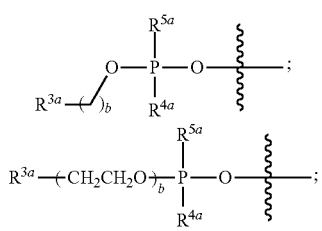

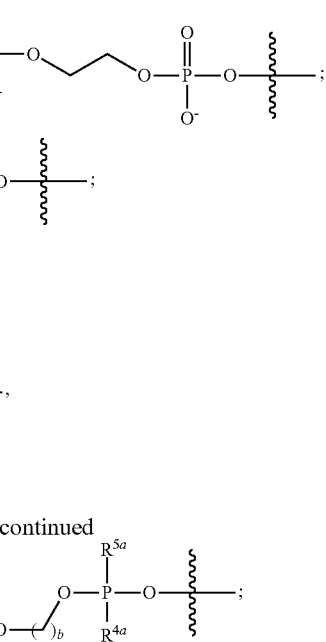

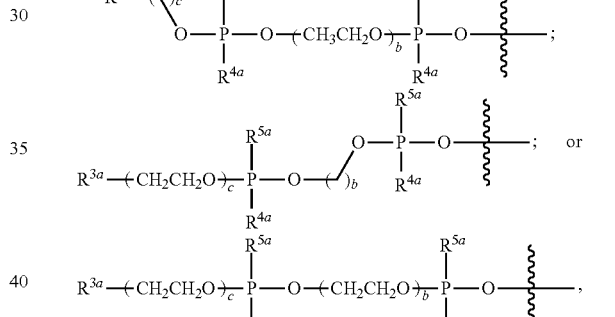

wherein:
$R^{3a}$ is —OH, —SH, —NH$_2$, phosphate or thiophosphate;
$R^{4a}$ and $R^{4b}$ are independently O$^-$, S$^-$, OZ or SZ, where Z is a cation;
$R^{5a}$ and $R^{5b}$ are independently oxo, or thioxo; and
b and c are each independently integers from 1 to 10.

7. The compound of claim 1, wherein n is an integer from 2 to 15.

8. The compound of claim 1, wherein each $M^1$ comprises a fluorescent or colored fused-multicyclic aryl moiety.

9. The compound of claim 1, wherein at least one $M^1$ is a dimethylaminostilbene, quinacridone, fluorophenyl-dimethyl-BODIPY, his-fluorophenyl-BODIPY, acridine, terrylene, sexiphenyl, porphyrin, benzopyrene, (fluorophenyl-dimethyl-difluorobora-diaza-indacene)phenyl, (bis-fluorophenyl-difluorobora-diaza-indacene)phenyl, quaterphenyl, bi-benzothiazole, ter-benzothiazole, bi-naphthyl, bi-anthracyl, squaraine, squarylium, 9, 10-ethynylanthracene,ter-naphthyl, p-terphenyl, perylene, azobenzene, phenazine, phenanthroline, acridine, thioxanthrene, chrysene, rubrene, coronene, cyanine, perylene imide, perylene amide, a coumarin dye, resorufin dye, dipyrrometheneboron difluoride dye, ruthenium bipyridyl dye, energy transfer dye, thiazole orange dye, polymethine or N-aryl-1,8-naphthalimide dye.

10. The compound of claim 1, wherein Q has one of the following structures:
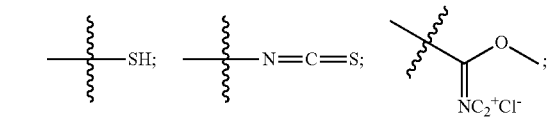
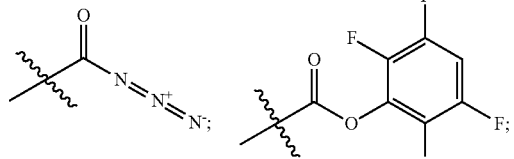
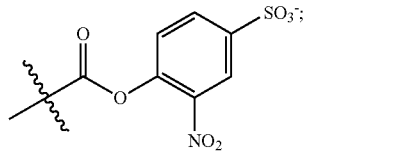
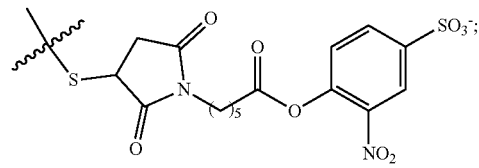
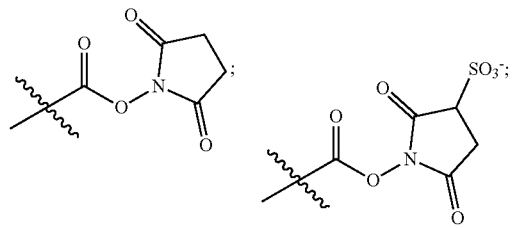
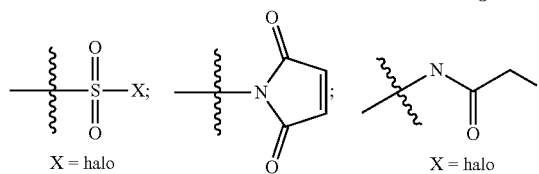
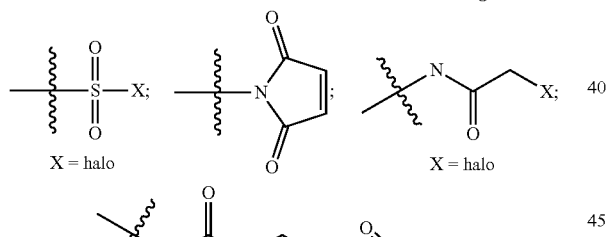
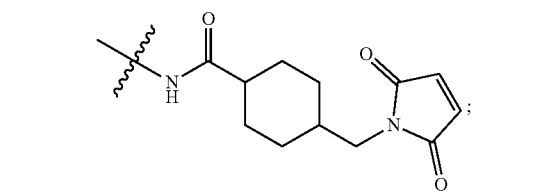
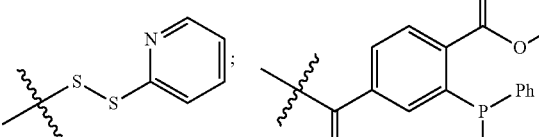
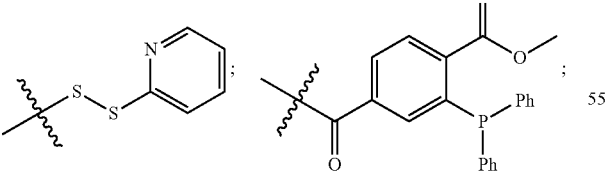
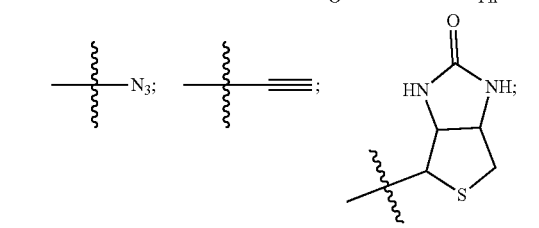
-continued
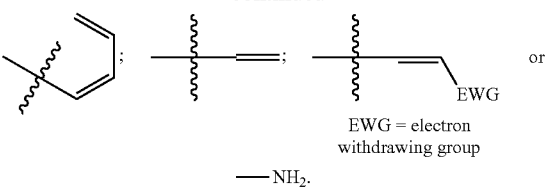
EWG = electron withdrawing group
—NH$_2$.
11. The compound of claim 1, wherein M$^1$ has one of the following structures:
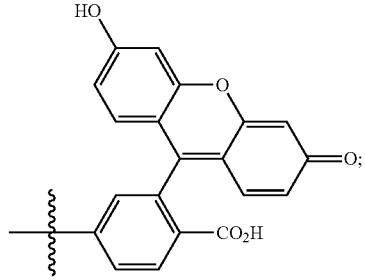

12. The compound of claim 1, having one of the following structures:
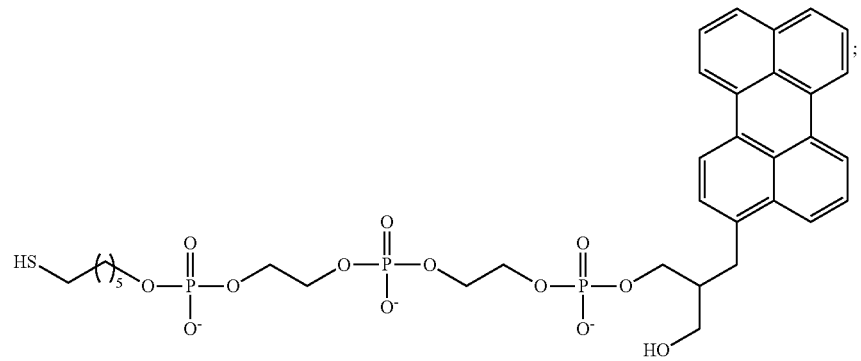
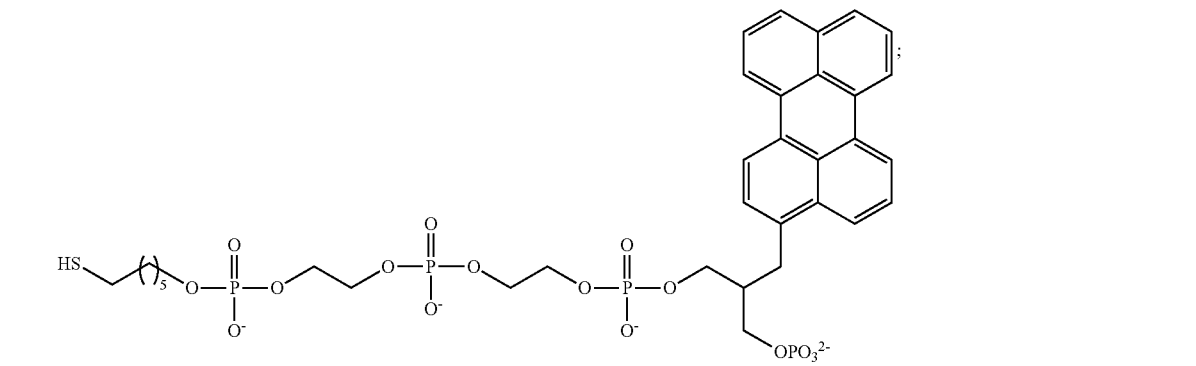
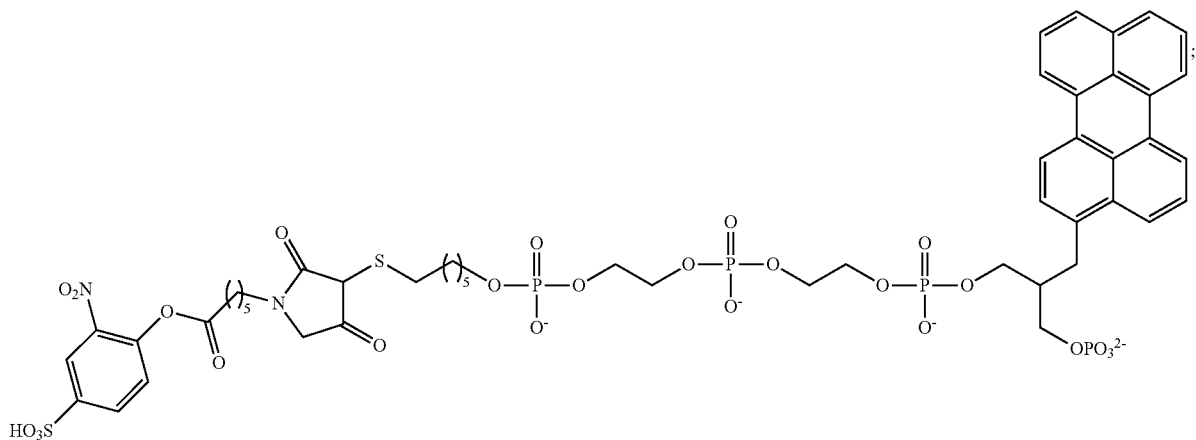
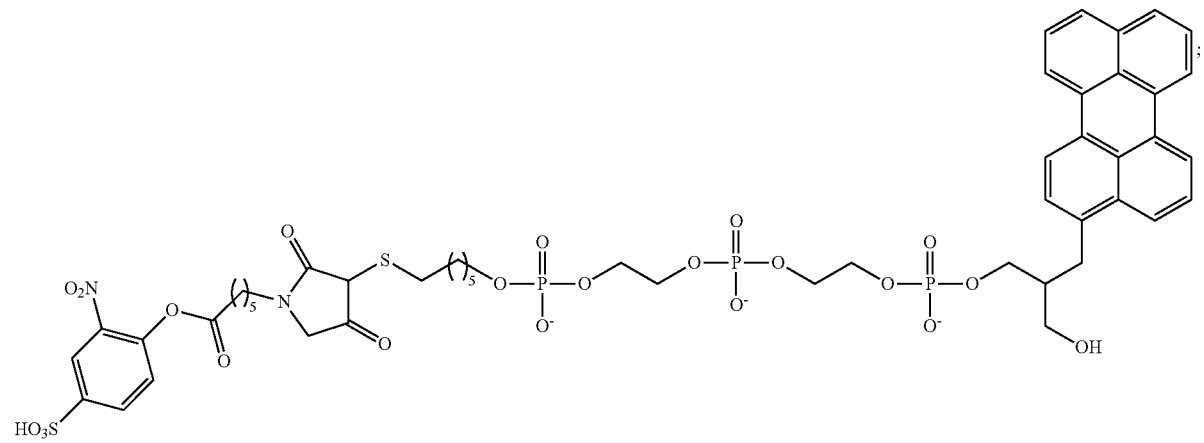

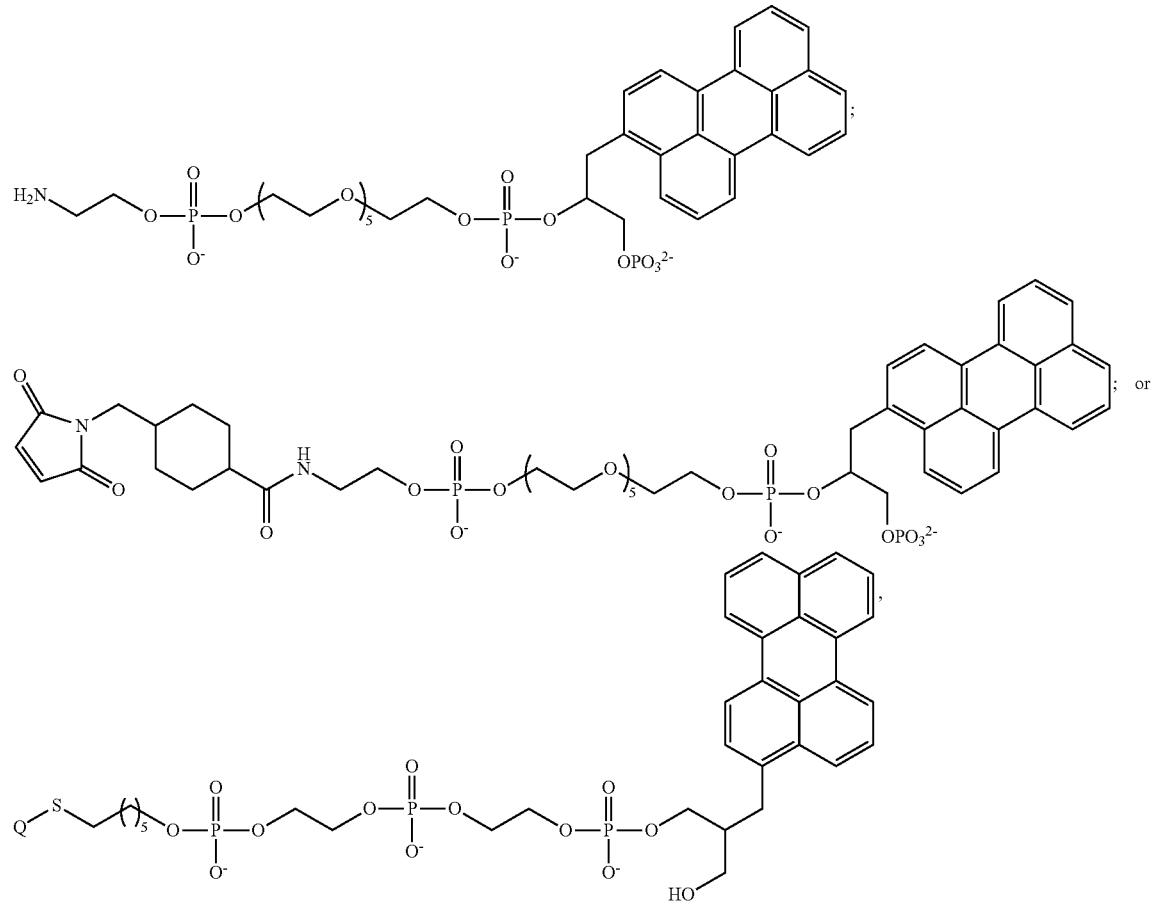
or a salt or stereoisomer thereof.
13. A method for visually detecting a biomolecule, the method comprising:
   (a) admixing the compound of claim 1 with one or more biomolecules; and
   (b) detecting the compound by its visible properties.
* * * * *